United States Patent
Nabki et al.

(10) Patent No.: US 12,494,828 B2
(45) Date of Patent: Dec. 9, 2025

(54) ULTRA-WIDEBAND (UWB) COMMUNICATION METHODS AND SYSTEMS

(71) Applicants: Frederic Nabki, Montreal (CA); Dominic Deslandes, Chambly (CA); Michiel Soer, Montreal (CA); Gabriel Morin-Laporte, Montreal (CA); Mohammad Taherzadeh-Sani, Montreal (CA); Raphael Guimond, Lasalle (CA); Mohammad Hassan Rahmani, Montreal (CA)

(72) Inventors: Frederic Nabki, Montreal (CA); Dominic Deslandes, Chambly (CA); Michiel Soer, Montreal (CA); Gabriel Morin-Laporte, Montreal (CA); Mohammad Taherzadeh-Sani, Montreal (CA); Raphael Guimond, Lasalle (CA); Mohammad Hassan Rahmani, Montreal (CA)

(73) Assignee: SPARK Microsystems International Inc., Montreal (CA)

( * ) Notice: Subject to any disclaimer, the term of this patent is extended or adjusted under 35 U.S.C. 154(b) by 141 days.

(21) Appl. No.: 18/553,919

(22) PCT Filed: Apr. 5, 2022

(86) PCT No.: PCT/CA2022/050510
§ 371 (c)(1),
(2) Date: Oct. 4, 2023

(87) PCT Pub. No.: WO2022/213183
PCT Pub. Date: Oct. 13, 2022

(65) Prior Publication Data
US 2024/0356594 A1    Oct. 24, 2024

Related U.S. Application Data

(60) Provisional application No. 63/170,628, filed on Apr. 5, 2021.

(51) Int. Cl.
*H04L 23/02* (2006.01)
*H04B 7/0456* (2017.01)
(Continued)

(52) U.S. Cl.
CPC ...... *H04B 7/0479* (2023.05); *H04W 72/0446* (2013.01); *H04W 76/18* (2018.02)

(58) Field of Classification Search
CPC ...... H04B 1/717; H04B 1/1615; H04B 1/385; H04L 25/02; H04L 25/4902; H04L 2025/03445
(Continued)

(56) References Cited

U.S. PATENT DOCUMENTS 8,670,573 B2 * 3/2014 Theverapperuma ......... H04R 1/1083
381/86
2006/0176093 A1    8/2006 Song et al.
(Continued)

FOREIGN PATENT DOCUMENTS

CN        107645283 A      1/2018

*Primary Examiner* — Khai Tran
(74) *Attorney, Agent, or Firm* — Rosenberg, Klein & Lee

(57) ABSTRACT

Ultra-wideband (UWB) systems are well-suited to applications such peripheral and device interconnections, sensor networks, control and communications, medical systems, and personal area networks. Whilst emission levels permitted by regulatory agencies are low forcing UWB systems tend to short-range applications other applications may be considered where regulatory restrictions are relaxed and/or not present when addressing military and civilian requirements for communications between individuals, electronic devices, control centers, and electronic systems for example. Accordingly, UWB transmitters, UWB receivers and UWB transceivers are outlined providing flexible configuration and management by the electronic devices, such as portable electronic devices, fixed electronic devices, and sensors for
(Continued)

Figure 1 example, to enable their deployment including standalone systems solely exploiting solar harvesting. Protocols, architectures, control schemes as well as software development kit and/or hardware development kits are outlined enabling reduced complexity and flexible configurations of UWB wireless radios within a wide range of devices.

9 Claims, 55 Drawing Sheets

(51) Int. Cl.
*H04W 72/0446* (2023.01)
*H04W 76/18* (2018.01)

(58) Field of Classification Search
USPC .......................... 375/262, 260, 267, 297, 299
See application file for complete search history.

(56) References Cited

U.S. PATENT DOCUMENTS

| | | | |
|---|---|---|---|
| 2006/0262840 A1 | 11/2006 | Wang et al. | |
| 2008/0019349 A1* | 1/2008 | Moon | H04W 52/0229 370/347 |
| 2009/0046607 A1 | 2/2009 | Lee et al. | |
| 2016/0157168 A1* | 6/2016 | Xue | H04W 72/56 370/329 |
| 2021/0192158 A1* | 6/2021 | Studerus | H04L 9/3247 |

* cited by examiner

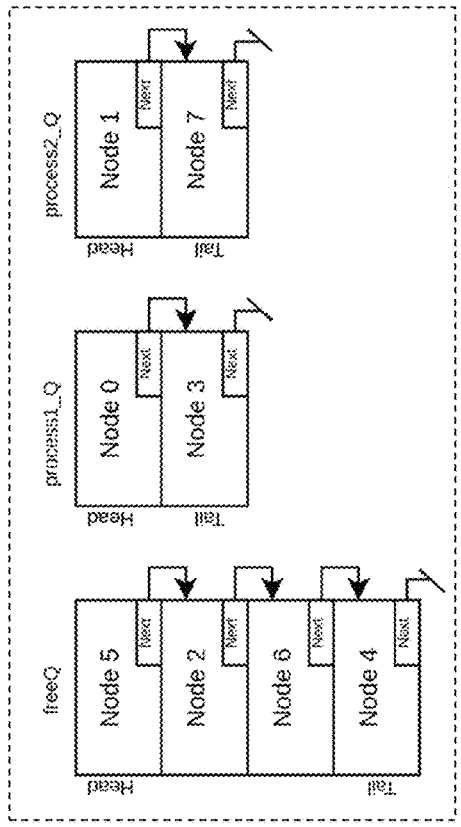
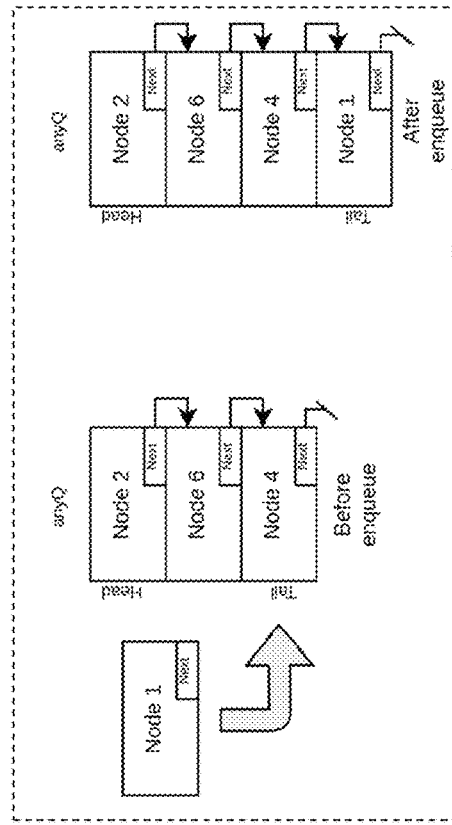
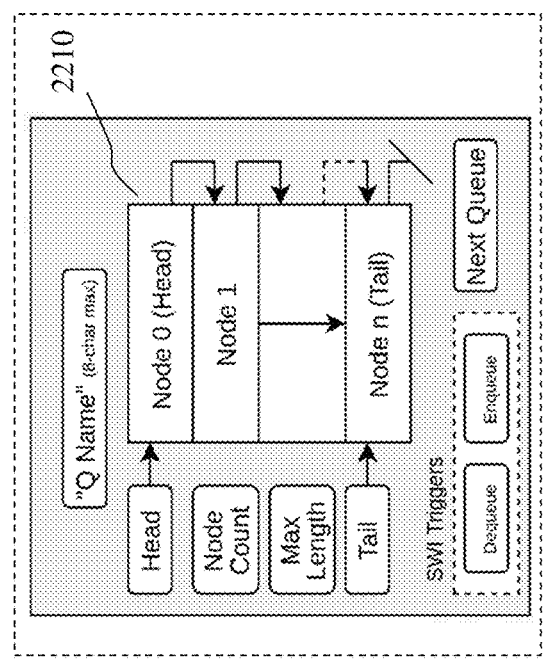
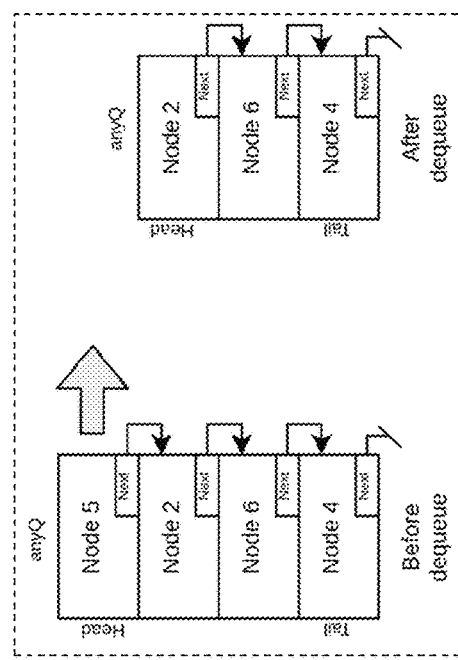
Figure 22

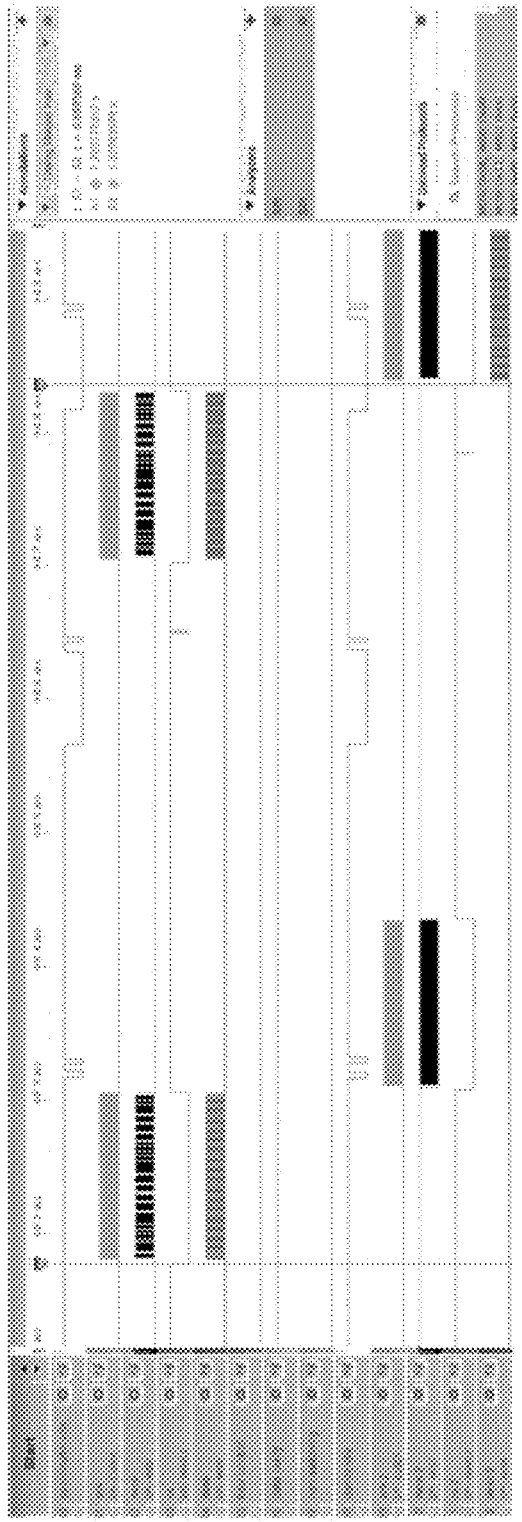
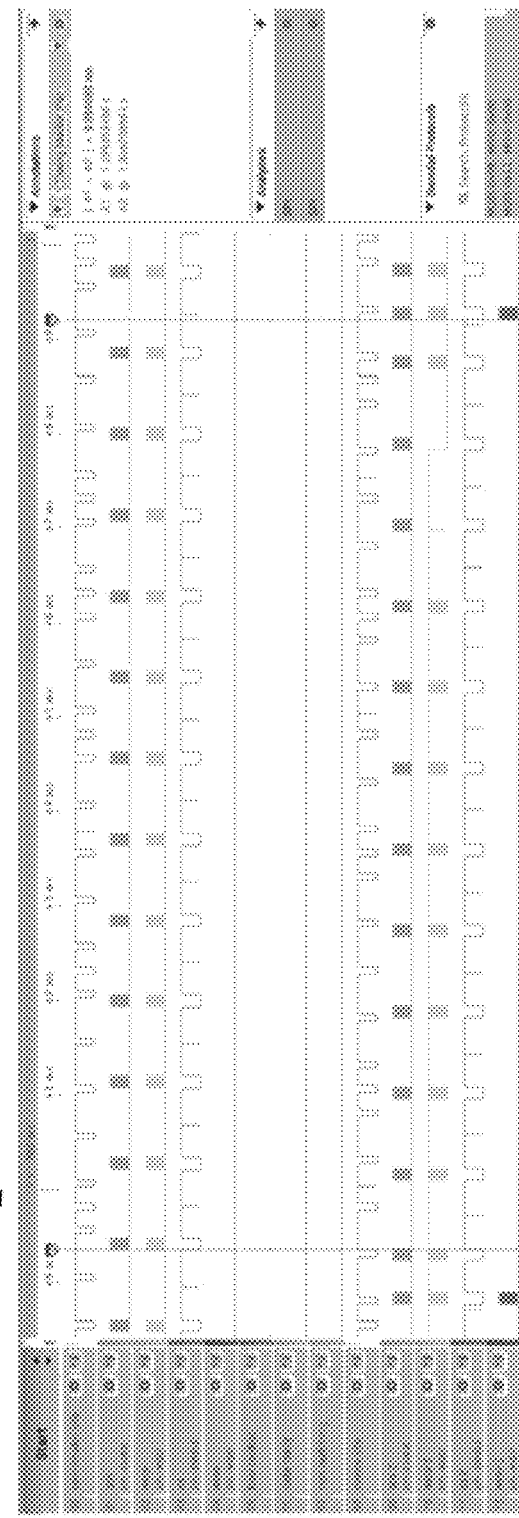
Figure 49
4900A
4900B

Time slot index is between 0 (indicating beacon) and (Total configured time slot count (N) * Number of configured time slot repetition between beacons (n)).
Only the beacon time slot and the N total configured time slots may be kept in memory.

Index 0 = beacon index
Index x E(1..N) = ((x-a)%N)+1

N being numbered of configured time slots
x being the time slot index
N = Total configured time slot count
n = Number of configured time slot repetition between beacons Global Time Slot Index

| 0 (Beacon) | 1 | 2 | ... | N | (N*1)+1 | (N*1)+2 | ... | (N*1)+N | (N*2)+1 | (N*2)+2 | ... | (N*1)+N | ... | (N*n)+1 | (N*n)+2 | ... | (N*n)+N | 0 (Beacon) |

| 0 (Beacon) | 1 | 2 | ... | N | 1 | 2 | ... | N | 1 | 2 | ... | N | ... | 1 | 2 | ... | N | 0 (Beacon) |

Configured Time Slot Table Index

Figure 63

ULTRA-WIDEBAND (UWB) COMMUNICATION METHODS AND SYSTEMS

CROSS-REFERENCE TO RELATED APPLICATIONS

This application claims the benefit of priority as a 371 National Phase Entry of PCT/CA2022/050510 filed 5 Apr. 2022; which itself claims the benefit of priority from U.S. Provisional Patent Application 63/170,628 filed Apr. 5, 2021; the entire contents of each being incorporated herein by reference.

FIELD OF THE INVENTION

This invention relates to ultra-wideband wireless communication systems and more particularly to configuring ultra-wideband transmitters and receivers for enhanced ultra-wideband wireless link performance for said communication systems.

BACKGROUND OF THE INVENTION

Ultra-Wideband (UWB) technology is a wireless technology for the transmission of large amounts of digital data as modulated coded impulses over a very wide frequency spectrum with very low power over a short distance. Such pulse based transmission being an alternative to transmitting using a sinusoidal wave which is then turned on or off, to represent the digital states, as employed within today's wireless communication standards and systems such as IEEE 802.11 (Wi-Fi), IEEE 802.15 wireless personal area networks (PANs), IEEE 802.16 (WiMAX), Universal Mobile Telecommunications System (UMTS), Global System for Mobile Communications (GSM), General Packet Radio Service (GPRS), and those accessing the Industrial, Scientific and Medical (ISM) bands, and International Mobile Telecommunications-2000 (IMT-2000).

UWB systems are well-suited to short-distance applications in a variety of environments, such as depicted in FIG. 1 including peripheral and device interconnections, as exemplified by first residential environment 110, sensor networks, as exemplified by second residential environment 120, control and communications, as exemplified by industrial environment 130, medical systems, as exemplified by medical imaging 150, and personal area networks (PAN), as exemplified by PAN 140. Due to low emission levels permitted by regulatory agencies such UWB systems tend to be short-range indoor applications but it would be evident that a variety of other applications may be considered where such regulatory restrictions are relaxed and/or not present addressing military and civilian requirements for communications between individuals, electronic devices, control centers, and electronic systems for example.

Accordingly, it would be beneficial for UWB transmitters, UWB receivers and UWB transceivers to provide flexible configuration and management by the electronic devices, such as portable electronic devices, fixed electronic devices, and sensors for example, to enable their deployment. It would be further beneficial for such UWB transmitters, UWB receivers and UWB transceivers to support a software development kit and/or hardware development kits enabling enterprises etc. to embed the UWB transmitters, UWB receivers and UWB transceivers into their devices with ease.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to ultra-wideband wireless communication systems and more particularly to configuring ultra-wideband transmitters and receivers for enhanced ultra-wideband wireless link performance for said communication systems.

In accordance with an embodiment of the invention there is provided a method comprising:
   providing an ultra-wideband (UWB) transceiver; and
   automatically configuring a gain of the UWB transceiver for a frame in dependence upon a determination with respect to a preceding frame; wherein
   the configuration proceeds via a first process if the frame has been rejected;
   the configuration proceeds via a second process if the frame has been lost;
   the configuration proceeds via a third process if the frame has been received; and
   the third process employs a current index of the gain, a signal strength of the receive frame in ADC steps and a gain settings table.

In accordance with an embodiment of the invention there is provided a method comprising:
   providing an ultra-wideband (UWB) transceiver; and
   providing a bridge to couple the UWB transceiver to at least one of an external data source and an external data sink.

In accordance with an embodiment of the invention there is provided a method of establishing a wireless link comprising:
   providing an ultra-wideband (UWB) transceiver; wherein
   the UWB transceiver executes a process relating to an aspect of a wireless link established or being established between the UWB transceiver and another transceiver.

In accordance with an embodiment of the invention there is provided a method comprising:
   providing an ultra-wideband (UWB) transceiver; and
   providing a software development kit to execute a process; wherein
   the process relates to at least one of:
      an aspect of a wireless link established or being established between the UWB transceiver and another transceiver; and
      an aspect of the UWB transceiver.

In accordance with an embodiment of the invention there is provided a device comprising:
   an ultra-wideband (UWB) transceiver; and
   at least one of:
      a hardware development kit; and
      an evaluation development kit; wherein control of the device is provided via a software development kit which executes a process;
   wherein
   the process relates to at least one of:
      an aspect of a wireless link established or being established between the UWB transceiver and another transceiver;
      an aspect of the UWB transceiver; and
      an aspect of at least one of the HDK and EDK.

In accordance with an embodiment of the invention there is provided a device comprising:
an ultra-wideband (UWB) transceiver;
a solar harvester;
a sensor; and
an electrical storage coupled to the solar harvester to receive electrical charge to be stored and to the UWB transceiver to power the UWB transceiver; wherein
the device transmits readings acquired by the sensor via the UWB transceiver; and
the device automatically configures itself in dependence upon the available power within the electrical storage.

In accordance with an embodiment of the invention there is provided a method comprising:
providing an ultra-wideband (UWB) transceiver; and
automatically configuring a beacon frame to be transmitted within a sequence of frames comprising data being transmitted by the UWB transceiver.

In accordance with an embodiment of the invention there is provided a method comprising:
providing a sensor module comprising at least a sensor, a photovoltaic cell and an ultra-wideband (UWB) transceiver;
acquiring sensor data with the sensor; and
transmitting the sensor data with the UWB transceiver; wherein the sensor module is installed within an indoor environment; and
the sensor module is powered solely via the photovoltaic cell converting light from lighting within the indoor environment.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 22 depicts enqueue and dequeue exampled for random access memory (RAM) allocation within UWB devices according to an embodiment of the invention;

FIG. 49 depicts measured results upon a logic analyzer for an SPI to SPI interface with UWB transceivers according to an embodiment of the invention;

FIG. 63 depicts a beacon scheme according to an embodiment of the invention;

DETAILED DESCRIPTION

Figure 1:
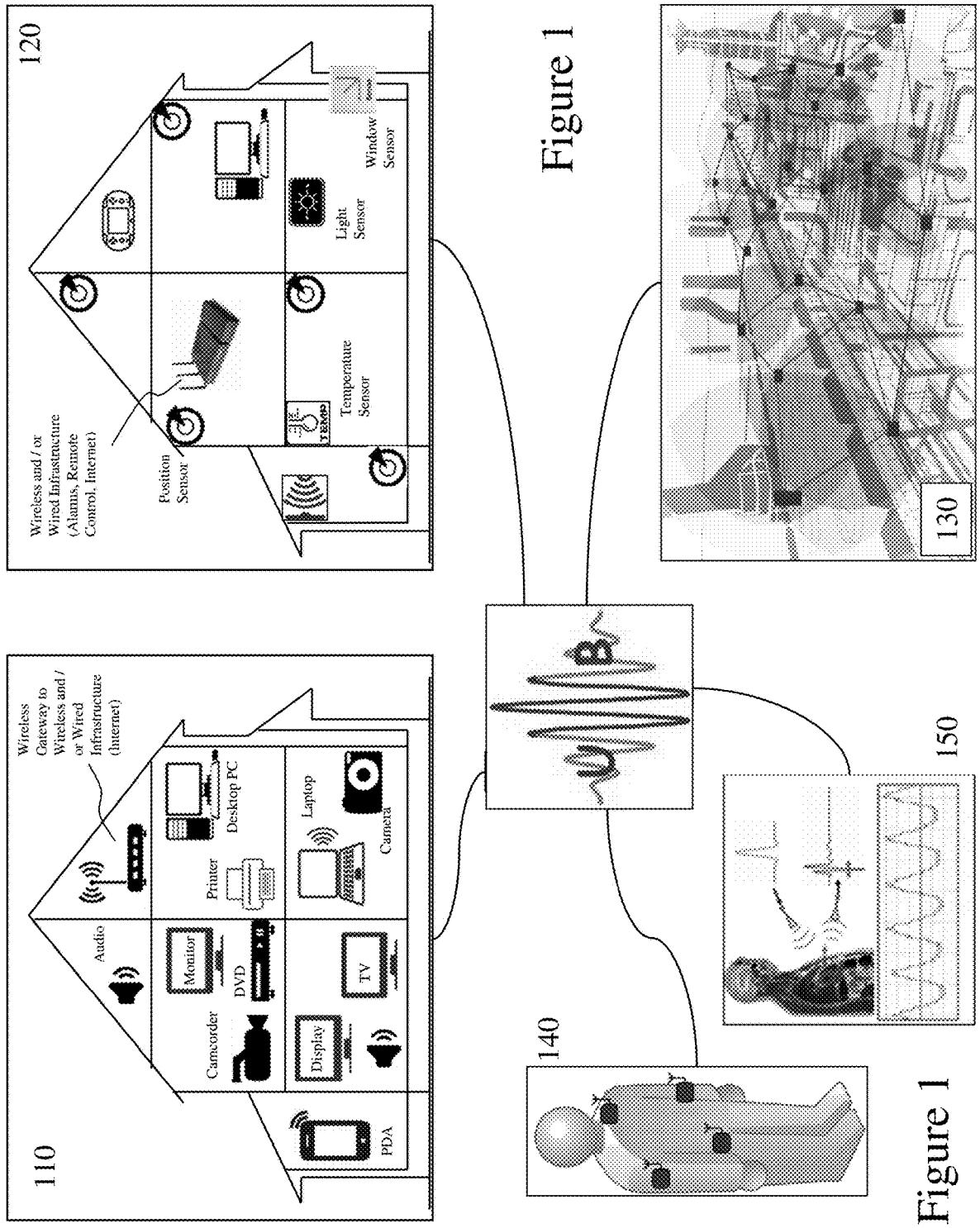
FIG. 1 depicts applications of UWB transmitters, receivers, and systems according to embodiments of the invention.

The present invention is directed to ultra-wideband wireless communication systems and more particularly to configuring ultra-wideband transmitters and receivers for enhanced ultra-wideband wireless link performance for said communication systems.

The ensuing description provides representative embodiment(s) only, and is not intended to limit the scope, applicability, or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment," "an embodiment," "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may," "might," "can" or "could" be included, that particular component, feature, structure, or characteristic is not required to be included.

Reference to terms such as "left," "right," "top," "bottom," "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including," "comprising," "consisting" and grammatical variants thereof do not preclude the addition of one or more components, features, steps, integers, or groups thereof and that the terms are not to be construed as specifying components, features, steps or integers. Likewise, the phrase "consisting essentially of," and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

A "portable electronic device" (PED) as used herein may refer to, but is not limited to, a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, a wearable device, fitness tracker, head mounted display (HMD), an electronic reader or a peripheral device.

A "fixed electronic device" (FED) as used herein may refer to, but is not limited to, a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, a multimedia player, or a peripheral device.

A "wearable device" or "wearable sensor" (Wearable Device) as used herein may refer to, but is not limited to, an electronic device that is worn by a user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, e-textiles, smart shirts, activity trackers, smart glasses, environmental sensors, medical sensors, biological sensors, physiological sensors, chemical sensors, ambient environment sensors, position sensors, neurological sensors, drug delivery systems, medical testing and diagnosis devices, motion sensors, or a peripheral device.

A "peripheral device" as used herein may refer to, but is not limited to, a wireless device used for providing input to a PED and/or FED and/or generating output from a PED and/or FED. A peripheral device or peripheral accordingly, is used to put information into and/or get information out of the computer and refers to hardware components that are wirelessly connected to a PED, FED or wearable device. A peripheral device may provide electronic content, receive electronic content, or convert electronic content. A peripheral device may include, but not be limited to, a mouse, a keyboard, a stylus, a display, a solid state memory device, a hard disk drive, a wireless router, a wireless repeater, a network adapter, an interface supporting devices with a standard connection to interface then to the PED, FED, or wearable device (such interfaces being for example USB or Lightning™), microphone, loudspeakers, headphones, head mounted display (HMD), headset, a printer, a scanner, multi-function printer, a motion tracker, a sensor, an alarm, image scanner, barcode scanner, game controller, webcam, camera, and a haptic interface. A peripheral device may itself be a PED, FED or wearable device.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed, or contained in discrete files. Viewed narrowly, types of digital content include popular media types such as MP3, JPG, AVI, TIFF, AAC, TXT, RTF, HTML, XHTML, PDF, XLS, SVG, WMA, MP4, FLV, and PPT, for example, as well as others, see for example http://en.wikipedia.org/wiki/List_of_file_formats. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is at least one of generated, selected, created, modified, and transmitted in response to a user request, said request may be a query, a search, a trigger, an alarm, and a message for example.

A "software application" (commonly referred to as an "application" or "app") as used herein may refer to, but is not limited to, a "software application," an element of a "software suite," a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED, FED, and/or wearable device.

A "graphical user interface" (GUI) as used herein may refer to, but is not limited to, a form of user interface for a PED, FED, Wearable Device, software application or operating system which allows a user to interact through graphical icons with or without an audio indicator for the selection of features, actions, etc. rather than a text-based user interface, a typed command label or text navigation.

A "profile" as used herein may refer to, but is not limited to, a computer and/or microprocessor readable data file comprising data relating to settings and/or limits of an adult device. Such profiles may be established by a manufacturer/supplier/provider of a device, service, etc. or they may be established by a user through a user interface for a device, a service or a PED/FED in communication with a device, another device, a server or a service provider etc.

A "computer file" (commonly known as a file) as used herein may refer to, but is not limited to, a computer resource for recording data discretely in a computer storage device, this data being electronic content. A file may be defined by one of different types of computer files, designed for different purposes. A file can be opened, read, modified, copied, and closed with one or more software applications an arbitrary number of times. Typically, files are organized in a file system which can be used on numerous different types of storage device exploiting different kinds of media which keeps track of where the files are located on the storage device(s) and enables user access. The format of a file is typically defined by its content since a file is solely a container for data, although, on some platforms the format is usually indicated by its filename extension, specifying the rules for how the bytes must be organized and interpreted meaningfully.

A "wireless interface" as used herein may refer to, but is not limited to, an interface for a PED, FED, or Wearable Device which exploits electromagnetic signals transmitted through the air. Typically, these electromagnetic signals are microwave signals and/or RF signals.

A "wired interface" as used herein may refer to, but is not limited to, an interface for a PED, FED, or Wearable Device which exploits electrical signals transmitted through an electrical cable or cables. Typically, a wired interface involves a plug or socket on the electronic device which interfaces to a matching socket or plug on the electrical cable(s). An electrical cable may include, but not be limited to, coaxial cable, an electrical mains cable, an electrical cable for serial communications, an electrical cable for parallel communications comprising multiple signal lines, etc.

A "software development kit" (SDK) as used herein may refer to, but is not limited to, a collection of software development tools provided as an installable package. The SDK facilitates the creation of applications by having a compiler, debugger and perhaps a software framework. An SDK may be specific to a hardware platform and operating system combination. An SDK may take the form of an application programming interface (API) or APIs in the form of on-device libraries of reusable functions used to interface to a particular programming language, or it may be as complex as hardware-specific tools that can communicate with a particular embedded system. Common tools within an SDK include debugging facilities and other utilities, often presented in an integrated development environment (IDE).

0. Impulse Radio Ultra-Wideband System

As discussed supra UWB offers many potential advantages such as high datarate, low-cost implementation, and low transmit power, ranging, multipath immunity, and low interference. The Federal Communications Commission (FCC) regulations for UWB reserved the unlicensed frequency band between 3.1 GHZ and 10.6 GHZ for indoor UWB wireless communication system wherein the low regulated transmitted power allows such UWB systems to coexist with other licensed and unlicensed narrowband systems. Therefore, the limited resources of spectrum can be used more efficiently. On the other hand, with its ultra-wide bandwidth, an UWB system has a capacity much higher than the current narrowband systems for short range applications. Two possible techniques for implementing UWB communications are Impulse Radio (IR) UWB and multi-carrier or multi-band (MB) UWB. IR-UWB exploits the transmission of ultra-short (of the order of nanosecond) pulses, although in some instances in order to increase the processing gain more than one pulse represents a symbol. In contrast MB-UWB systems use orthogonal frequency division multiplexing (OFDM) techniques to transmit the information on each of the sub-bands. Whilst OFDM has several good properties, including high spectral efficiency, robustness to RF and multi-path interferences. However, it has several drawbacks such as up and down conversion, requiring mixers and their associated high power consumption, and is very sensitive to inaccuracies in frequency, clock, and phase. Similarly, non-linear amplification destroys the orthogonality of OFDM. Accordingly. MB-UWB is not suitable for low-power and low cost applications.

In contrast IR-UWB offers several advantages, including unlicensed usage of several gigahertz of spectrum, offers great flexibility of spectrum usage, and adaptive transceiver designs can be used for optimizing system performance as a function of the datarate, operation range, available power, demanded quality of service, and user preference. Further, multi-Gb/s data-rate transmission over very short range is possible and due to the ultra-short pulses within IR-UWB it is very robust against multipath interference, and more multipath components can be resolved at the receiver in some implementations, resulting in higher performance. Further, the ultra-short pulses support sub-centimeter ranging whilst the lack of up and down conversion allows for reduced implementation costs and lower power transceiver implementations. Beneficially, ultra-short pulses and low power transmissions make IR-UWB communications hard to eavesdrop upon.

An IR-UWB transmitter as described below in respect of embodiments of the invention in with reference to FIGS. 2 and 3 respectively exploits an on-demand oscillator following a pulse generator in order to up-convert the pulses from the pulse generated whilst avoiding the requirement of a separate mixer. Implementable in standard CMOS logic both the pulse generator and the on-demand oscillator are digitally tunable in order to provide control over the pulse bandwidth and center frequency. Further, by exploiting a digitally controlled ring oscillator for the on-demand oscillator the IR-UWB transmitter is designed to allow very quick frequency adjustments on the order of the pulse repetition rate (PRR). Beneficially this technique provides the same advantages as MB-OFDM in respect of spectrum configurability, achieved by sequentially changing the transmitted spectrum using a frequency hopping scheme, whilst maintaining the benefits of IR-UWB. Further, by providing advanced duty cycling with fast power up time combined with On-Off Shift Keying (OOK) modulation the IR-UWB according to embodiments of the invention allows significant reductions in power consumption by exploiting the low duty cycle of a UWB symbol and the fact that only half the symbols require sending energy.

In addition to defining the operating frequency range for UWB systems the different regulatory bodies all specify and enforce a specific power spectral density (PSD) mask for UWB communications. A PSD mask as may be employed in respect of embodiments of the invention is the FCC mask for which mask data are summarized in Table 1 below for the 3100 MHz-10600 MHz (3.1 GHz-10.6 GHz) range.

TABLE 1

FCC Masks for Indoor - Outdoor for Different Frequency Bands

| Frequency Range | Indoor EIRP Limit (dBm/MHz) | Outdoor EIRP Limit (dBm/MHz) |
| --- | --- | --- |
| <960 | —49.2 | −49.2 |
| 960-1610 MHz | −75.3 | −75.3 |
| 1610-1990 MHz | −53.3 | −63.3 |
| 1990-3100 MHz | −51.3 | −61.3 |
| 3100-10600 MHz | −41.3 | −41.3 |
| >10600 MHz | −51.3 | −61.3 |

Accordingly, it would be evident that the upper limit of −41.3 dB/MHz across the 3.1 GHz-10.6 GHz frequency range is the same limit imposed on unintentional radiation for a given frequency in order not to interfere with other radios. Basically, for a given frequency, the UWB radio operates under the allowed noise level which creates the relationship presented in Equation (1) between $E_p$, the transmitted energy per pulse, the maximum spectral power S, the bandwidth B, the bit rate $R_b$ and the number of pulses per bits $N_{ppb}$.

$$E_p \cdot N_{ppb} \cdot R_b \leq S \cdot B \quad (1)$$

The IEEE has published a few standards for a physical layer (PHY) for UWB radio in Personal Area Networks (IEEE 802.15.4a-2007), Body Area Networks (IEEE 802.15.4a-2007) and Radio-Frequency Identification (IEEE 802.15.4f-2012). These standards use mostly relatively large pulses resulting in relatively narrow bandwidth which is up-converted to a specific center frequency in order to fill predetermined channels. The data is encoded using pulse-position-modulation (PPM) and bi-phasic shift keying (BPSK) is used to encode redundancy data. Every bit consists of one or more pulses scrambled in phase depending on the target datarate. These standards allow considerable flexibility on channel availability and data rates. The standard also defines the preamble, headers for the data packet and ranging protocol.

These IEEE standards are designed with multiple users in mind and use different channels to transmit the data, thereby putting a heavy constraint on pulse bandwidth and limiting the transmitted energy. Prior art on non-standard transmitter attempts to make better use of the available spectrum by using narrow pulses, which therefore have a larger bandwidth thereby increasing the maximum transmitted energy according to Equation (1). Accordingly, these transmitters are non-standard and were also designed for different data rates, frequencies, pulse width, etc. Additionally, they also used various encoding schemes, most notably PPM, OOK or BPSK.

Within the work described below the inventors have established improvements with respect to UWB systems, UWB transmitters and energy based UWB receivers which are capable of generating and adapting to a variety of IR-UWB pulses and bit encoding schemes thereby supporting communications from both IR-UWB transmitters compliant to IEEE standards as well as those that are non-standard. These improvements are made with respect to UWB transmitters, UWB receivers, UWB transceivers and UWB systems such as those described and depicted by the inventors within WO/2019/000,075 "Energy Efficient Ultra-Wideband Impulse Radio Systems and Methods" (PCT/CA2018/000,135 filed Jun. 29, 2018), WO 2016/191,851 "Systems and Methods for Spectrally Efficient and Energy Efficient Ultra-Wideband Impulse Radios with Scalable Datarates" (PCT/CA2016/000,161 filed May 31, 2016), and WO/2015/103,692 "Systems and Methods Relating to Ultra-wideband Broadcasting comprising Dynamic Frequency and Bandwidth Hopping" (PCT/CA2015/000,007, filed Jan. 7, 2015).

1. IR-UWB Transmitter Circuit

Figure 2:
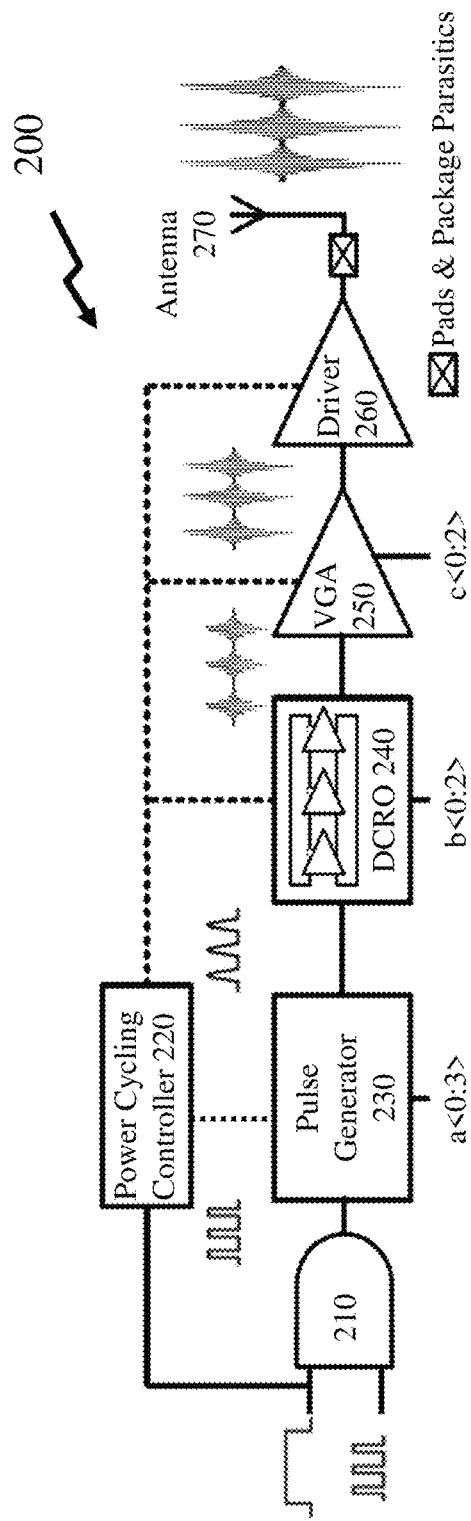
FIG. 2 depicts a block diagram of a UWB transmitter according to an embodiment of the invention.

Referring to FIG. 2 there is depicted schematically an exemplary architecture for an IR-UWB transmitter 200 according to embodiments of the invention which is composed of five main blocks plus the antenna. First a programmable impulse is produced by a pulse generator 230 at clocked intervals when the data signal from AND gate 210 is high based upon control signals presented to the AND gate 210. The pulses from the pulse generator 230 are then up-converted with a programmable multi-loop digitally controlled ring oscillator (DCRO) 240. The output from the DCRO 240 is then coupled to a variable gain amplifier (VGA) 250 in order to compensate for any frequency dependency of the pulse amplitude. Finally, a driver 260 feeds the antenna 270, overcoming typical package parasitics, such as arising from packaging the transceiver within a quad-flat no-leads (QFN) package. In order to further reduce the power consumption of the IR-UWB transmitter (IR-UWB-Tx) 200 according to embodiments of the invention a power cycling controller 220 dynamically switches on or off these functional blocks when the data signal is low.

Figure 3A:
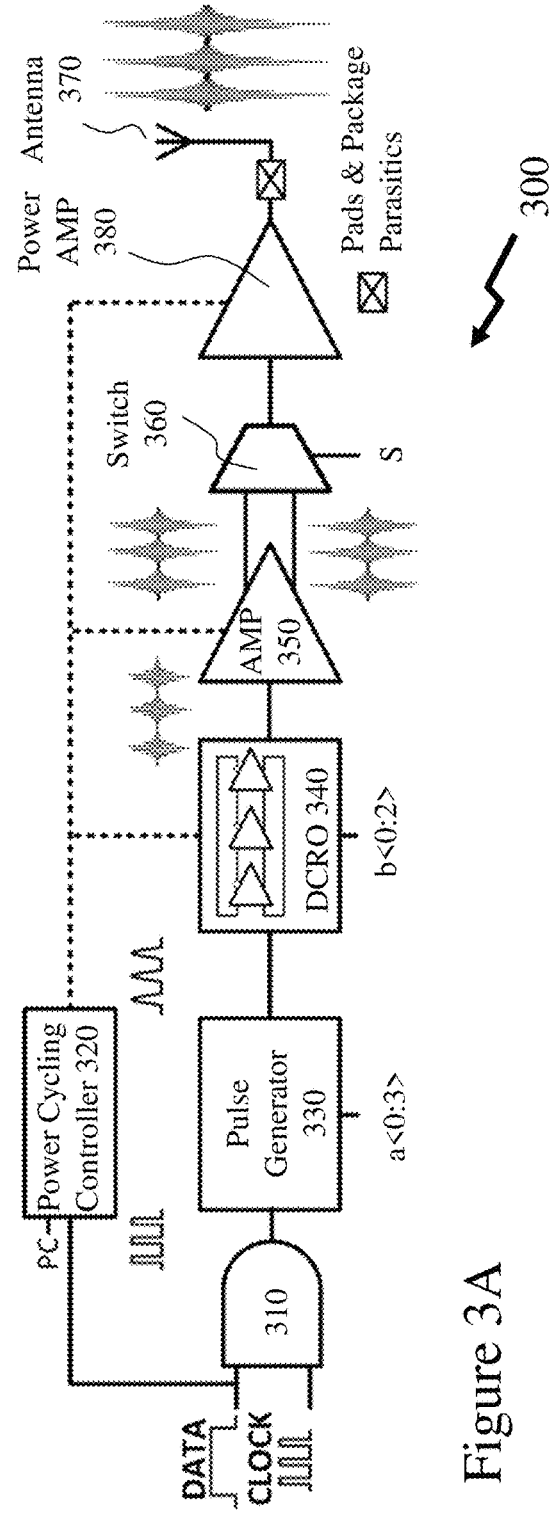
FIG. 3A depicts a block diagram of a UWB transmitter according to an embodiment of the invention supporting biphasic phase scrambling.

Now referring to FIG. 3A there is depicted schematically a block diagram 300 of an exemplary IR-UWB transmitter according to embodiments of the invention supporting biphasic phase scrambling. In comparison to the IR-UWB transmitter 200 in FIG. 2 for an IR-UWB according to embodiments of the invention without biphasic phase shifting rather than being composed of five main blocks plus the antenna the Biphasic Phase Shifting IR-UWB (BPS-IR-UWB) transmitter comprises 6 main blocks. First a programmable impulse is produced by a pulse generator 330 at clocked intervals when the data signal from AND gate 310 is high based upon control signals presented to the AND gate 310. The pulses from the pulse generator 330 are then up-converted with a programmable multi-loop digitally controlled ring oscillator (DCRO) 340. The output from the DCRO 340 is then coupled to a dual-output amplifier (VGA) 350 both in order to compensate for any frequency dependency of the pulse amplitude but also to generate dual phase shifted output signals that are coupled to a switch 360 which selects one of the two signals to couple to the output power amplifier (driver) 380 under the action of the switch control signal "S" applied to the switch 360. Note that a similar phase selection scheme could be implemented by affecting the startup conditions for DCRO 340 in order to provide the two phases. This would preclude the need for switch 360 at the cost of an added control startup condition control signal on DCRO 340.

The output power amplifier 380 feeds the antenna 370, overcoming typical package parasitics, such as arising from packaging the transceiver within a quad-flat no-leads (QFN) package. In order to reduce the power consumption of the BPS-IR-UWB transmitter represented by block diagram 300 according to an embodiment of the invention a power cycling controller 320 dynamically switches on or off these functional blocks when the data signal "PC" is low. Accordingly, a BPS-IR-UWB transmitter according to embodiments of the invention transmits pulses with or without phase shift based upon the control signal "S" applied to switch 360. If this control signal is now fed from a random data generator or a pseudo-random data generator then the resulting pulses coupled to the antenna of the BPS-IR-UWB transmitter will be pseudo-randomly or randomly phase shifted.

Figure 3B:
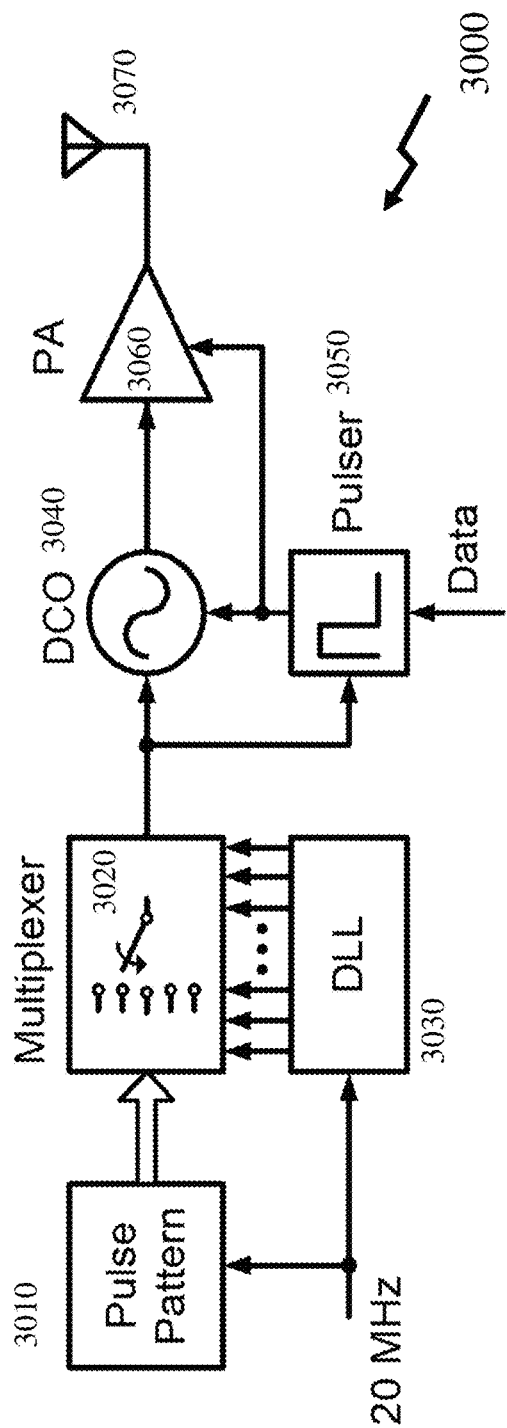
FIG. 3B depicts a block diagram of a UWB transmitter according to an embodiment of the invention employing dynamically configurable and programmable pulse sequences.

Now referring to FIG. 3B there is depicted schematically a block diagram 3000 of an exemplary IR-UWB transmitter according to embodiments of the invention. As depicted a Pulse Pattern block 3010 holds a configuration for the pulses used to represent the current symbol. From the symbol-rate clock (i.e. 20 MHZ), multiple phases are generated by a Delay Locked Loop (DLL) 3030. The rising edge of each clock phase represents the start of one pulse in the symbol pulse bundle. A multiplexer 3020 is triggered by the edges of the clock phases and selects the configuration of the current pulse out of the Pulse Pattern block 3010. A pulse generator (Pulser) 3050 generates pulses with a pulse width set by the multiplexer 3020 and enables the Digitally Controlled Oscillator (DCO) 3040 and Power Amplifier (PA) 3060. When enabled, the DCO 3040 generates a Gaussian shaped pulse with frequency set by the multiplexer 3020, which is then amplified by the PA 3060 and radiated by the antenna 3070.

Accordingly, the Pulse Pattern block 3010 establishes the pulses for a symbol or sequence of symbols. In this manner updating the Pulse Pattern block 3010 adjusts the pulse sequence employed for each symbol and accordingly the Pulse Pattern block 3010 may be dynamically updated based upon one or more factors including, but not limited to, network environment data, predetermined sequence, date, time, geographic location, signal-to-noise ratio (SNR) of received signals, and regulatory mask.

Figure 3C:
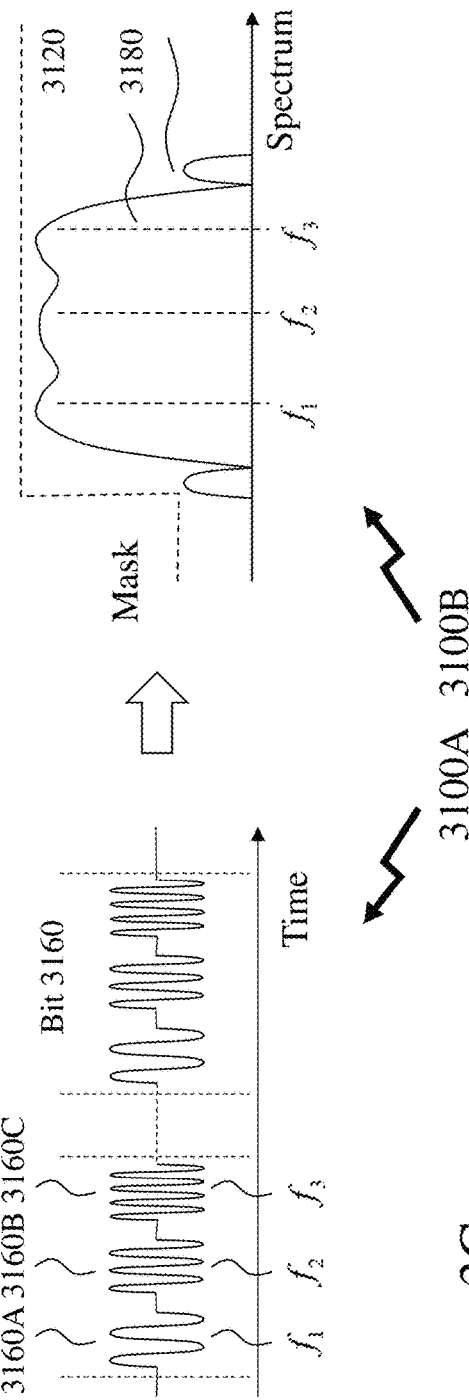
FIG. 3C depicts schematically a multi-pulse symbol UWB protocol according to an embodiment of the invention.

Referring to FIG. 3C there is depicted schematically a multi-pulse symbol UWB protocol according to an embodiment of the invention. Referring to first image 3100A there is depicted a bit 3160 comprising a series of sub-pulses 3160A to 3160C which are each at frequencies $f_1$; $f_2$; $f_3$. Accordingly, the multi-pulse spectrum 3180 of a symbol (bit 3160) is depicted in second image 3100B as obtained conceptually (phase scrambling is omitted for clarity) by summing the individual pulse spectra of the sub-pulses 3160A to 3160C, which increases the bandwidth whilst increasing the total symbol duration, in contrast with single-pulse prior art methods, whilst maintaining the maximum power below the UWB mask 3120. This allows the symbol energy to be maximized while relaxing the timing requirements and level of synchronization required at the receiver. An arbitrary number of pulses with different sets of parameters may be included within a bundle to tailor the pulse spectrum to a given requirement.

Figures 3D, 3E:
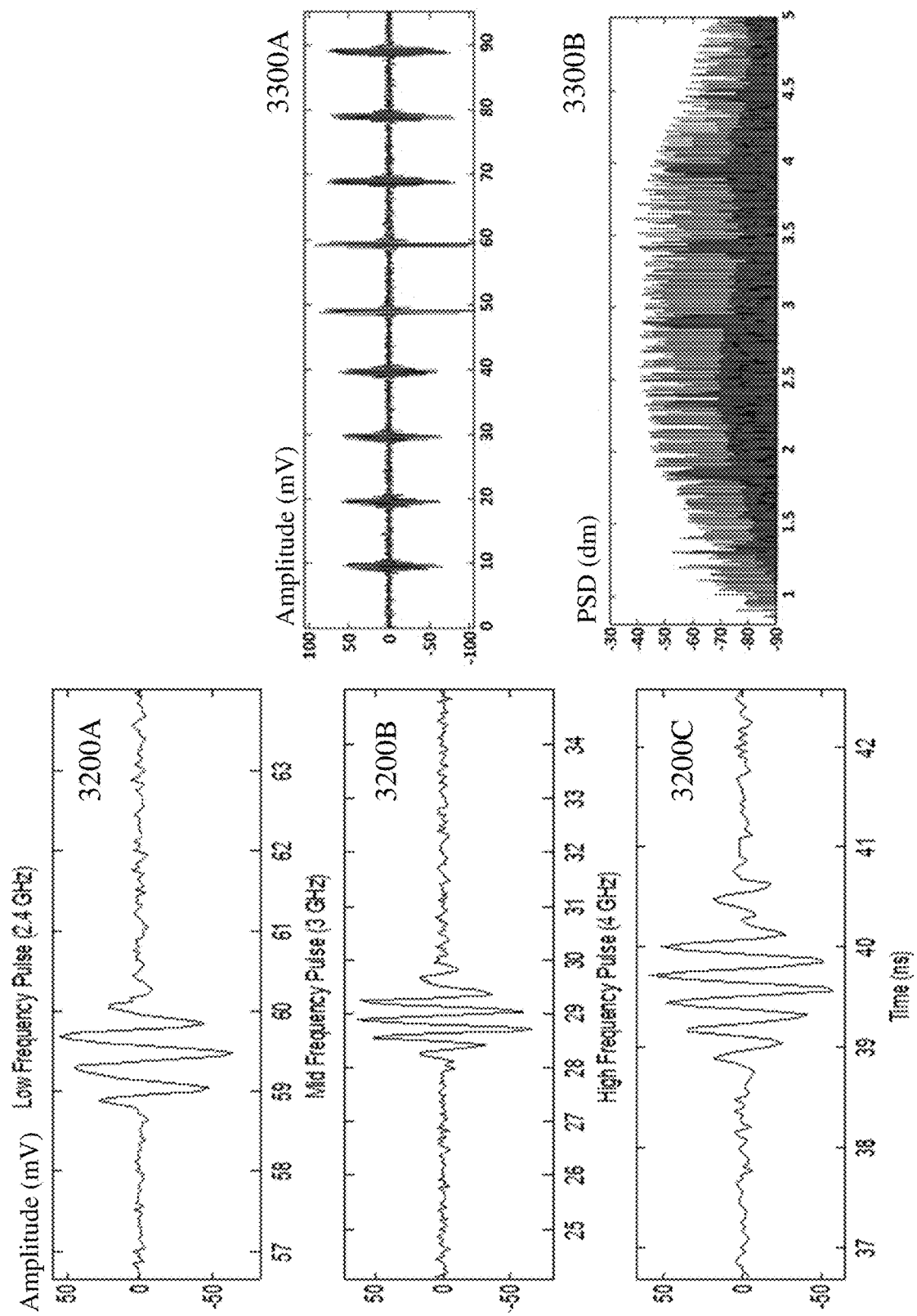
FIG. 3D depicts pulses from a UWB transmitter according to an embodiment of the invention at three different frequencies.
FIG. 3E depicts a pulse sequence for a bit transmitted by a UWB transmitter according to an embodiment of the invention together with its emitted power spectrum.

Now referring to FIG. 3D there are depicted the measured pulse shapes for three different frequency setting of a UWB transmitter according to an embodiment of the invention such as described and depicted in FIG. 2 or FIG. 3A without biphasic phase scrambling according to WO/2015/103,692. First to third traces 3200A to 3200C respectively representing single pulses at 2.4 Ghz, 3 GHZ, and 4 GHZ respectively.

Referring to FIG. 3E there is depicted in first trace 3300A a pulse bundle representing a bit being transmitted such as described within WO/2015/103,692 is depicted whilst second trace 3300B depicts the resulting power spectrum density (PSD). It is evident that this allows for managing the PSD of the final signal through the parameters for each pulse within the frequency hopping sequence. The pulse sequence depicted comprising 4 pulses at 2.4 GHz, 2 pulses at 3.5 GHZ, and 3 pulses at 4.0 GHz. The resulting PSD fills the spectrum at around −58 dBm over the entire band.

Figure 3F:
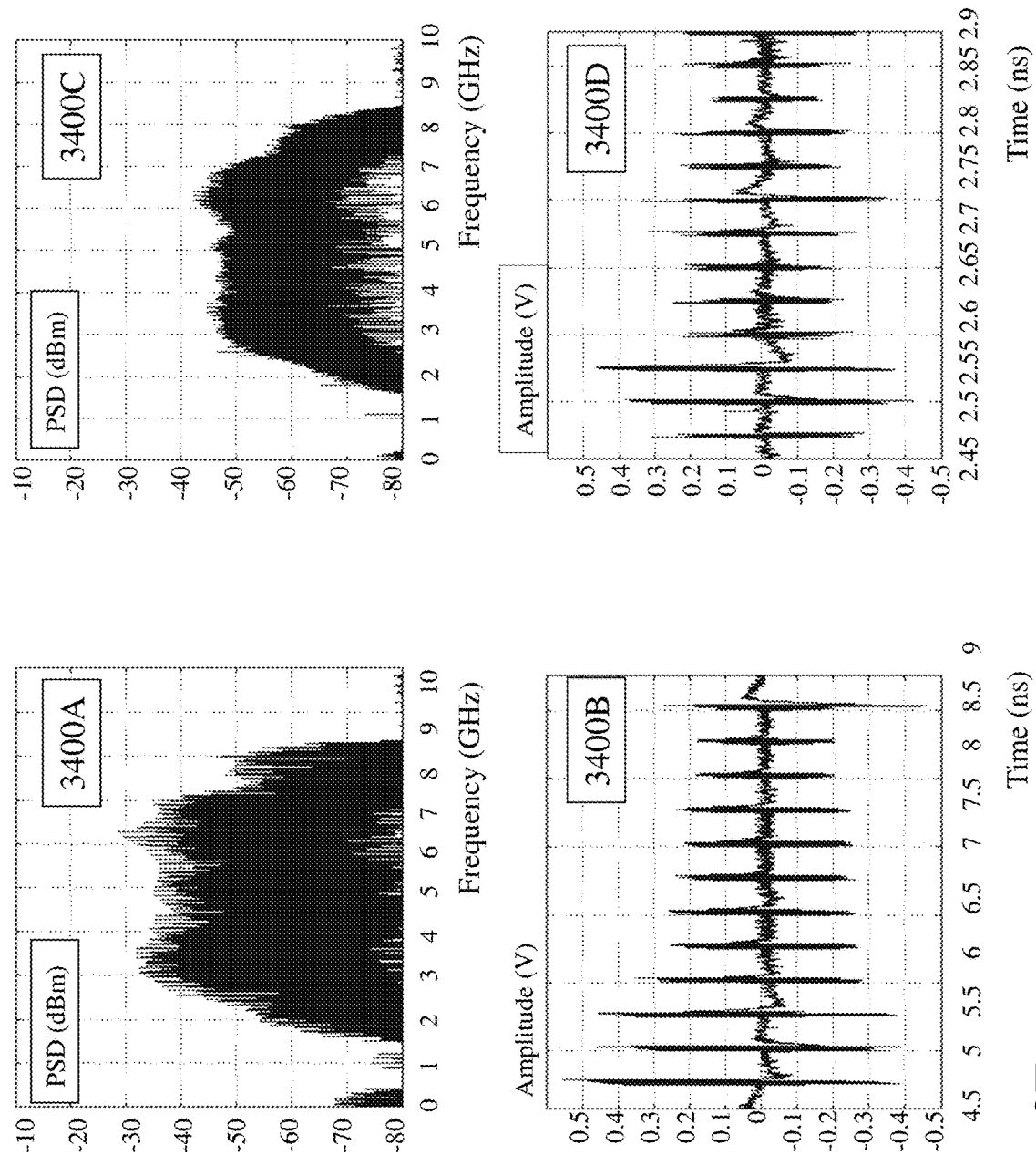
FIG. 3F depicts a pulse sequence for a bit transmitted by a UWB transmitter according to an embodiment of the invention together with its emitted power spectrum with and without biphasic phase scrambling.

Now referring to FIG. 3F there are depicted the power spectrum and pulse train for a pulse bundle according to WO 2016/191,851 and as depicted in FIG. 3A supporting operating over a frequency range from approximately 3 GHz to approximately 7 GHz. First and second images 3400A and 3400B respectively representing the power spectrum and pulse sequence wherein there is no random frequency or phase scrambling during the generation and transmission. Third and fourth images 3400C and 3400D depict the results for random frequency and random phase scrambling of the pulses wherein phase is set per pulse through data established by a pseudo-random data generator. Accordingly, it would be evident that when comparing first and third images 3400A and 3400C that the introduction of random frequency and random phase shifting reduces the spectral lines significantly within the emitted spectrum of a UWB transmitter according to embodiments of the invention.

2. IR-UWB Receiver

Figure 4:
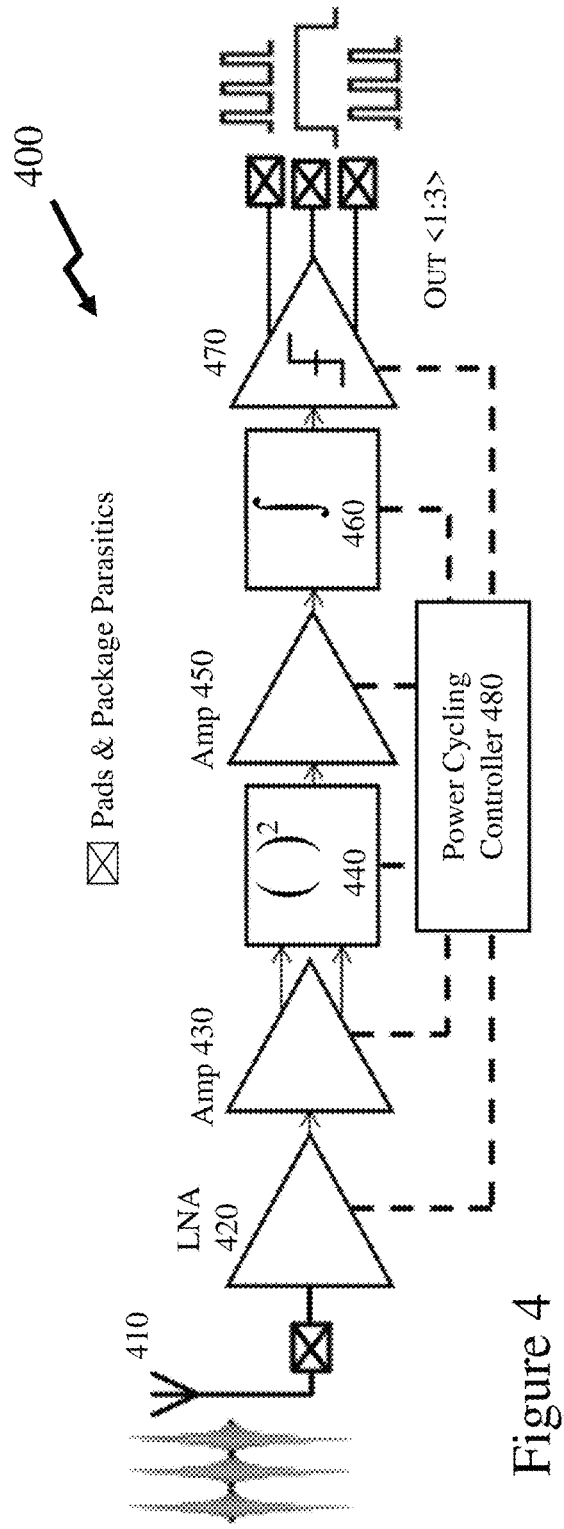
FIG. 4 depicts a block diagram of a UWB receiver according to an embodiment of the invention.

Referring to FIG. 4 there is depicted schematically the architecture of an IR-UWB receiver 400 according to embodiments of the invention. Accordingly, the signal from an IR-UWB transmitter is received via an antenna 410 and coupled to a low noise amplifier (LNA) 420 followed by first amplifier 430 wherein the resulting signal is squared by squaring circuit 440 in order to evaluate the amount of energy in the signal. The output of the squaring circuit 440 is then amplified with second amplifier 450, integrated with integration circuit 460 and evaluated by a flash ADC 470 to generate the output signals. Also depicted is Power Cycling Controller 480 which, in a similar manner to the power cycling controller 220 of IR-UWB transmitter 200 in FIG. 2, dynamically powers up and down the LNA 420, first and second amplifiers 430 and 450 respectively, squaring circuit 440, and flash ADC 470 to further reduce power consumption in dependence of the circuit's requirements.

Figure 5:
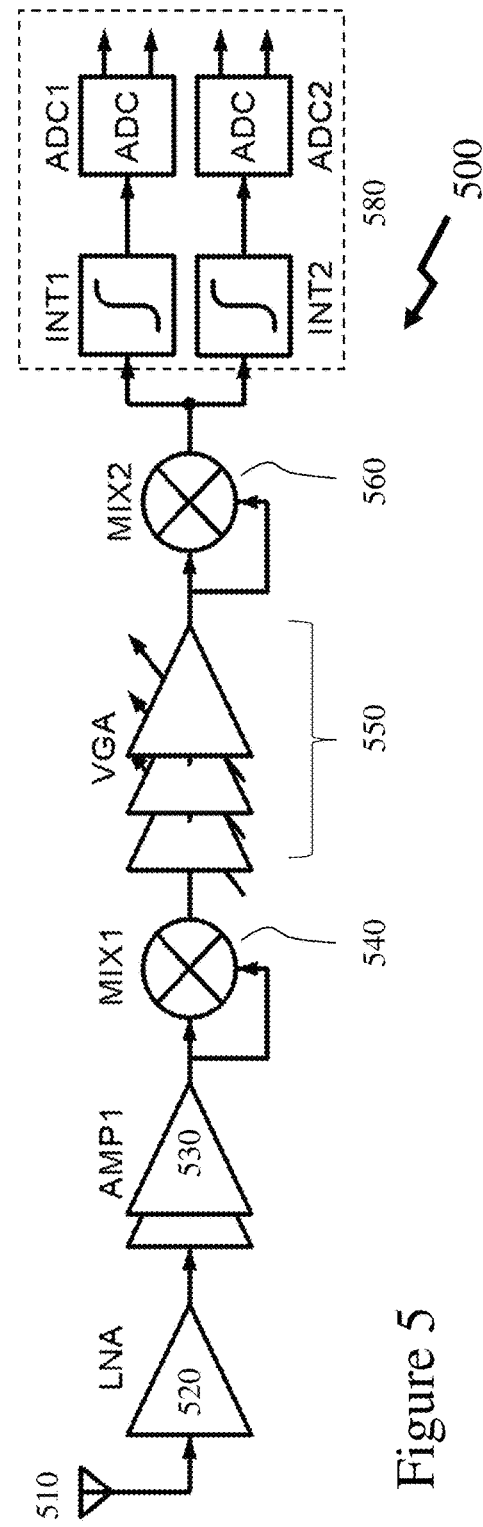
FIG. 5 depicts a receiver circuit schematic for a UWB receiver/transceiver according to an embodiment of the invention.

Referring to FIG. 5 there is depicted a schematic of a receiver 500 according to an embodiment of the invention. The RF signal from the antenna 510 is initially amplified by a Low Noise Amplifier (LNA) 520 before being passed to a two stage RF amplifier (AMP1) 530. A first squaring mixer (MIX1) 540 multiplies the signal with itself to convert to the Intermediate Frequency (IF). A three-stage Variable Gain Amplifier (VGA) 550 amplifies the signal further and implements a bandpass filter function. The VGA 550 output is then coupled to a second squaring mixer (MIX2) 560 which down-converts the signal to the baseband frequency. A parallel integrator (INT1 and INT2) sums the signal energy, which is digitized by the Analog-to-Digital Converters (ADC1 and ADC2) and sent to a digital processor (not depicted for clarity).

3. IR-UWB Receiver

As described within WO/2019/000,075 and WO 2016/191,851 the inventors have established design parameters of millisecond range start-up time from sleep mode and microsecond range start-up time from idle mode by establishing a custom integrated DC/DC converter and duty cycled transceiver circuitry that enables fast circuit start-up/shut-down for optimal power consumption under low (1 kbps) and moderate data rates (10 Mbps).

Figure 6:
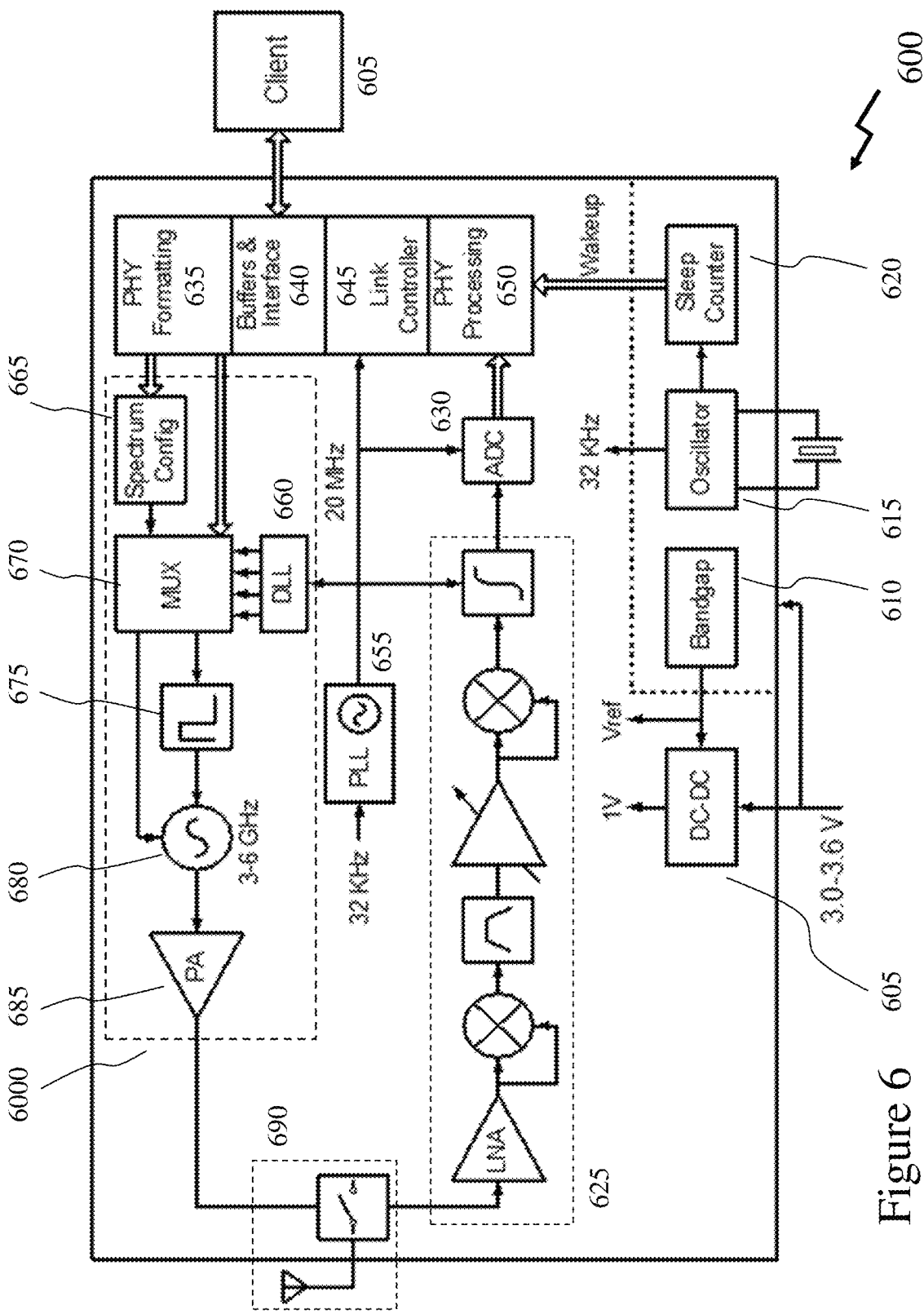
FIG. 6 depicts a circuit schematic for a UWB transceiver according to an embodiment of the invention.

In order to sustain good energy efficiency, the elements of a total UWB transceiver, such as depicted with transceiver 600 in FIG. 6 according to embodiments of the invention, has been designed for low static sleep current and fast startup/sleep times. Referring to FIG. 6, a battery ($3.0V \leq V_{BATT} \leq 3.6V$) (not depicted for clarity) powers a low-frequency crystal oscillator 615, sleep counter 620 and bandgap reference 610, all of which are typically always operational although the bandgap reference 610 could be duty cycled within other embodiments of the invention without altering the scope of the claimed invention). Their power consumption limits the minimum power consumption of the system to sub-microwatt level. An integrated buck DC-DC converter 605 is powered by the battery when the system is not in sleep mode, and this provides the supply voltage to the rest of the system with high conversion efficiency. The startup time of the DC-DC converter 605 is on the order of several symbol periods in order to minimize wasted energy. Between sleep periods, the PLL 655 is active to provide the base clock for the system. The receiver 625 and DLL 660 have dedicated power down controls and are only activated during frame transmission/reception. Further, the transmitter is also power cycled through its all-digital architecture which is not depicted as having a separate control. The power consumption of the digital synthesized blocks is low due to the low base clock (e.g. 20 MHZ).

In principle, a power-cycled transceiver achieves linear scaling of power consumption with datarate, thus achieving constant energy efficiency. With a fixed frame size, multiple data rates are obtained by adjusting the length of the sleep period, with the maximum attainable datarate determined by the symbol rate in the frame itself. In order to preserve energy efficiency, the power consumption during sleep must be lower than the average power consumption. For high data rates, powering down the PLL is not required when its consumption does not significantly degrade the overall efficiency. For low data rates, the whole system except the bandgap reference, crystal oscillator, and sleep counter can be shut down during sleep mode. In this case, the millisecond range startup time of the PLL can be insignificant compared to the sleep period, and overall efficiency is also not significantly degraded.

As depicted the UWB transceiver 600 also comprises a receive/transmit switch 690 coupled to the antenna to selectively couple the transmitter 6000 or receiver 625 to the antenna during transmission and reception respectively. The UWB transceiver 600 also comprises a spectrum configuration circuit 665 (equivalent to Pulse Pattern 3010 in transmitter 3000 in FIG. 3B), PHY Processing circuit 650, Link Controller 645, Buffer and Interface circuit 640, and PHY Formatting circuit 635. The UWB transceiver 600 communicates via Link Controller 645 to the Client 605. As such, Link Controller 645 may communicate using a wired protocol (e.g., serial peripheral interface (SPI)) to Client 605, for example.

Within the following description with respect to embodiments of the invention reference is made to UWB transmitters, UWB receivers, and UWB transceivers. The inventors have described such devices within WO/2020/186,332 "Methods and Systems for Ultra-wideband Receivers"; WO/2020/186,334 "Ultra-wideband Link Configuration Methods and Systems"; WO/2020/186,333 "Ultra-wideband Transmitter and Receiver Circuits"; U.S. Ser. No. 17/201,475 "Energy Efficient Ultra-Wideband Impulse Radio Systems and Methods"; U.S. Ser. No. 16/261,860 "Systems and Methods for Spectrally Efficient and Energy Efficient Ultra-Wideband Impulse Radios with Scalable Datarates"; and U.S. Ser. No. 16/938,208 "Methods and Systems Relating to Ultra-wideband Broadcasting", the entire content of which are incorporated herein by reference.

Within UWB transmitters, UWB receivers, and UWB transceivers (hereinafter referred to as UWB Devices which may refer to a transmitter and transceiver or receiver and transceiver as would be evident to one of skill in the art by the function being described with respect to them) as described by the inventors within the above referenced patents each UWB Device has its own hopping sequence. Within embodiments of the invention this hopping sequence for each UWB Device increments by 1 at each transmission. Accordingly, for a UWB Device to listen to another UWB Device it must know the hopping sequence of the transmitting UWB device. An advantage of this approach is that it is easy to configure devices and for such configured devices to be certified. However, a disadvantage of this is that each device has a channel hopping object defining its channel hoping sequence.

Figure 7:
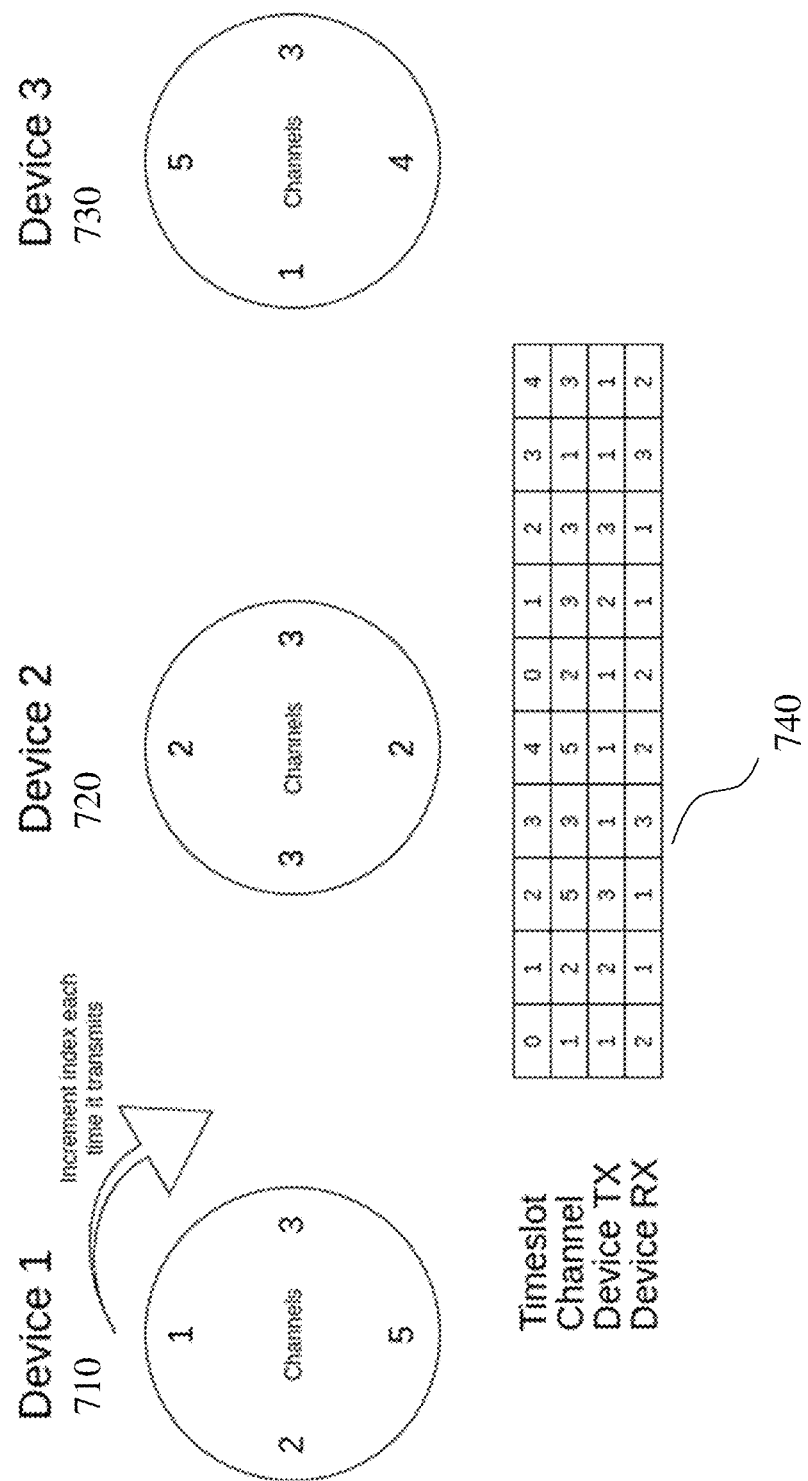
FIG. 7 depicts a frequency hopping configuration for UWB devices according to an embodiment of the invention.

FIG. 7 depicts a frequency hopping configuration for UWB devices according to this embodiment of the invention where the index of the channel hopping sequence is incremented for each transmission by a UWB Device. Accordingly, FIG. 7 depicts 3 Device 1 710, Device 720 and Device 730 together with their channel array sequences. Table 740 denotes a series of time slots together with a channel associated with that time slot together with which device can transmit and which can receive in that particular timeslot.

Accordingly, if we consider that a UWB Device may be communicating 12 other UWB Devices then it will require 12 arrays to be updated when there is a change, i.e. when each UWB Device transmits. Maintaining these arrays is difficult and particularly so when these have to updated in real time during runtime of each UWB Device. Accordingly, there is no global view of the RF channels on the network comprising these devices. If a UWB Devices timeslot is changed then it will be necessary to change its channel hopping array to keep the desired sequence over the air.

Accordingly, the inventors propose that alternatively the channel hopping sequence is known by every device in the network. Every UWB Device frequency index hops according to the same array. The index hop is determined by the timeslot number of the device. For example, if Device 1 710 is done listening on timeslot #3, sleeps on timeslot #4 and then listens again on timeslot #5, then it will increment the hop index by 2.

Accordingly, for example, if the network is hopping on a 6 channel sequence, then number of timeslots might not be a multiple and accordingly the device's channels will shift. However, the device will still hop over X channels, but it will not necessarily be the same X channels over and over again. Within a current implementation, if the device has Y channels within its array of hop frequencies, but the whole network has Z channels, then it is impossible for the device to transmit on some channel(s) (assuming Y<Z) as it or they are not in its array of hop frequencies.

Figure 8:
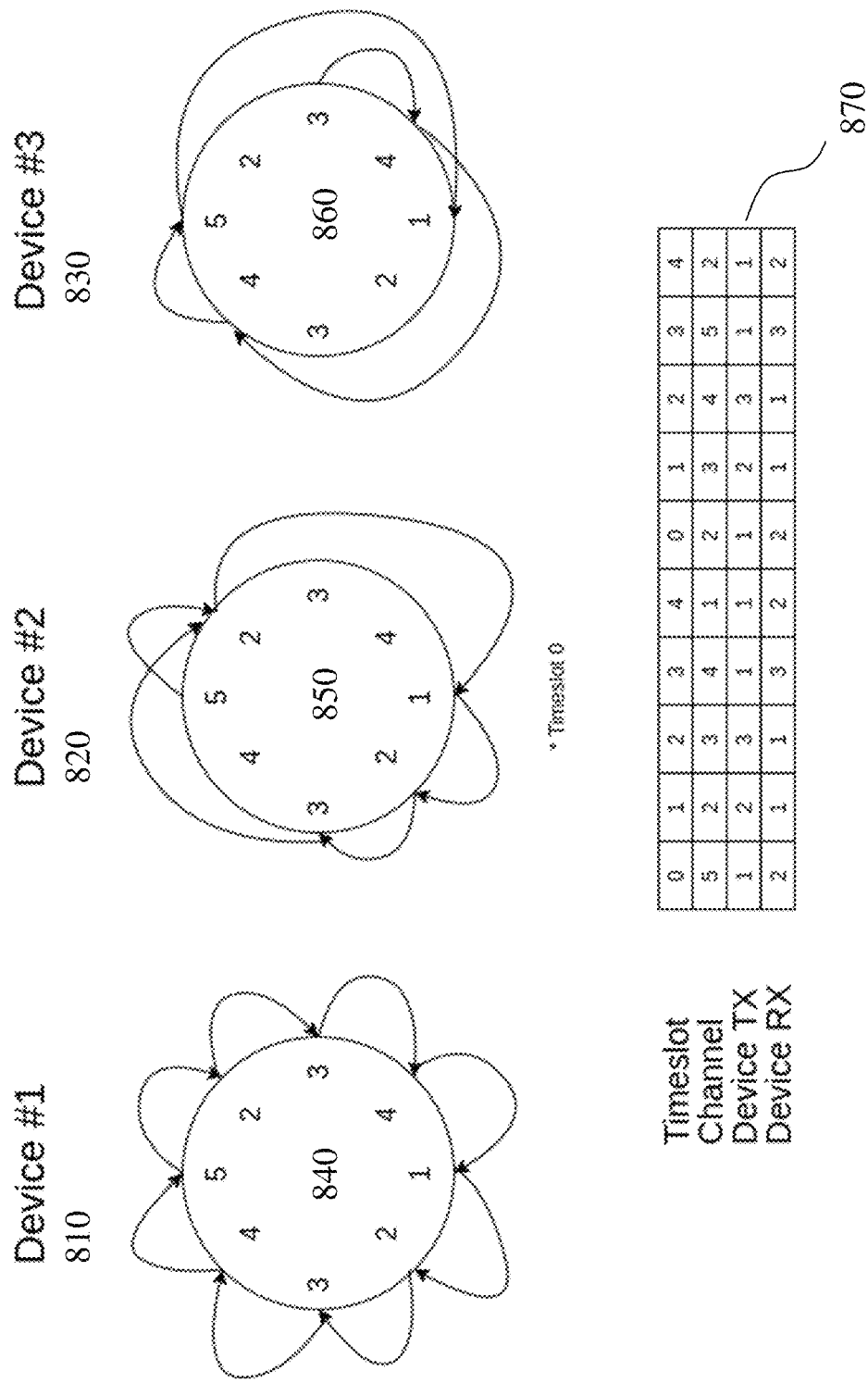
FIG. 8 depicts a frequency hopping configuration for UWB devices according to an embodiment of the invention.

Hence, referring to FIG. 8 there is depicted a frequency hopping configuration for UWB devices according to an embodiment of the invention wherein Device 1 810, Device 2 820, Device 3 830 are depicted together with their channel arrays, which are identical, namely first to third channel arrays 840 to 860 respectively. Table 870 depicts the same time slot and channel sequence together with the identity of which device is transmitting and which is receiving. Accordingly, the arrows depicted around each of the channel arrays show the resulting migration of an index pointer within each of the channel arrays as the time slots advance. As noted above through factors such as sleep, not receiving, not transmitting etc. the hop sequence is different for each device. As depicted for Device 1 810 the sequence is 5,2,3,4,1,2,3,4,5 where Device 1 810 transmits on the first timeslot, fourth to six timeslots and ninth and tenth timeslots and receives on the second, third, seventh and eighth timeslots. Device 2 820 transmits on the second and seventh timeslots whilst receiving on the first, fifth, sixth and tenth timeslots. Device 3 830 transmits on the third and eighth timeslots and received on the fourth and ninth timeslots. Accordingly, the resulting frequency sequence for Device 2 820, which operates on 6 timeslots, becomes channels 5,2,1,2,3,2 and for Device 3 which operates on 4 timeslots, becomes channels 3,4,4,5.

Now, as every device in the network shares the same channel sequence array, it is easier in runtime to update it via a beacon. For example, this allows the network to react to an unusable channel.

Both embodiments described and depicted with respect to FIGS. 7 and 8 can be employed with a separate channel for transmitting and a different channel to receive an automatic reply. However, in later case in FIG. 8 this requires that there are 2 channel hopping instances, transmit and receiving automatic replies whilst within the former case in FIG. 7 the requirement is for 2N channel hoping sequences where N is the number of devices within the network. Accordingly, it is evident that the latter implementation in FIG. 8 is easier to maintain and accommodates different numbers of devices within the network.

Accordingly, a beacon transmission from a master UWB Device may distribute the channel hopping sequence via broadcast (or other mechanism) to allow dynamic network updates. This allows also for the channel hopping sequence to less hard coded than dynamically coded. As such a UWB Device may initially listen, obtain the beacon signal with the channel plan, update its array and beginning transmitting/receiving within the network.

Within embodiments of the invention UWB Devices may be employed in conjunction with a Software Development Kit (SDK). Embodiments of the invention may employ or provide an SDK comprising, typically as a minimum:
SDK Base Features (such as logger, error checks, etc.).
A wireless protocol stack (WPS).
The SDK may also comprise one or more of:
An audio framework for exchanging audio between UWB Devices.
A ranging core for ranging functionality between UWB Devices.
Demonstration (demo) applications (associated within an evaluation kit (EVK) for example, an application launcher, and presets).
Example applications (e.g. SDK Usage)
Hardware support (e.g. a board support package (BSP) containing hardware-specific drivers and other routines to allow an operating system to function with a particular hardware environment).
Documentation.
Metadata.

Within embodiments of the invention the wireless protocol stack (WPS) may support synchronized UWB transmission links (synchronized links) with variable datarate, variable RF settings, a "Stop-and-Wait Automatic Repeat Request" (ARQ), channel hopping, frame statistics and a public API.

The audio framework of the SDK may enable a range of audio applications based upon allowing configuration for unidirectional operation, bidirectional operation, configurable stream quality (e.g. using sampling rate conversion), controllable volume amplitude, and clock tracking and correction.

SDKs according to embodiments of the invention may support a WPS Concurrency Mechanism as well as WPS Multiple Radio Support. These SDKs according to embodiments of the invention may enable the UWB Device with an EVK hardware to provide an RF module which receives data from/provides data to an external electronic device, e.g. PED, FED, Wearable Device, Sensor, etc. through a standard interface such as Serial Peripheral Interface (SPI), universal asynchronous receiver-transmitter (UART), etc.

In order to provide the WPS Concurrency Mechanism the UWB Devices according to embodiments of the invention provide the required features of:
Time division multiple access (TDMA) where radio transfers occur in time at a similar rate and of an identical duration in each network (typically capacity limits provide for 15-25% of the time slots to be left empty for retransmission purposes;
Frequency division multiple access (FDMA) where each network is cycling through available bands in a periodic manner in a different order. For example, network 1 cycles 0-2-1-4-3 whilst network 2 cycles 4-1-3-2-0.
Clear channel assessment (CCA) where at the time of a scheduled transmission, the transmission will be delayed for a maximum time equal to the frame airtime in all networks if it is detected that another device transmitting. The total duration of the time slot is the same and the CCA threshold is fixed.
Address filtering wherein hardware address filtering at the UWB Device's PHY layer level is enabled to reject the reception of a frame from another network.
Syncword filtering where networks operate on different syncwords to ensure the rejection of a frame from another network (the syncword being used to synchronize a data transmission, for example by indicating the end of header information and the start of data).
Random datarate offset where the period of every time slot changes slightly in time in every network to ensure a pseudo random offset within the link synchronizations.
The received signal strength indicator (RSSI) of each radio (UWB Device) is collected during frame reception. Typically, the radio with the strongest signal is selected to reply with an acknowledge and from which to consume frames.

The inventors have established WPS ranging demonstrations, WPS audio demonstrations and concurrency with WPS audio demonstrations. The inventors have also established graphical user interface (GUI) link configuration tools for user to employ providing extended advanced modes of operation, RF parameters control, schedule control, network control.

The inventors have established a Wireless Sensor Node (WSK) such as described below in respect of FIG. 11 providing demonstration of compatibility with Internet-of-Things (IoT) concepts as well as providing support for spatial awareness (e.g., within application such as drones etc.) and star network topologies. Further the SDK provides support for audio broadcasting and audio multicasting.

Embodiments of the invention at the UWB Device, SDK, and Hardware Development Kit (HDK), with respect to audio, have the functionality to provide:
Piggyback data;
Compression;
Fallback;
High-rate stream (>48 kHz, >16 bits);
Inter-IC Sound (I2S) serial bus interface;
Audio mixing wherein a receiver mixes multiple incoming independent streams of data;
Precision timestamping via clock drift detection.

Embodiments of the invention at the UWB Device and WPS have the functionality to provide:
A fallback mode; and
Packet fragmentation.

Figure 10B:
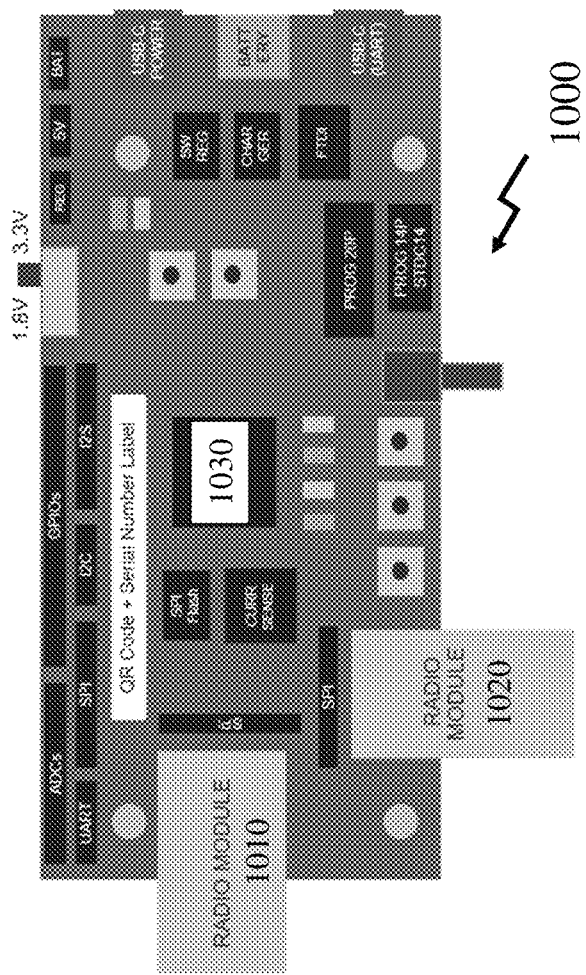
FIG. 10B depicts an exemplary top level schematic of a hardware development kit (HDK) according to an embodiment of the invention supporting UWB devices and software development kit (SDK) according to embodiments of the invention with radio modules employing UWB transceiver.
Figure 10A:
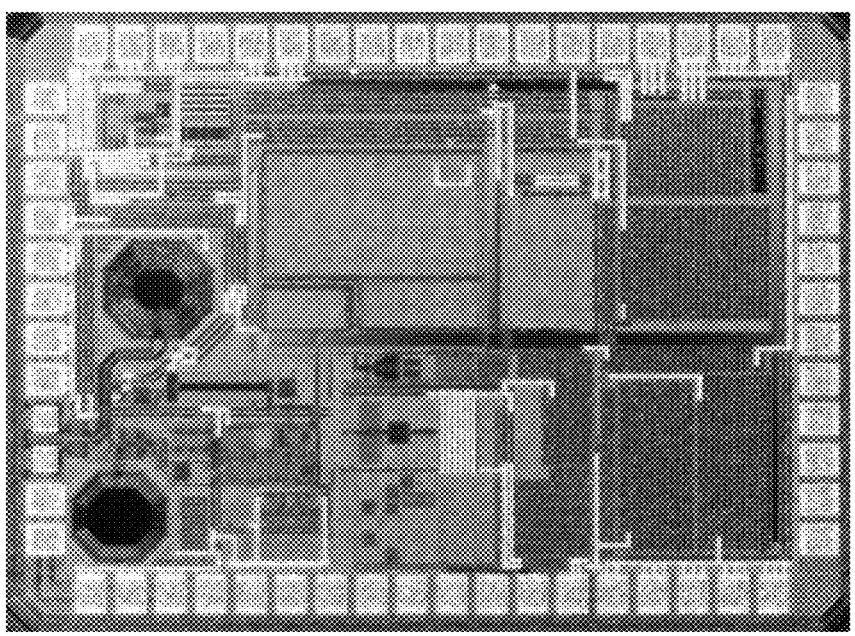
FIG. 10A depicts an optical micrograph of an application specific integrated circuit (ASIC) embodiment of a UWB transceiver according to an embodiment of the invention as depicted in FIG. 7.

FIG. 10A depicts an optical micrograph of an application specific integrated circuit (ASIC) embodiment of a UWB transceiver according to an embodiment of the invention as depicted in FIG. 7. Embodiments of this circuit with a second generation iteration of the underlying design have yielded ~4-5 dB receiver sensitivity improvement (−80 dBm), 4-5 dB increase in transmitter maximum output power, operational support for 1.2V I/O, datarates to 40.96 Mb/s, improved modulation for ISI and time domain efficiency as well as supporting antenna diversity. A typical implementation of the UB transceiver of FIG. 7 as depicted in FIG. 10A operates over 6.1 GHZ-9.3 GHz with ~10 dB bandwidth.

Figure 9:
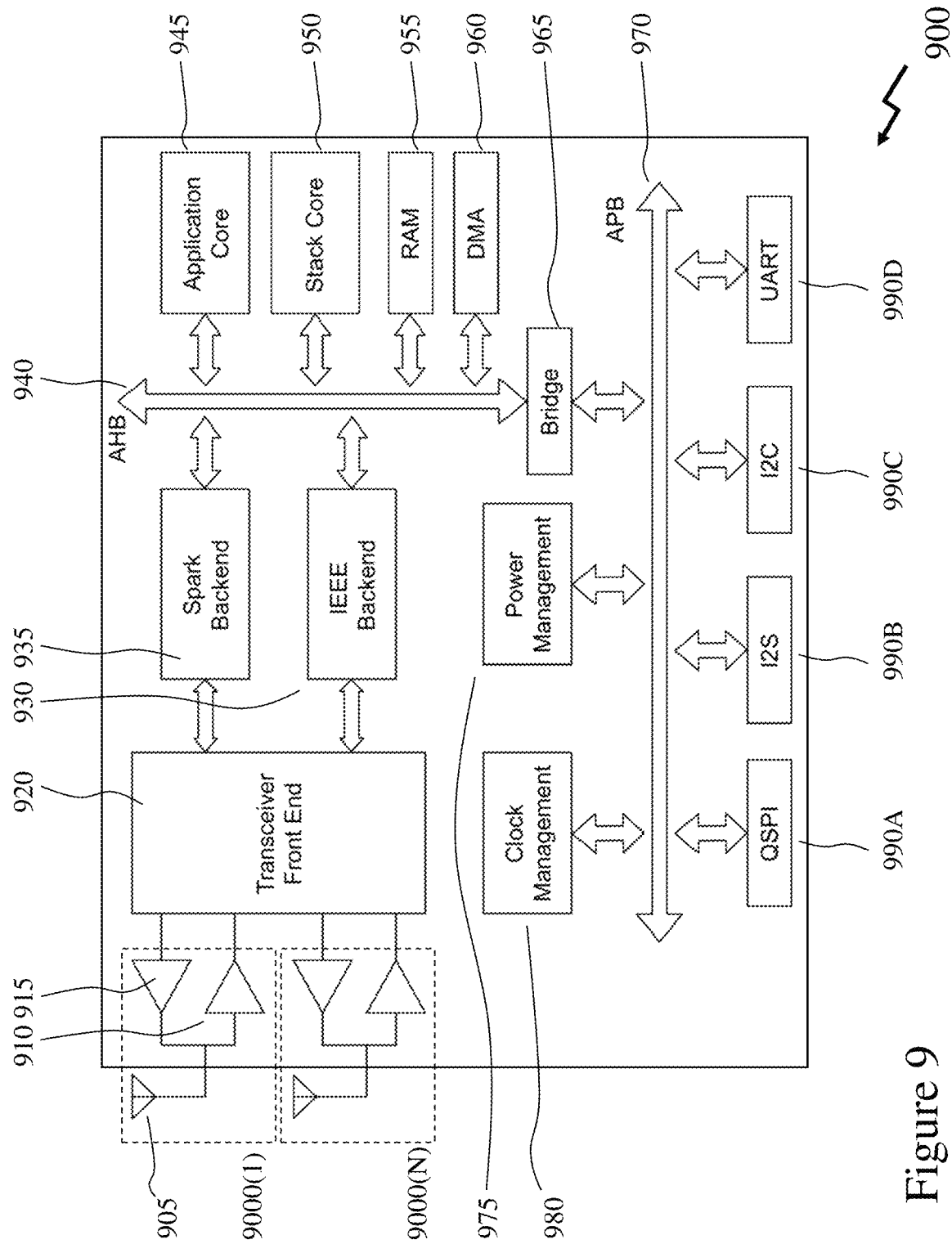
FIG. 9 depicts a UWB transceiver according to an embodiment of the invention supporting multiple antennas supporting dual standards for its physical layer (PHY)

Now referring to FIG. 9 there is depicted a third generation UWB Transceiver 900 according to an embodiment of the invention supporting multiple antennas and dual standards for its physical layer (PHY). Accordingly, as depicted the UWB Transceiver 900 comprises:
Multiple transmit/receive blocks, depicted as first to N Tx/Rx Blocks 9000(1) to 9000(N), each comprising an Antenna Element 905, Transmit Amplifier 915 and Receive Amplifier 910;
Transceiver Front End 920;
IEEE Backend 930 providing a PHY supporting compatibility with 802.15.4z;
Spark Backend 935 providing a PHY established by Spark Microsystems Inc. as implemented in their SR1120 ASIC;
ASIC Hardware Bus (AHB) 940 interconnecting the IEEE Backend 930 and Spark Backend 935 to a Bridge 965, Application Core 945, Stack Core 950, RAM 955 and DMA 960.
Application Core 945 comprising a microcontroller unit (MCU) for processing application related data and applications;
Stack Core 950 comprising a second MCU processing the wireless protocol stack and wireless protocol related applications;
Random Access Memory (RAM) 955 for storing data;
Direct Memory Access (DMA) 960 for data transfer directly to or from the main memory, bypassing the dual MCUs;
Bridge 965 for bridging communications from the AHB and an ASIC Protocol Bus (APB) 970;
APB 970 which handles communications between the Bridge 965, Power Management 975, Clock Management 980 and first to fourth I/O 990A to 990D respectively;
Power Management 975 which provides control of the sequenced power up/power down/sleep of the Transceiver Front End 920 and first to N Tx/Rx Blocks 9000(1) to 9000(N) as well as other elements of the UWB Transceiver 900;
Clock Management 980 which receives the base clock and generates the multiple clocks required by the different functional blocks of the UWB Transceiver 900; and
First to fourth I/O 990A to 990D, depicted as providing quad serial peripheral interface (QSPI), Inter-IC Sound (I2S), Inter-Integrated Circuit (I2C) and universal asynchronous receiver-transmitter (UART) interfaces to the UWB Transceiver 900 for data I/O and control I/O.

UWB Transceiver 900 therefore provides support for both a proprietary PHY (Spark Microsystems Inc.) and IEEE UWB PHY. IEEE 802.15.4z providing data rates up to 31.2 Mb/s (versus upon to 40.96 Mb/s on the proprietary PHY) on channels 5-12 (6.1-9.0 GHZ). The Multiple transmit/receive blocks, depicted as first to N Tx/Rx Blocks 9000(1) to 9000(N), with parallel RF chains provide for support of angle of arrival (AoA) estimation where N≥2.

FIG. 10B depicts an exemplary top level schematic of a hardware development kit (HDK) 1000 according to an embodiment of the invention supporting UWB devices and software development kit (SDK) according to embodiments of the invention with first and second Radio Modules 1010 and 1020, each employing a UWB Transceiver according to an embodiment of the invention. The HDK 1000 also comprising an MCU 1030 as well UART, I2C, I2S, and serial peripheral interface (SPI) connectors for I/O, analog-to-digital converters (ADCs), as well as SPI connections between the first and second Radio Modules 1010 and 1020 and MCU 1030 etc. The HDK 1000 providing, conjunction, with the SDK the flexibility for peripherals via UART, SPI, I2C, I2S as well as applications with ultra-low power, high datarate, low latency, ranging and support for complex networks.

Figure 11:
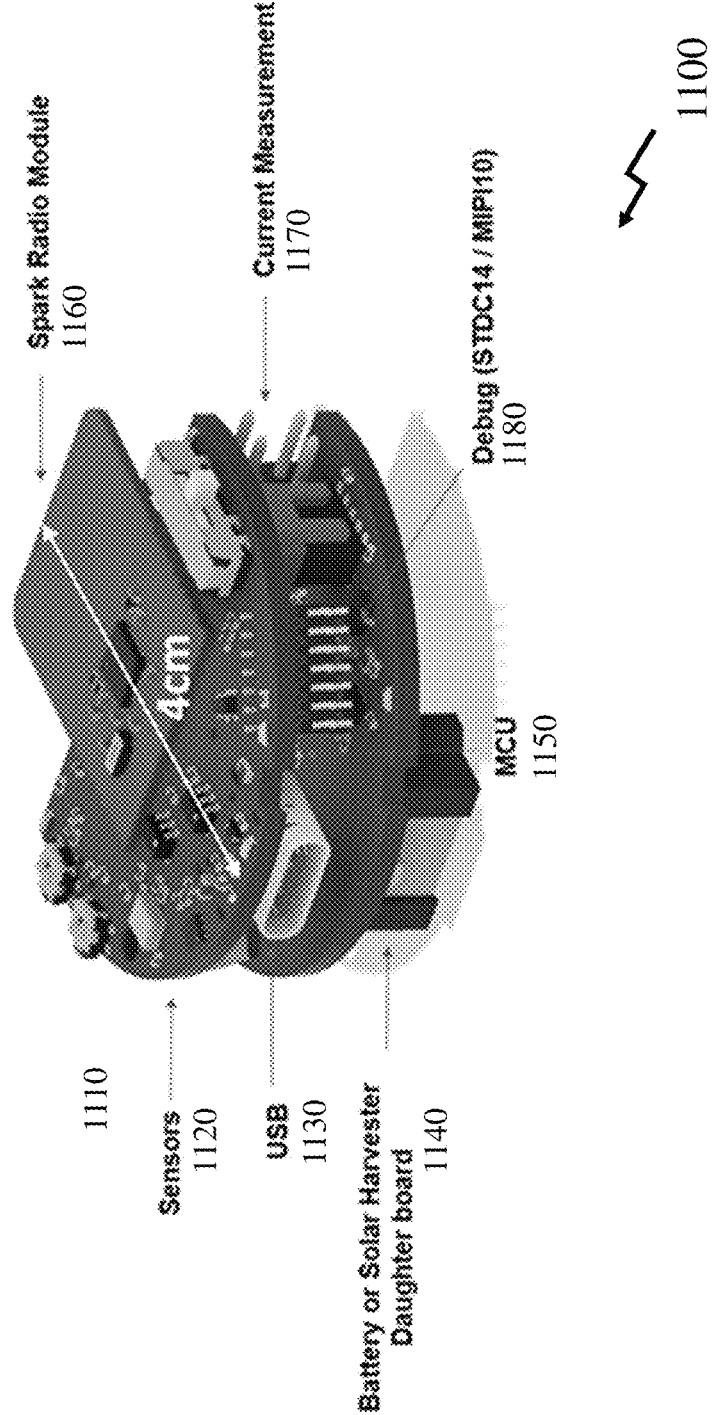
FIG. 11 depicts an exemplary configuration for a self-contained UWB node according to an embodiment of the invention exploiting UWB devices according to embodiments of the invention with solar harvesting for power generation.

FIG. 11 depicts an exemplary configuration for a self-contained UWB node or Wireless Sensor Kit (WSK) 1100 according to an embodiment of the invention exploiting UWB devices according to embodiments of the invention with solar harvesting for power generation. The WSK 1100 providing a compact platform for low power sensor applications exploiting UWB Devices according to embodiments of the invention. For example, the Sensors 1120 may be motion (movement), light and weather. However, it would be evident that other sensors may be employed including, but not limited to, environmental sensors, medical sensors, biological sensors, physiological sensors, chemical sensors, ambient environment sensors, position sensors, acceleration sensors, orientation sensors, and neurological sensors. As depicted the WSK 1100 further comprises a USB Interface 1130 (for programming, firmware updates etc.), a Daughter Board 1140 supporting a battery or solar harvester, MCU 1150, UWB Transceiver 1120 (Spark Radio Module), Current Measurement Interface 1170 and Debug Interface 1180. Optionally, the WSK or other embodiments of the invention may support photovoltaic cells for power generation. These photovoltaic cells may convert exterior ambient light, interior ambient light or light from lighting within an indoor environment.

Figure 12:
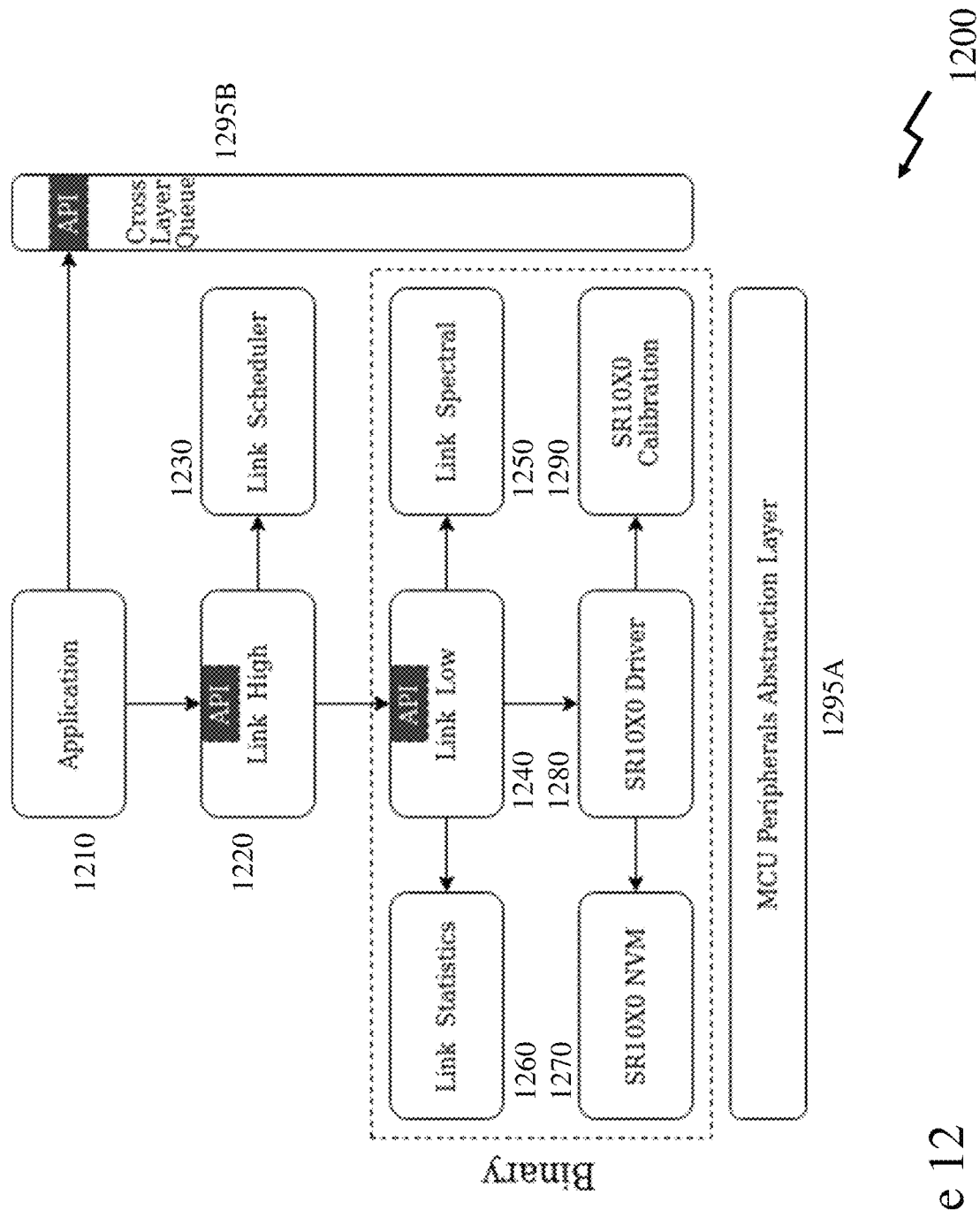
FIG. 12 depicts an exemplary link layer overview for a UWB system according to an embodiment of the invention exploiting UWB devices, HDKs and SDKs according to embodiments of the invention.

Referring to FIG. 12 depicts an exemplary Link Layer 1200 overview for a Stack employable with UWB systems according to an embodiment of the invention exploiting UWB devices, HDKs and SDKs according to embodiments of the invention. The Stack implements the necessary protocols in order to create an RF link between UWB transceivers. Multiple modes of operation can be selected depending on the application and the required performances where the profile selection can yield different trade-offs in terms of range, power consumption, latency and datarate. As depicted the Link Layer 1200 comprises:

Application 1210;
Link High 1220;
Link Scheduler 1230;
Link Low 1240;
Link Spectral 1250;
Link Statistics 1260;
Node Version Mode/Non-Volatile Memory (NVM) 1270;
Driver 1280;
Calibration 1290;
MCU Peripheral Abstraction Layer 1295A; and
Cross-Layer Queue 1295B.

The Link High 1220, Link Low 1240, MCU Peripheral Abstraction Layer 1295A, and Cross-Layer Queue 1295B being accessible through an API.

MCU Peripheral Abstraction Layer 1295A provides the Stack with a consistent interface between the application code and system hardware, regardless of the hardware platform. It provides an interface for the radio interface (e.g. SPI, general purpose IO (GPIO), and interrupt request (IRQ)), software interrupt (SWI), time delay and "critical section." The radio interface provides an interface for multiple, e.g. 2 UWB Devices (commonly referred to as radios), depending on the platform allowing Radio Selection to set the current radio for all subsequent function calls. SPI functions are used to send and receive data to the radios for this there are two basic groups of functions. The first group uses the SPI peripheral directly and are blocking, waiting for the transfer to complete. The second group uses DMA and are non-blocking. The GPIO provides a functions interface to the various GPIOs, such as debug enable, radio reset and shutdown. The IRQ functions provide for enabling or disabling the radio IRQs. The SWI is used by the Cross-Layer Queue 1295B as part of its dequeue/enqueue trigger mechanism. With the time delay this function implements a blocking time delay with a 1 ms resolution whilst the Critical Section enter and exit functions are used to bracket code that must not be interrupted.

Lower Link Layer: The Lower Link Layer (Link Low 1240) is designed to abstract all register accesses to the radio its user to perform the following tasks using simple human readable configuration structures:

Transmit and receive frames.
Duty cycle the SR10X0 transceiver using its internal timer.
Obtain PHY level information about individual received frame.
Obtain PHY level information about multiple frames.
Automatically maintain proper SR10X0 configuration for optimal reception.
Automatically maintain proper SR10X0 configuration for clear channel assessment.
Automatically handle frames longer than the SR10X0"s internal FIFO size.
Configure SR10X0 RF spectral utilization.

Within the scope of this section the term "user" is used to identify the lower link layer user specifically. In the full scope of this document, the lower link layer user is the higher link layer (Link High 1220) which is described subsequently. The main commands available include.

Transmit a frame.
Transmit a frame followed by the reception of an auto replied frame.
Receive a frame.
Receive a frame followed by the transmission of an auto replied frame.

Figure 13:
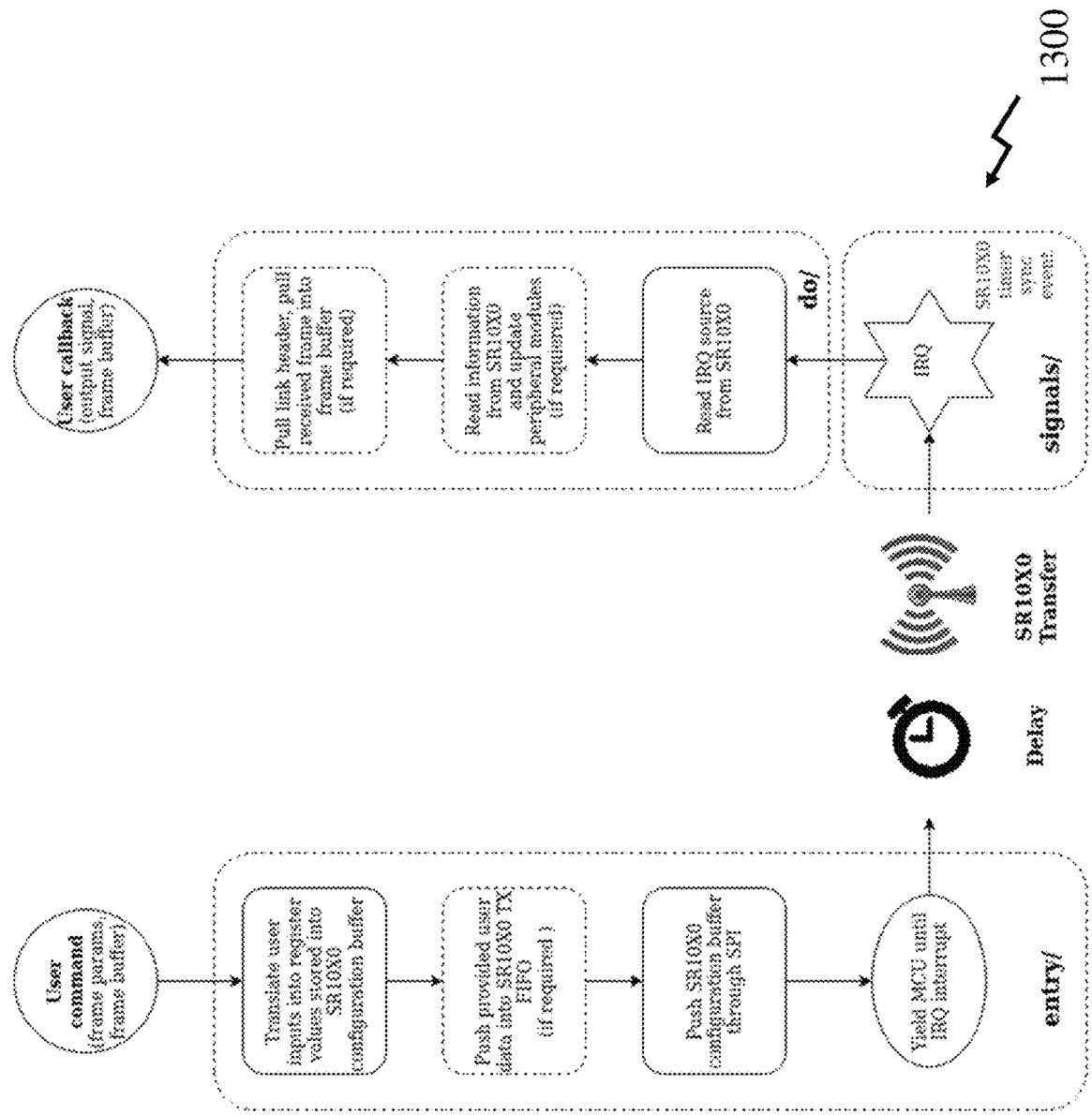
FIG. 13 depicts an exemplary flow chart for a lower link layer process exploited by UWB devices according to an embodiment of the invention.

The SR10X0"s timer is used to execute these commands after a specified delay. Based on IRQ signals and other information obtained from the SR10X0 registers as a result of a command, an output signal will be generated to inform the user about the outcome of the frame. FIG. 13 depicts an exemplary flow chart for a lower link layer process exploited by UWB devices according to an embodiment of the invention when the user sends a command.

It should be noted that the user is operating in a completely synchronous manner with the lower link layer. Data transfers and radio configurations should be exchanged at a precise time. Asynchronous data transfer is possible using the following general concept: the presence or absence of user data to be sent during each user callback event modulates the link throughput. As long as the average SR10X0 duty cycling scheduled by the user is greater than the application's frame generation rate, no information should be lost. The mechanism used to achieve this will be explained below.

Figures 14, 16:
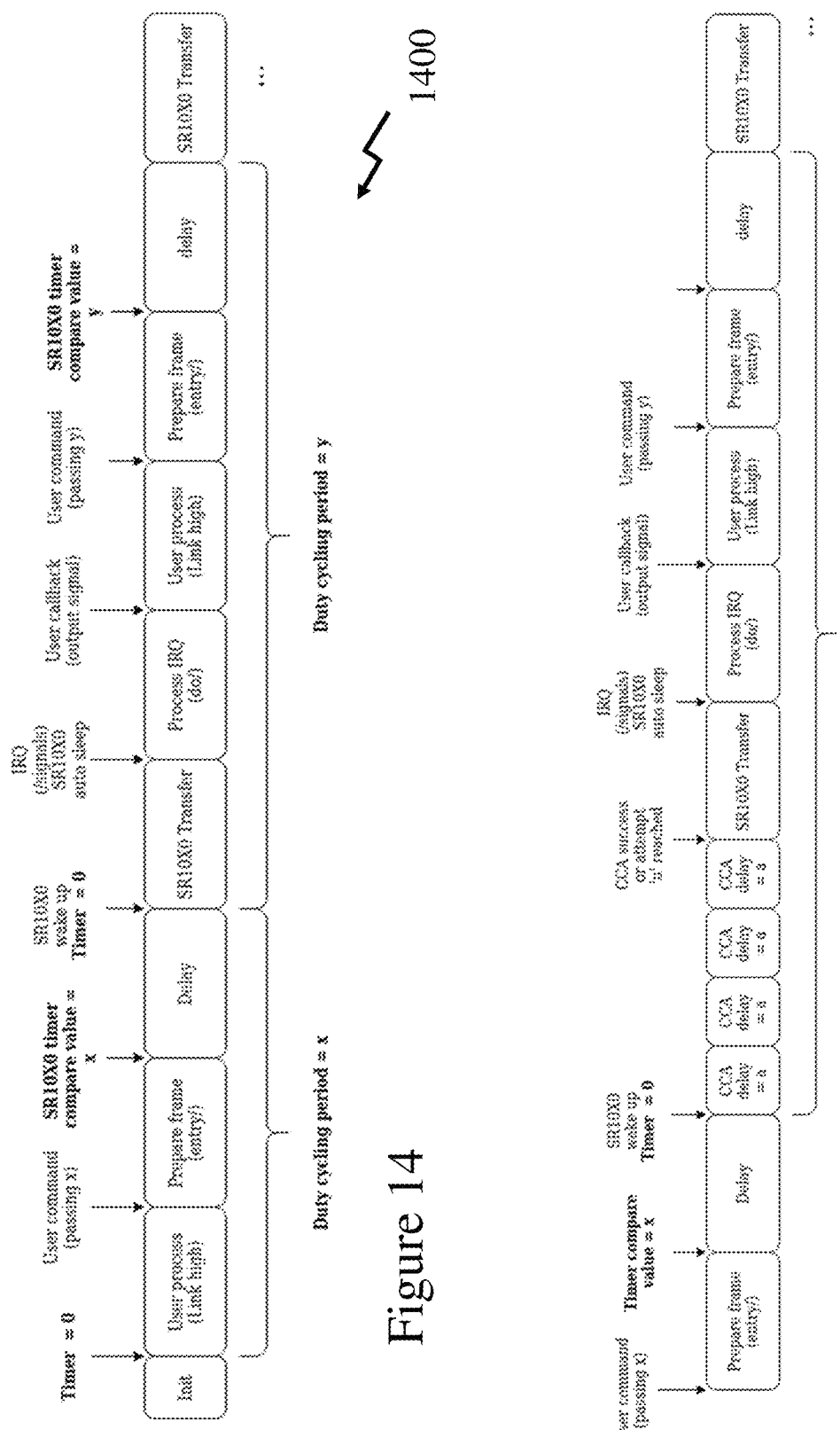
FIG. 14 depicts an exemplary lower link layer use process exploited UWB devices according to embodiments of the invention.
FIG. 16 depicts an exemplary clear channel assessment sequence diagram for a UWB device according to an embodiment of the invention.

The internal SR10X0 timer has the granularity of the SR10X0 PLL clock which is 1/20.48 MHz≈50 ns. The timer value is set to 0 every time the radio wakes up. When sending a command, the user passes the timer compare value as a parameter. In this manner, the user can request that a frame to be transmitted or received at precisely the desired amount of PPL clock cycles after the last time the SR10X0 woke up. Using the elements shown in FIG. 13 a sequence diagram for a general use case is depicted in FIG. 14.

If the compare value sent by the user is exactly 0, the command will be executed immediately. Otherwise, if the compare value results in a delay shorter than the time to execute all the sequence elements, a malfunction will occur. The SR10X0 will automatically go to sleep after the following events:

A frame is received by the SR10X0.
A frame is transmitted by the SR10X0.
The SR10X0 listening period timed out.

Therefore, transmitting or receiving frames periodically will result in the SR10X0 being awake only for the duration of transferring the actual PHY frame regardless of the MCU clock and SPI speed. This strategy optimizes the SR10X0 power consumption and duty cycling speed in a TDMA application context.

SR10X0 IRQs are used to determine the outcome of user commands and react accordingly. The main IRQ events used are shown on Table 1 below.

TABLE 1

IRQ Events

| IRQ Event | Description |
| --- | --- |
| RX Timeout | The receiver was on for a predefined number of PLL clock cycles without detecting a syncword. |
| TX End | The SR10X0 finished transmitting a frame. |
| RX FIF Underflow | The TX FIFO was empty at time of a symbol transmission. |
| New Frame | The receiver finished receiving a frame after detecting the sync word. |
| Wake Up | The SR10X0 woke up from sleep. |
| FIFO Load | The TX or RX FIFO load crossed a predefined threshold. |
| CCA Fail | The clear channel assessment check failed. |

Figure 15:
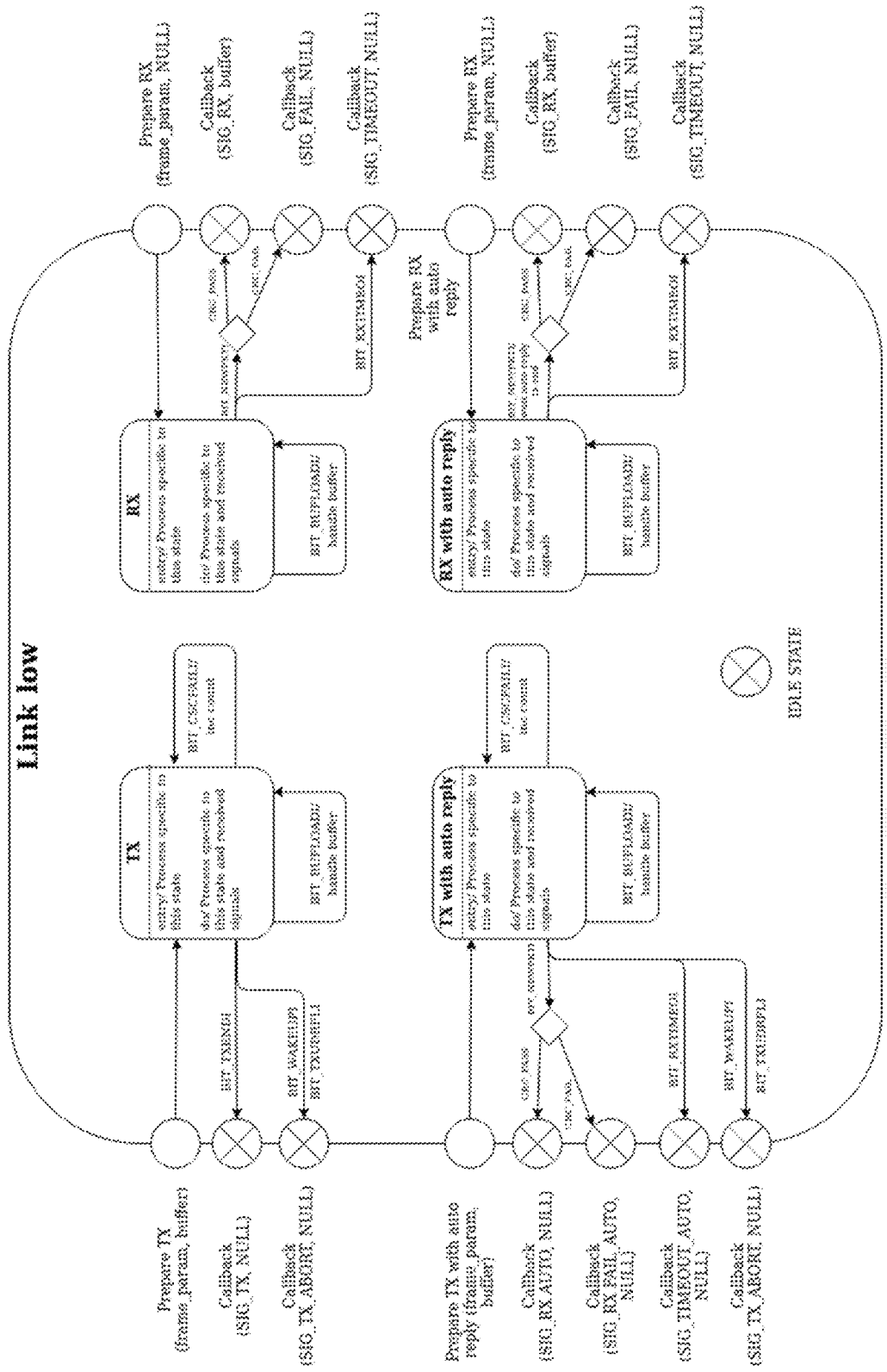
FIG. 15 depicts an exemplary lower link layer state machine for a UWB device according to an embodiment of the invention.

For each of the main commands available to the user, a state is defined in order to handle all possible outcomes for that specific requested action. A user callback will always occur as a response. Based on the state and encountered IRQ signals, it will return an output signal that represents the outcome of the action and a frame buffer containing the received data, if applicable. The module will then enter the idle state until another action is requested. The lower link layer module state machine diagram is shown in FIG. 15. Note that the "entry/" and "do/" field for each state are specific versions of the generic process shown in FIG. 13.

Referring to FIG. 15 then for each state there are respective input/output signals. These being described in the following sections:

"TX" State: Possible input signals:
IRQ TX END
IRQ TX UDRFL
IRQ WAKE UP
IRQ CCA FAIL
IRQ BUFLOAD
Possible output signals:
SIG TX
SIG TX ABORT If the transmission of a frame was successful, "SIG TX" will be generated, otherwise "SIG TX ABORT" will be generated. The main reason for an unsuccessful transmission is that the user did not provide a frame buffer when issuing the TX command. Other reasons indicate a malfunction. The "SIG TX ABORT" event allows the user to look for potentially available data at a desired rate. This is the basic mechanism that allows the link layer to transfer user data asynchronously.

"TX with auto reply" State: Possible input signals:
IRQ NEWPKT
IRQ TX UDRFL
IRQ RX TIMEOUT
IRQ WAKE UP
IRQ CCA FAIL
IRQ BUFLOAD
Possible output signals:
SIG RX AUTO
SIG RX FAIL AUTO
SIG RX TIMEOUT AUTO
SIG TX ABORT When a user requests a transmission followed by an auto reply, the system will only update the user on the outcome of the auto reply frame, unless the transmission was unsuccessful. A "SIG RX AUTO" can be used as an acknowledgment by the user while "SIG RX FAIL AUTO" or "SIG RX TIMEOUT AUTO" can be used as a non-ack. "SIG RX FAIL AUTO" means that the radio received the frame correctly but that CRC check failed. The "SIG TX ABORT" event can be handled the same way as described in the "TX" state description.

"RX" State: Possible input signals:
IRQ NEWPKT
IRQ RX TIMEOUT
IRQ BUFLOAD
Possible output signals:
SIG RX
SIG RX FAIL
SIG RX TIMEOUT When a user requests simple reception, the "SIG RX" output signal will come with a frame containing user data and information about the frame, like LQI and others. "SIG RX FAIL" or "SIG RX TIMEOUT" indicate that the frame was lost.

"RX with auto reply" State: Possible input signals:
IRQ NEWPKT
IRQ RX TIMEOUT
IRQ BUFLOAD
Possible output signals:
SIG RX
SIG RX FAIL
SIG RX TIMEOUT When a user requests a reception followed by the transmission of an auto reply, all signal events can be handled the same way as described in the "RX" state description. In that state, "SIG RX" implies that an auto reply frame was sent by the SR10X0 and any other signals implies that no auto reply frame was sent by the SR10X0. Since the auto reply frame contains only PHY payload, the transmission cannot fail. How "IRQ CCA FAIL" is handled is explained in the CCA section. How "IRQ BUFLOAD" is handled is explained in the cut-through mode section. These input signals have no effect on the output signal.

CCA: The SR10X0 Clear Channel Assessment (CCA) can be used when transmitting frames. If this lower link layer feature is enabled, the SR10X0 will do a CCA check before transmissions. For every CCA failure, the "IRQ CCA FAIL" interrupt will be generated by the SR10X0 and counted by the lower link layer state machine. Another transmission attempt will be executed automatically after a configured delay "a." This process will repeat itself for a number of times "n" set by the user at initialization. If a CCA check succeeds or the maximum number of failures is reached, the frame will be transmitted. The sequence of events just described can be added to the diagram shown in FIG. 14 resulting in FIG. 16.

It is important to keep in mind that if the SR10X0 timer compare value 'x' results in a delay shorter than the time to execute all the sequence elements, a malfunction will occur. Also, the delay 'a' must be chosen in order to allow enough time for the user's system to trigger an IRQ, read SR10X0 status through SPI (2 registers) and increment a variable Cut-Through Mode: While the SR10X0 can transfer 255-byte frames, the SR10X0 FIFOs can only hold a maximum of 128 bytes at a time. In order to limit frame to frame overhead and maximize throughput, it is sometimes preferable to transfer frames longer than 128 bytes. The lower link layer state machine can accomplish this task automatically by splitting frames longer than 128 bytes into 4 equal parts.

Transmitting a long frame is done by sending the first part on the frame to the TX FIFO before a transmission occurs (i.e. during the 'entry/' phase of the lower link layer state machine). See FIG. 2. The 3 remaining parts will be sent during the SR10X0 transmission. Every time the TX FIFO load is lowered bellow a threshold by the SR10X0 transmitting data, the "IRQ BUFLOAD" will trigger and the lower link layer state machine will send another part of the frame to the TX FIFO.

Similarly, the reception of a long frame will be done as follows: As the SR10X0 fills the RX FIFO with received data, above a threshold, the "IRQ BUFLOAD" will trigger and the lower link layer state machine will empty the FIFO. When the Reception of the frame is complete the fourth part of the frame will finally be read from the RX FIFO during the 'do/' phase of the lower link layer state machine, see FIG. 13. Note that in order to use this feature, the user's SPI clock frequency must be substantially higher than the SR10X0 20.48 MHZ symbol clock. The recommended minimum SPI frequency to use this feature is 25 MHz.

Frame Parameters: When a user sends a transfer command to the lower link layer state machine, the following parameters are sent to configure the desired frame transfer:
  Desired band number.
  Size of the frame.
  SR10X0 timer compare value in PLL clock cycles.
  SR10X0 RX timeout value in PLL clock cycles.

The desired band number must not be higher than the number of bands configured at initialization. The SR10X0 RX timeout value is only used for RX commands.

SPI Transfers: Different SPI transfers occur within the lower link layer state machine during user command execution. Those transfers can use DMA and as such will minimize frame to frame overhead.

A "Status Read Transfer" is a simple read access of the two SR10X0 status registers are done every time an IRQ is triggered. The source of the IRQ will be used to determine the actions to take during the processing of a state. This transfer occurs during the 'do/' phase of the lower link layer state machine, see FIG. 13.

An "Information Read Transfer" is a blocking DMA SPI transfer happens at every reception of a frame in order to extract the following information from the radio:
  RSSI of the received frame
  RNSI of the received frame
  A 16-bit value corresponding to the number of PLL cycles the SR10X0 was listening before detecting a syncword (see registers 0x24 and 0x25 in the datasheet).
  4 bytes of phase information used for ranging calculation (optional).

This transfer occurs during the 'do/' phase of the lower link layer state machine, see FIG. 13. The obtained information can be used internally by the lower link layer state machine but will also be available in the frame buffer returned to the user alongside any "RX" output signal.

A "TX FIFO Write Transfer" is a non-blocking DMA SPI transfer is used to write user data and the link header to the SR10X0 TX FIFO. This transfer occurs during the 'entry/' phase of the lower link layer state machine, see FIG. 13.

A "RX FIFO Read Transfer" is a non-blocking DMA SPI transfer is used to read user data and the link header from the SR10X0 RX FIFO. This transfer occurs during the 'do/' phase of the lower link layer state machine, see FIG. 13.

A "Frame Configuration Write Transfer" is a non-blocking DMA SPI transfer is used to configure a series of SR10X0 registers according to frame parameters and the specific state. This includes:
  SR10X0 IRQ trigger source configurations.
  Frame parameters configurations.

This transfer occurs during the 'entry/' phase of the lower link layer state machine, see FIG. 13.

Figure 17:
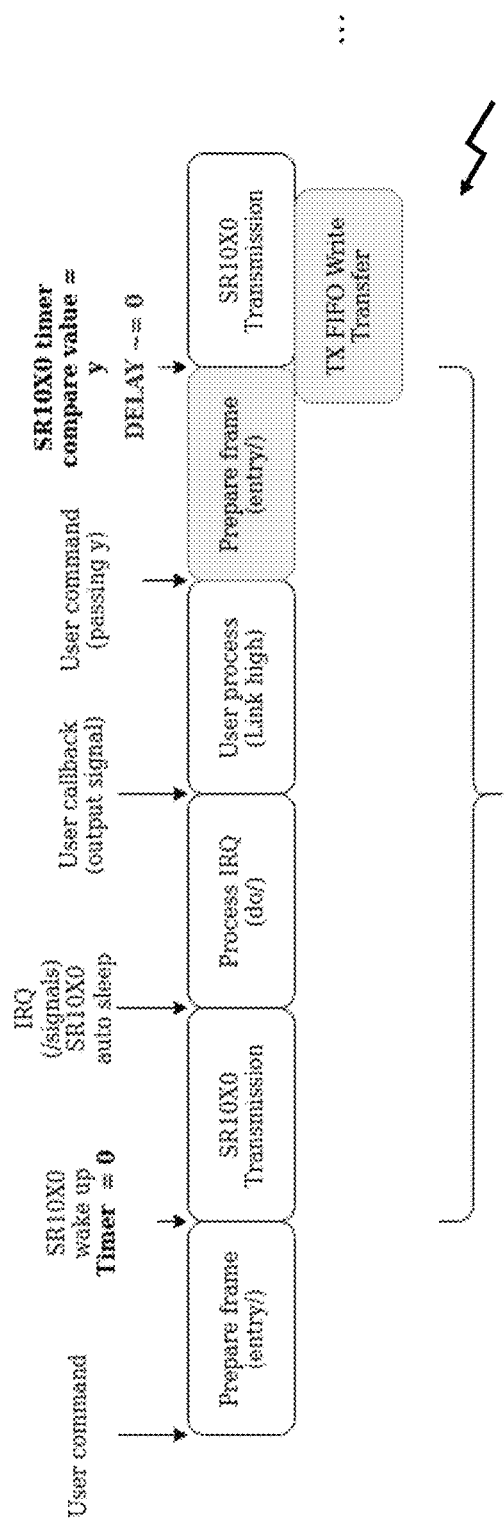
FIGS. 17 and 18 depict Tx and Rx lower link layer sequence diagrams for a UWB device according to an embodiment of the invention.

Parallel Processing: Some tasks are done in parallel in order to maximize throughput. By modifying FIG. 14 which is general case sequence diagram, we can create the specific case of a transmission being done as fast as possible in a way that the delay before transmission is close to 0. This is shown on FIG. 17. The TX FIFO write transfer of any TX state can be done in parallel with the frame being transmitted. As a result, the minimum SR10X0 timer compare value 'y' calculation does not have to take into account the TX FIFO write transfer. Note that in order for the previous statement to be true, the user's SPI clock frequency must substantially be higher than the SR10X0 20.48 MHz symbol clock.

Figure 18:
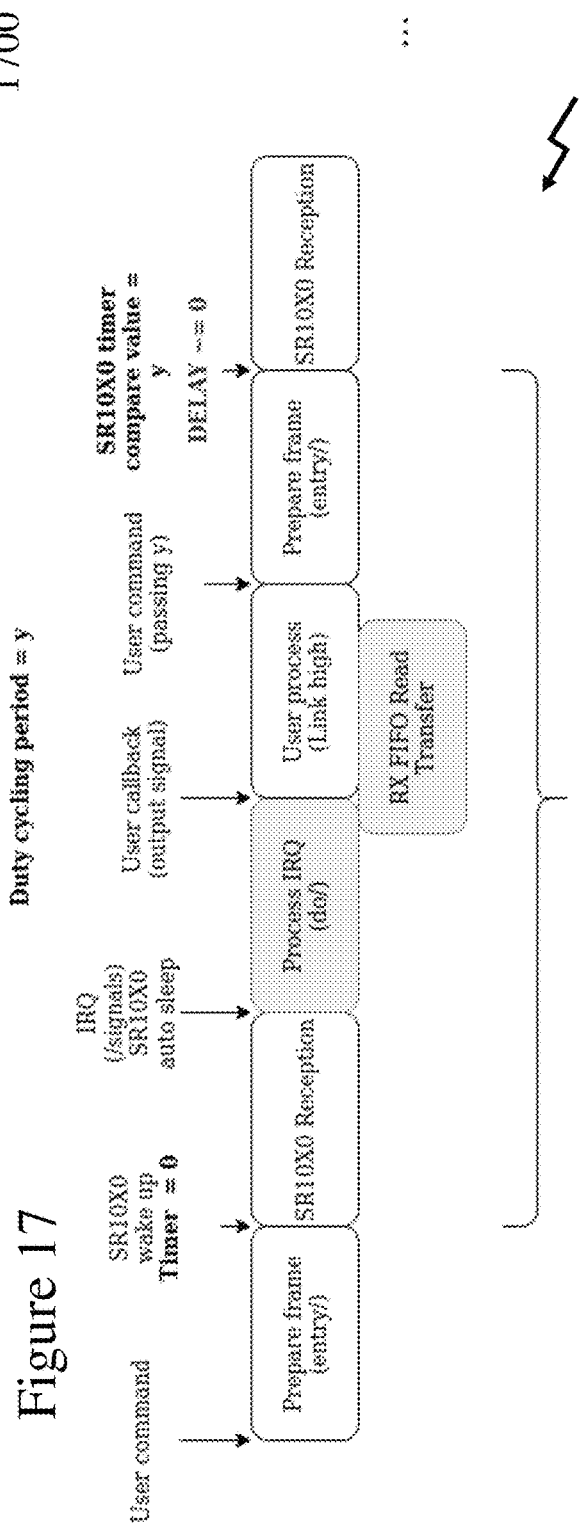

By modifying FIG. 14 general case sequence diagram, we can create the specific case of a reception being done as fast as possible in a way that the delay before receptions is close to 0. This is shown on FIG. 18. The user data RX FIFO read transfer of any RX state can be done in parallel with the user process. As a result, the minimum SR10X0 timer compare value 'y' calculation only has to take into account the longer delay between reading user data and user process delay.

Spectral Module: This module contains everything needed for optimal RF transfer. It is used by the lower link layer state machine to configure the SR10x0 RF block. This module executes the following tasks and sub-tasks:
  Translate the user static RF configurations into data structures compatible with the SR10X0 registers.
  Configure TX pulses pattern and RX filters.
  Calculate the RF configurations dynamically based on information collected by the lower link state machine.
  Select RX gain based on LQI.
  Select CCA threshold based on LQI.

TX pulse pattern and RX Filters Configuration: Based on the user configuration sent at initialization, data structures compatible with the SR10X0 registers will be created in order to configure the radio RF block for optimal transfer on each band. These structures will be used by the lower link state machine during the frame configuration write transfer. User parameters include the following:
  Number of pulses.
  Width of each pulse.
  Gain of each pulse.
  Space between pulses.
  Frequency of the first band in 40.96 MHz increments.
  Number of the band to be configured.
  Space between bands in 40.96 MHz increments.

Dynamic RX Gain Selection

Dynamic RX gain selection is used to select proper RX gain to optimize RF transfers and avoid saturation in the receiver. This is done by monitoring the SR10X0 signal RSSI every time a frame is received and adjusting the gain. The adjusted gain value will be in effect at the next reception attempt. The RSSI is obtained from the lower link layer state machine during the information read transfer. The resulting gain value is used during the next frame configuration write transfer of any RX command. This process is done independently for every band.

CCA Threshold Calculation

Clear Channel Assessment threshold is calculated based on the average noise floor. This is done by monitoring the SR10X0 signal RNSI every time a frame is received and computing a running average. The RNSI is obtained from the lower link layer state machine during the information read transfer. An offset provided by the user at initialization is then added to the average and the SR10X0 is configured with the resulting value at every TX frame configuration write transfer. The maximum sample size used to calculate the running average, for example this may be 10. This process is done independently for every band. A filter is also available to remove sudden peaks in RNSI value and can be configured by the user.

Statistics Module

A statistics module is available for the user to monitor link quality. The statistics available independently for each band are the following.

Last received RSSI value.
Last received RNSI value.
Average RSSI.
Average RNSI.
Number of received frames.
Number of rejected frames.
Number of lost frames.

All LQI information is collected during the information read transfer of any received frame.

Higher Link Layer: The Higher Link Layer (Link High 1220 in FIG. 12) is a module which allows it's user to perform the following tasks using simple human readable configuration structures.

Configure a TDMA schedule.
Synchronize SR10X0s together.
Configure datarate.
Configure channel hopping.
Do bidirectional data transfers.
Transfer data asynchronously.
Implement concurrent links strategies.
Implement ranging strategies.
Implement quality of services strategies.

Figure 19:
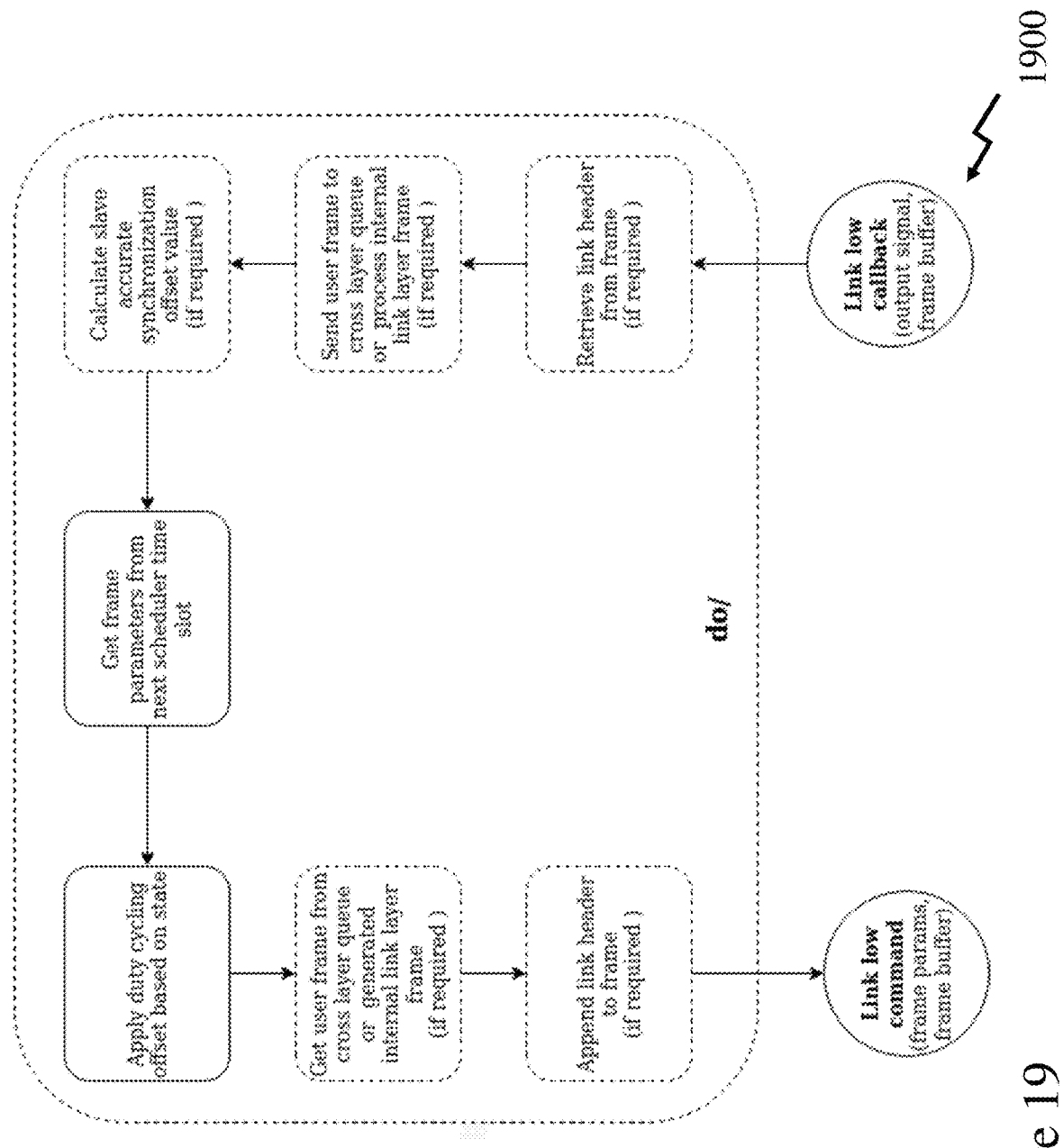
FIG. 19 depicts a higher link layer process for a UWB device according to an embodiment of the invention.

The higher link layer state machine main function is to send a periodic sequence of lower link layer transfer commands based on a schedule configured by the user. Depending on the state and the outcome of transfer commands, actions will be taken to ensure synchronization. Transferred frames will be dispatch to proper services based on their type allowing the link layer to exchange data internally in addition to user data. Built-in re-transmissions and software filtering are available. The generic process used is shown on FIG. 19.

Figure 20:
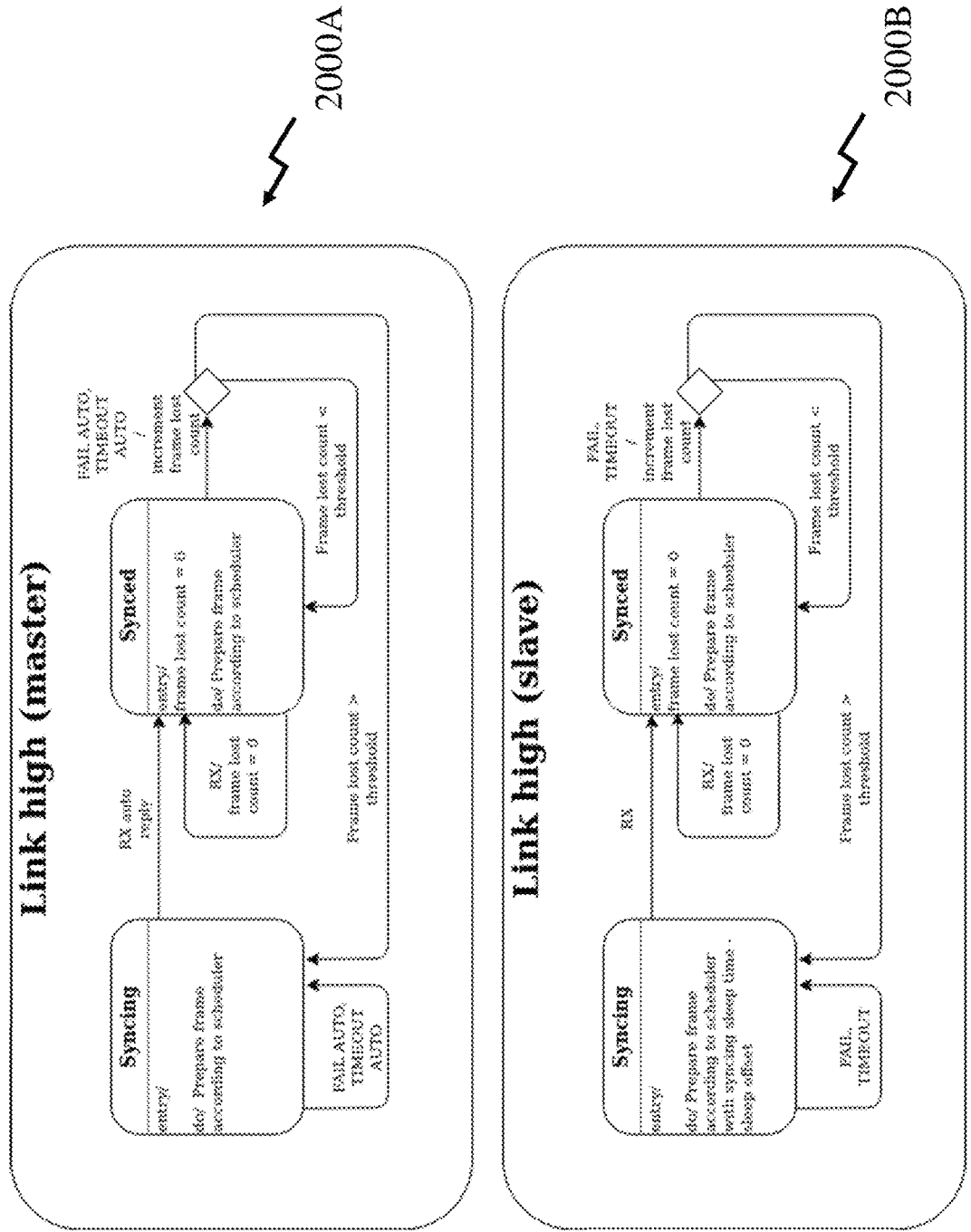
FIG. 20 depicts higher link layer state machines for master and slave UWB devices according to an embodiment of the invention.

As with the Lower Link Layer the Higher Link Layer can be visualized through a state machine wherein the higher link layer state machine is represented in FIG. 20.

Possible input signals driving this state machine are the following:

SIG RX
SIG RX AUTO
SIG RX
SIG RX AUTO
SIG TIMEOUT
SIG TIMEOUT AUTO
SIG TX
SIG TX ABORT

These signals are generated by the lower link layer and they represent the outcome of a requested transfer command. These have been described above in respect of FIGS. 13 to 19 respectively. Note that the "do/" field for each state are specific versions of the generic process shown on FIG. 19.

"Syncing" State: The master is following the user schedule and will enter the "synced" state when an auto reply frame is received. The slave is adding a time offset to the scheduled SR10X0 timer compare value and will enter the "synced" state when a frame is received. This way, the slave listening window will collide with the master transmission.

"Synced" State: The master is following the user schedule and will enter the "syncing" state when a predefined number of consecutive auto reply frames were lost. The slave is following the user schedule, adding a synchronization time offset to the scheduled SR10X0 timer compare value, see section below on synchronization. It will enter the "syncing" state when a predefined number of consecutive frames are lost.

Figure 21:
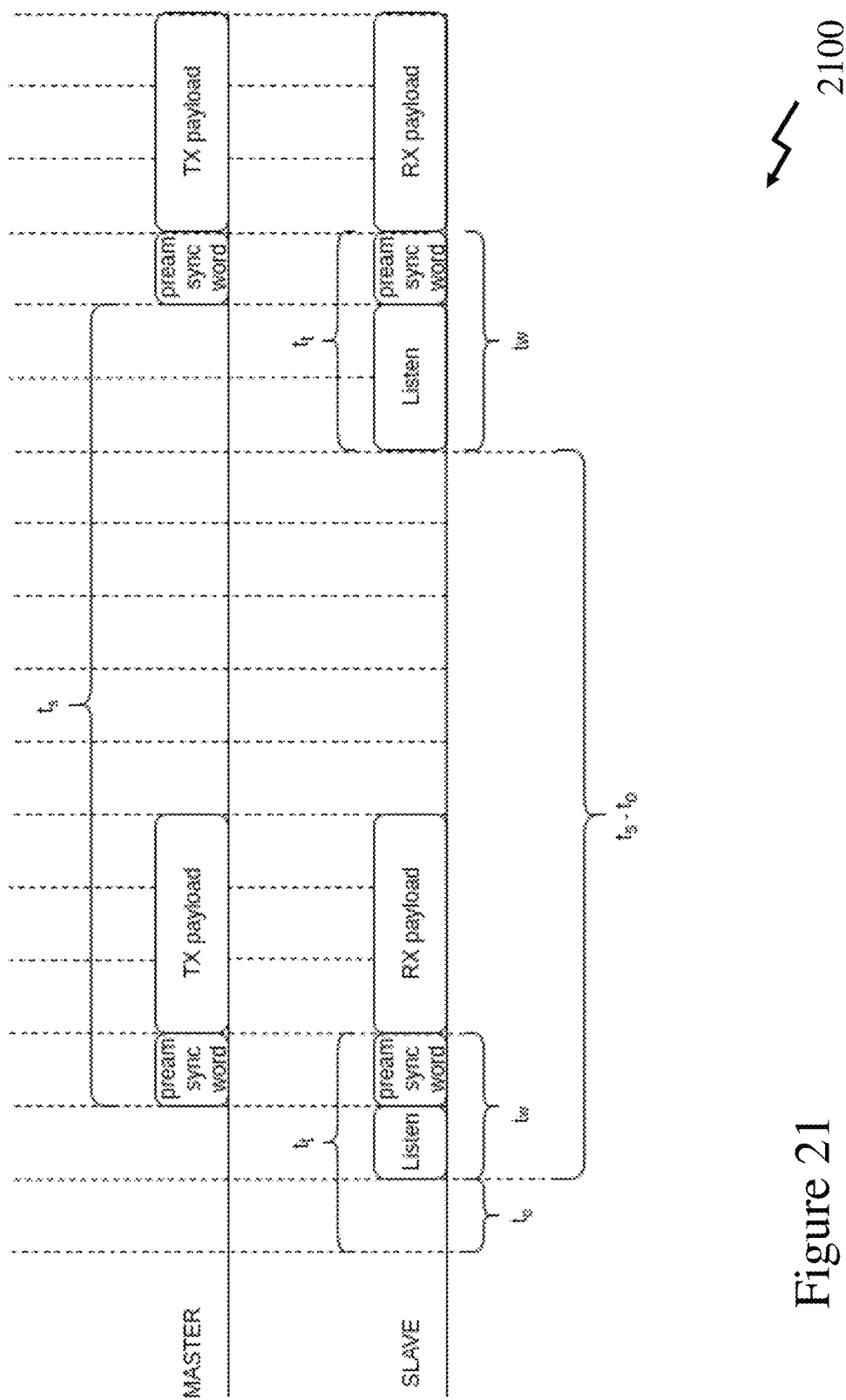
FIG. 21 depicts timing synchronization between UWB devices according to an embodiment of the invention.

Synchronization: The accurate synchronization is achieved by keeping track of the waiting time $t_W$ between wake up and detection of the syncword for the slave in RX. When a frame is received, this value $t_W$ is returned by the lower link layer and compared with a target time $t_T$. A time offset to is calculated and added to the next slot time $t_S$ to compensate for any drift. An example of how the system reacts for the case of a slave waking up too late is depicted in FIG. 21. In this manner a slave is re-synchronized to the master every time it receives with an accuracy of 1/20.48 MHz≈50 ns. The coarse duty cycling time $t_S$ is based on the time slots information provided by the scheduler module and configured by the application.

Scheduler Module: The scheduler performs the following tasks.

Allow the user to add data time slots to the schedule.
Allow the higher link layer state machine to add beacon and ranging time slots to the schedule.
Allow the higher link layer state machine to disable scheduled transmissions on devices dynamically.
Create channel hopping super-frames based on user configured schedule and spectral configuration.
Configure SR10X0 timer compare time slot field values to ensure accurate synchronization.
Increment and keep track of the time slot sequence number of synchronized devices using the link layer header field of transferred frames.
Provide the higher link layer state machine with scheduled frame parameters necessary to lower link layer transfer commands.

Time Slot Configuration: When configuring a time slot, the user should provide the following.

The duration of the time slot in μs.
The type of time slot.
The ID of the transmitting node.
The ID of the receiving node.
The size of the frame.
The band to transfer on.
An auto reply usage Boolean flag.
The address of the transmission cross-layer queue.
The address of the reception cross-layer queue.

The ID of transmitting and receiving node refer to the unique device ID configured by the user at initialization. The transmission cross layer queue is where the higher link layer state machine will look for data when transmitting on a user time slot. The reception cross layer queue is where the higher link layer state machine will put data when receiving on a user time slot.

Software Addressing: When a master transmits a frame, it will append the receiving device ID configured for the current time slot to the link header. Any time a frame is received by a slave, it will verify that the frame contains its unique device ID. If the address does not match, it will consider the frame lost. This will prevent slaves from synchronizing on the wrong time slot.

Re-Transmissions: The higher link layer state machine will use the SR10X0 auto reply feature as an acknowledgment to do retransmissions. When a user frame is about to be transmitted, the transmitter will get the head of the transmitter cross layer queue for the current time slot. This frame will only be removed from the user queue once the auto reply was received. This way, any frame that is removed from the user transmit queue by the link layer has guaranteed delivery. Be aware that a sequence number still needs to be transferred by the user in order to filter out duplicate frames.

Cross Layer Queue

The cross layer queue is a message pool of fixed sized buffers allowing processes to efficiently transfer data. It features:

Singly linked list of nodes.

Data is transferred via pointers.

Optional trigger of a SWI on dequeue and/or enqueue operations.

Ability to generate a list of all queues currently in use, including names, node count and maximum length for each.

Flush a queue of all its contents in one operation.

All queue operations are protected by critical sections to avoid race conditions.

The queue is implemented as a singly linked list of elements called nodes. All the nodes are of a fixed size and they reside in a static location in RAM. First Image 2200A in FIG. 22 depicts the Queue 2210 within the context of an overall queue structure.

If we consider the example of a system with a total of 8 nodes and with 2 processes, each with 2 nodes in their queue then we obtain the exemplary queues depicted in second Image 2200B in FIG. 22. Nodes are removed (dequeued) from head and are added (enqueued) to the tail. An example of a dequeue process being depicted in third Image 2200C in FIG. 22 whilst fourth Image 2200D depicts an enqueue process.

As evident from FIG. 22 nodes are a basic element of the queue. A node represents an area in the message pool of a fixed size. The application layer must only use a User Data section. A node format according to an embodiment of the invention comprises a top section reserved for link information, a section for a link header, the user data section, and a section for a next node. The link header, user data and next node forming a radio packet. The Next Node pointer is automatically populated whenever the node is enqueued. The Reserved for Link and Link Header sections are for the exclusive use of the link layer. A queue is a structure which contains the information presented in Table 2.

TABLE 2

Queue Structure Elements

| Element | Description |
| --- | --- |
| Head | Pointer to the first or oldest node. |
| Tail | Pointer to the last or newest node. |
| Node Count | Number of nodes presently in the queue. |
| Length | Maximum number of nodes allowed in the queue |
| SWI Trigger Enable | Optional triggering of a SWI when a dequeue and/or enqueue operation is performed on the queue |
| Name | Name of the queue (8-char max + NULL termination). |
| Next Queue | Pointer to the next queue in the system. |

Free Queue: During system initialization, the queue module will create the free queue. This is where all nodes are obtained (queue get free node) and where they must return when the nodes are no longer needed (queue free node). The free queue also acts as the root queue pointing to all subsequent queues created by system processes.

Queue Initialization:

An application must first initialize a queue before using it. The following variables must be specified when initializing:

Pointer to local queue structure.

The maximum length of the queue. Any attempt to enqueue a node past this limit will fail.

Queue name string.

Enable/disable SWI trigger on a node enqueue.

Enable/disable SWI trigger on a node dequeue.

Interrupts: The queues allow for a software interrupt (SWI) to be triggered when a dequeue and/or enqueue is performed. The interrupt priority for SWI is set to just below the audio and radio interrupts. For example the interrupt levels may be defined as outlined in Table 3 below. In order to use the SWI an application must first register a callback function with the SWI handler.

TABLE 3

Interrupt Priorities

| Process | Interrupt Level |
| --- | --- |
| Application | 0 |
| Radio Stack | 1&2 |
| Queue SWI | 3 |
| . | 4 & Above |
| . | |
| . | |

Figure 23:
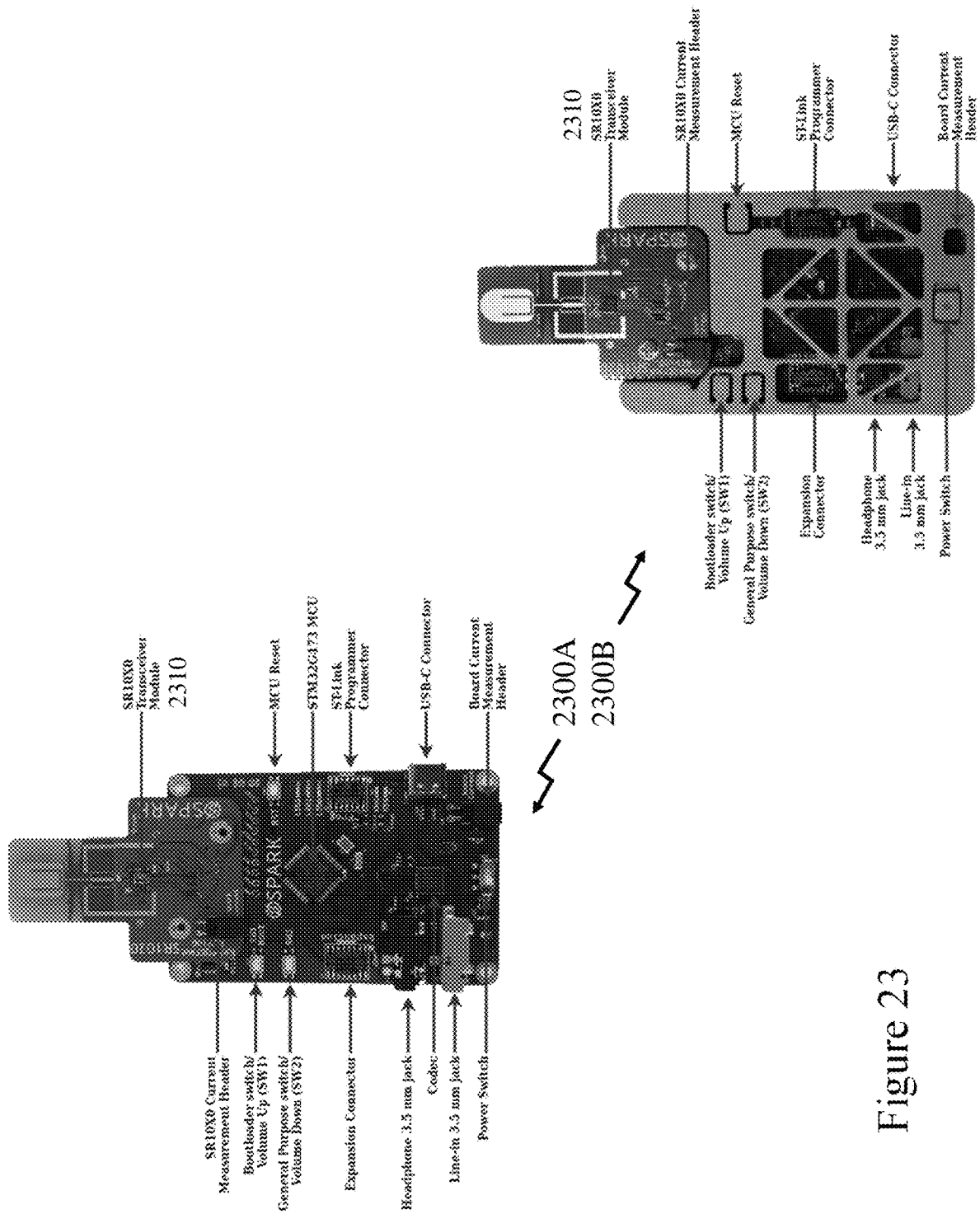
FIG. 23 depicts a UWB transceiver module according to an embodiment of the invention in conjunction with a carrier board with and without a protective case.

Referring to FIG. 23 there is depicted a UWB transceiver module according to an embodiment of the invention in conjunction with a carrier board without (first Image 2300A) and with (second Image 2300B) a protective case. As depicted the UWB transceiver ASIC is packaged as UWB Transceiver 2310 in a 4 mm×4 mm QFN package which is mounted to a daughter board that integrates an antenna where the daughter board is mounted to a mother board with MCU etc. Configurations with dipole and monopole antennas may be implemented.

The dipole antenna provided on exemplary modules covers a frequency range going from approximately 3.3 to 5.7 GHZ for one UWB Transceiver circuit (e.g. the Spark Microsystems Inc. SR1010 UWB Transceiver) and from approximately 6.3 to 9.5 GHz for another UWB Transceiver the SR1020. The dipole exhibits a maximum gain of 4.8 dBi at 5 GHz for the SR1010 and of 4.7 dBi at 8.25 GHz for the SR1020.

Figure 24:
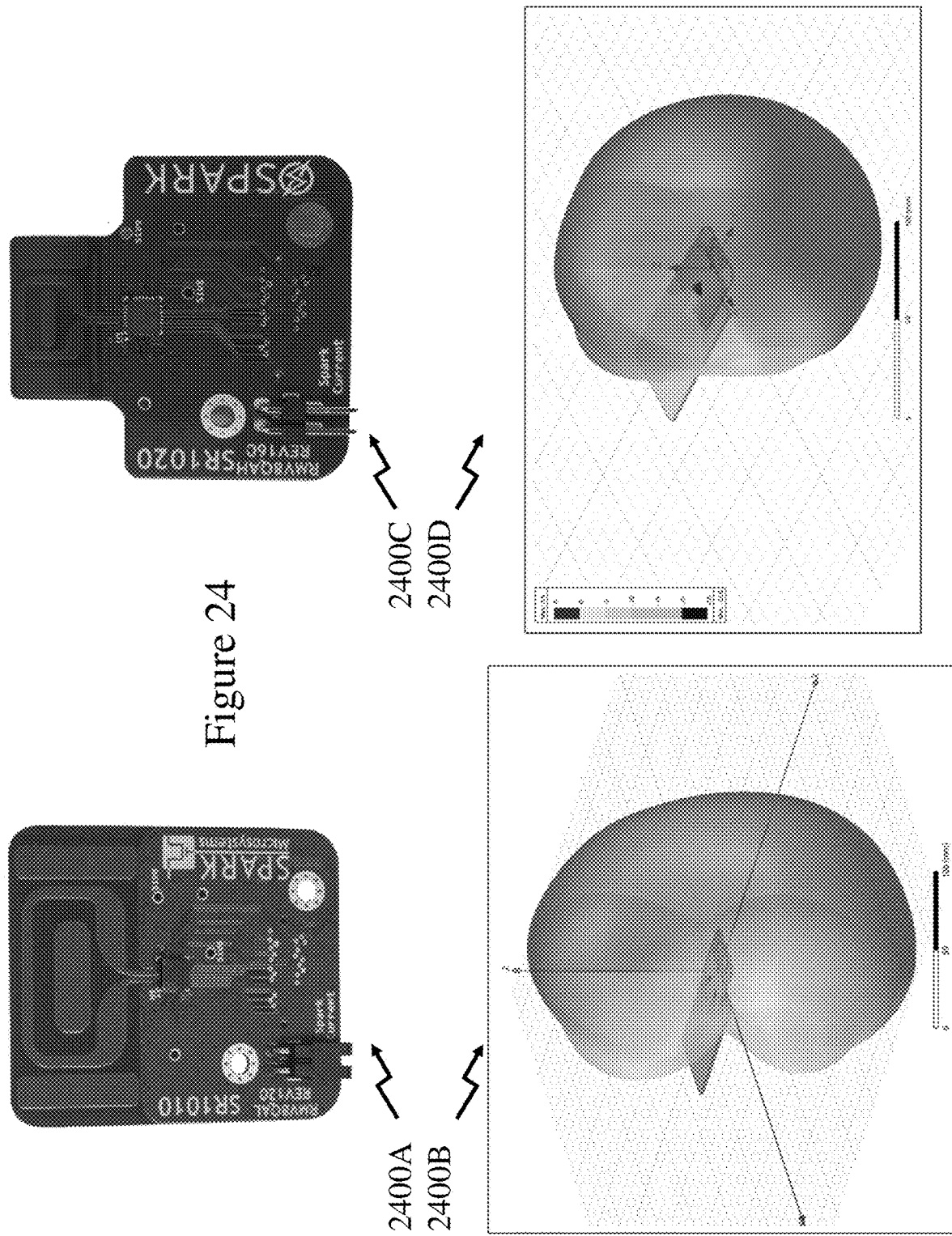
FIG. 24 depicts UWB transceivers with dipole antennae according to embodiments of the invention together with their resulting gain radiation patterns.

First Image 2400A in FIG. 24 depicts the SE1010 UWB transceiver with dipole antenna according to embodiments of the invention together with its resulting gain radiation pattern in second Image 2400B in FIG. 24. Third image 2400C in FIG. 24 depicts the SR1020 transceiver with dipole antenna whilst fourth Image 2400D depicts the resulting gain radiation pattern.

The monopole antenna is vertically polarized and provides an omni-directional radiation pattern with a maximum realized gain of 3.5 dBi at 5.5 GHz for the SR1010 and of 3 dBi at 7 GHz for the SR1020. Its-10 dB impedance bandwidth starts at 3.5 GHZ and extends up to 6 GHz for the SR1010 and starts at 6.3 GHZ and extends up to 9.35 GHz for the SR1020.

Figure 25:
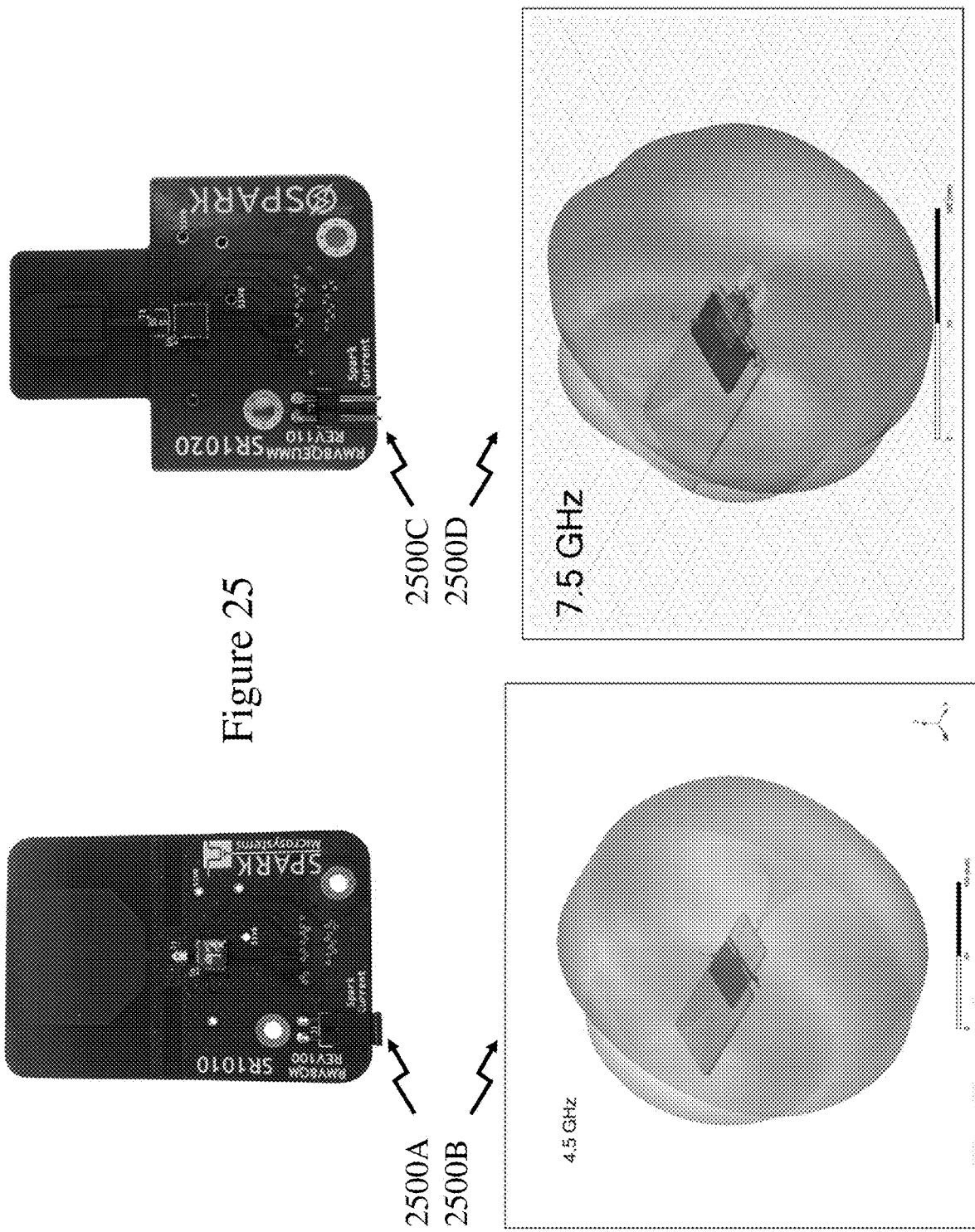
FIG. 25 depicts UWB transceivers with monopole antennae according to embodiments of the invention together with their resulting gain radiation patterns.

First Image 2500A in FIG. 25 depicts the SE1010 UWB transceiver with monopole antenna according to embodiments of the invention together with its resulting gain radiation pattern in second Image 2500B in FIG. 25. Third image 2500C in FIG. 25 depicts the SR1020 transceiver with monopole antenna whilst fourth Image 2500D depicts the resulting gain radiation pattern.

Figure 26:
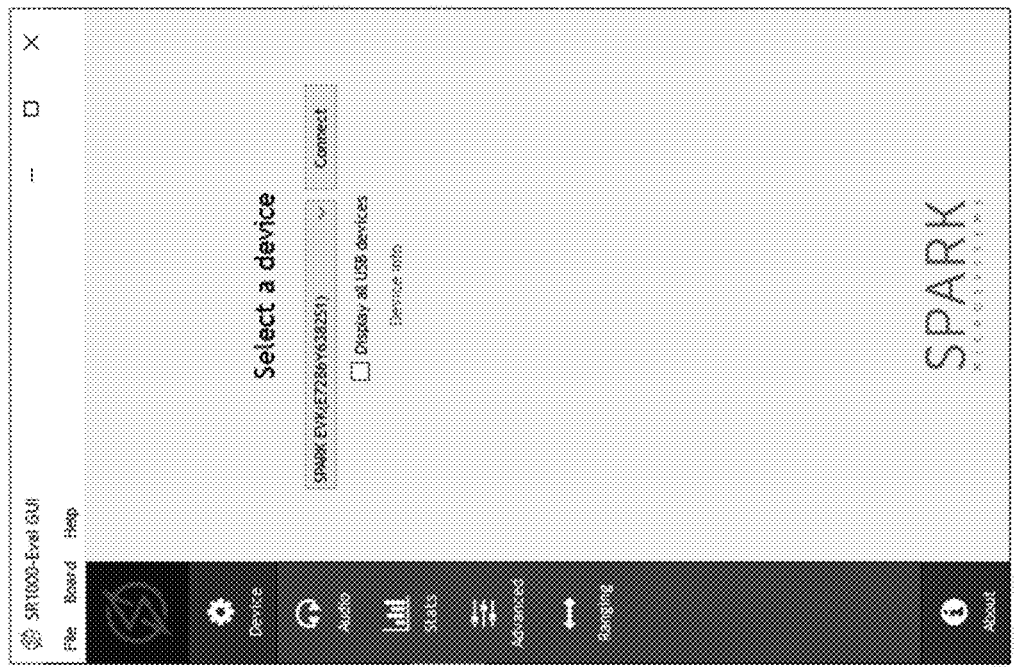
FIG. 26 depicts a graphical user interface (GUI) for a home window of a software application controlling and/or configuring a UWB device according to an embodiment of the invention.

Referring to FIG. 26 there is depicted a graphical user interface (GUI) for a home window of a software application controlling and/or configuring a UWB device according to an embodiment of the invention. The "Display all USB devices" checkbox is used when the user's computer does not automatically detect a connected device or devices. As depicted on the left hand side of the GUI the user can select different modes, audio, stats, advanced and ranging.

If the user selects audio mode then the GUI in conjunction with a HDK or WSK allows for evaluation of an audio streaming mode of the UWB transceivers which represents a real-time, high datarate application. Within demonstration environments the audio signal or audio stream may not pre-processed or post-processed, nor the audio stream compressed. The results indicated within FIGS. 27 to 31 were obtained under this scenario using an analog audio signal digitized with a standard commercial ADC of an audio codec, the Maxim™ stereo codec MAX9809, streamed to the first UWB transceiver according to an embodiment of the invention, transmitted wirelessly, and then received on the other end by another UWB transceiver according to an embodiment of the invention. The received audio being then streamed to another codec and converted to an analog signal by its DAC for playback.

Figure 27:
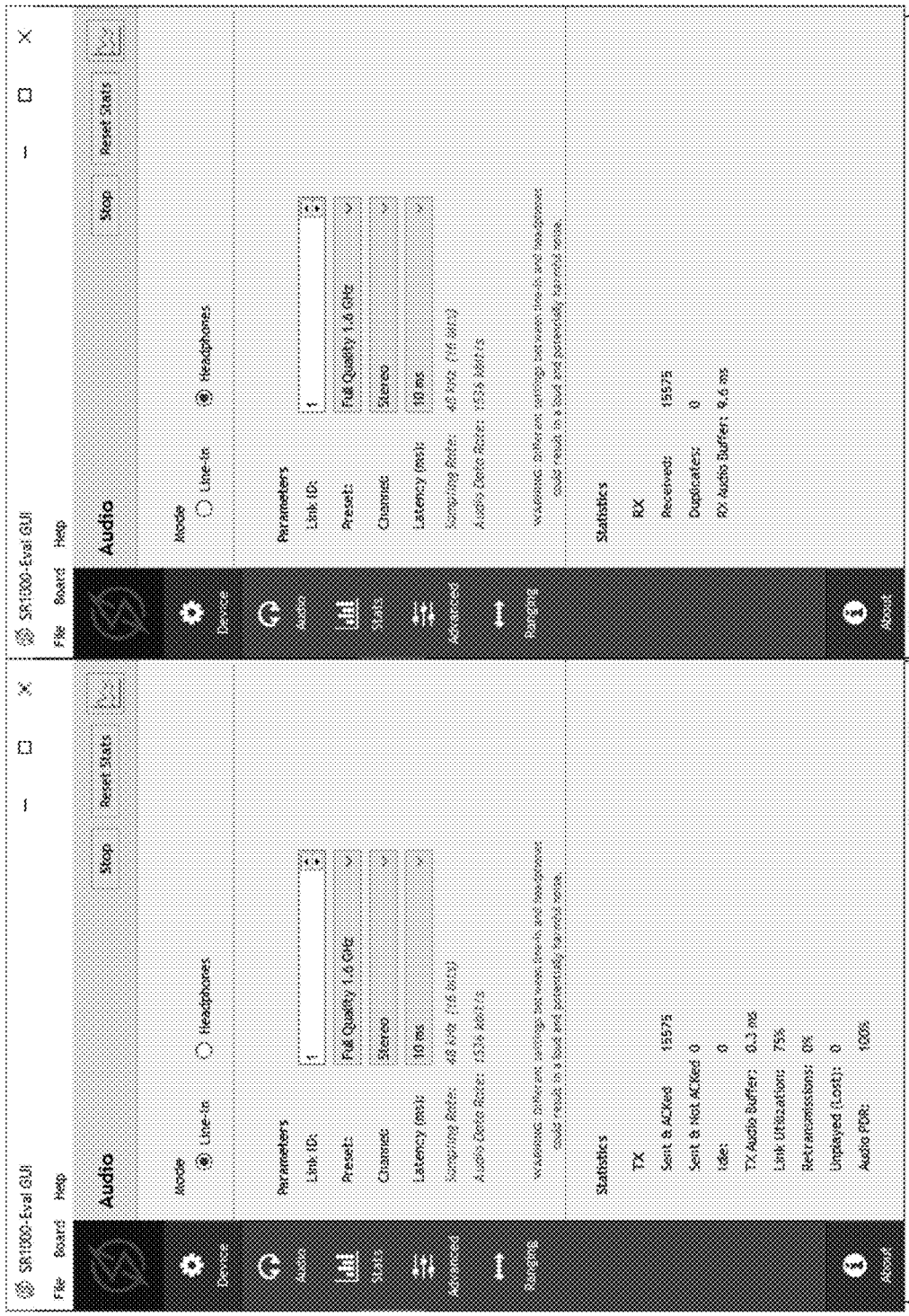
FIG. 27 depicts audio mode GUIs for transmitter and receiver configuration for a software application controlling and/or configuring UWB devices according to an embodiment of the invention.

Audio Mode: FIG. 27 depicts first and second audio mode GUIs 2700A and 2700B respectively for transmitter and receiver UWB transceivers respectively within a software application controlling and/or configuring UWB devices according to an embodiment of the invention. In audio mode the evaluation GUI provides 4 audio presets, these being:
  Full Quality (BW: 1.2 GHZ);
  Full Quality (BW: 1.6 GHZ);
  Half Quality (BW: 1.2 GHZ); and
  Half Quality (BW: 1.6 GHZ).

All presets allow boards to be set as Line-In or Headphones. The differences between the presets are as follows:
  Quality Full or Half. This setting controls the audio sampling frequency. When set to Full Quality, the sampling frequency is 48 kHz. When set to Half Quality, the sampling frequency is 24 kHz.
  Bandwidth 1.2 GHZ (SR1010 only) or 1.6 GHz. This setting controls the bandwidth usage. The user may change this based on different environments, such as indoor/outdoor, open fields, or 5 GHz Wi-Fi interference. An exemplary configuration being to use the 1.2 GHz BW configuration in environments with strong 5 GHz Wi-Fi interference. Other embodiments of the invention may provide for automatic detection of the 5 GHz Wi-Fi interference and enable the system to automatically compensate for different link conditions, as the UWB Transceivers according to embodiments of the invention are capable of modifying their spectrum usage in real-time over its operating band.

Some audio settings may be manually adjusted, such as:
  Latency Three settings are available: 5 ms, 10 ms and 20 ms. The latency corresponds to the size of the audio buffers used by the system. More latency translates into a more resilient audio link.
  Channels Mono or Stereo. The Mono mode has the advantage of allowing more retransmissions compared to the Stereo mode since it requires half the channel capacity, which translates into more range. The audio transmitter will send only the left samples, and the receiver will use them to feed the left and right channel.

Link ID: There may be multiple Link identities (Link IDs) to select from, for example 4, depending on the audio quality. In order for two units to communicate, they must share the same Link ID. Link IDs are useful when multiple concurrent audio links are running in the same vicinity. When running concurrent audio links, each different Link ID should be established for different pairs of UWB transceivers. For example, a first Link ID may be associated with UWB transceivers providing audio streaming to a pair of headphones from a smartphone whilst another Link ID is associated with another pair of UWB transceivers streaming the audio to a loudspeaker from a PC in the same room.

Figure 28:
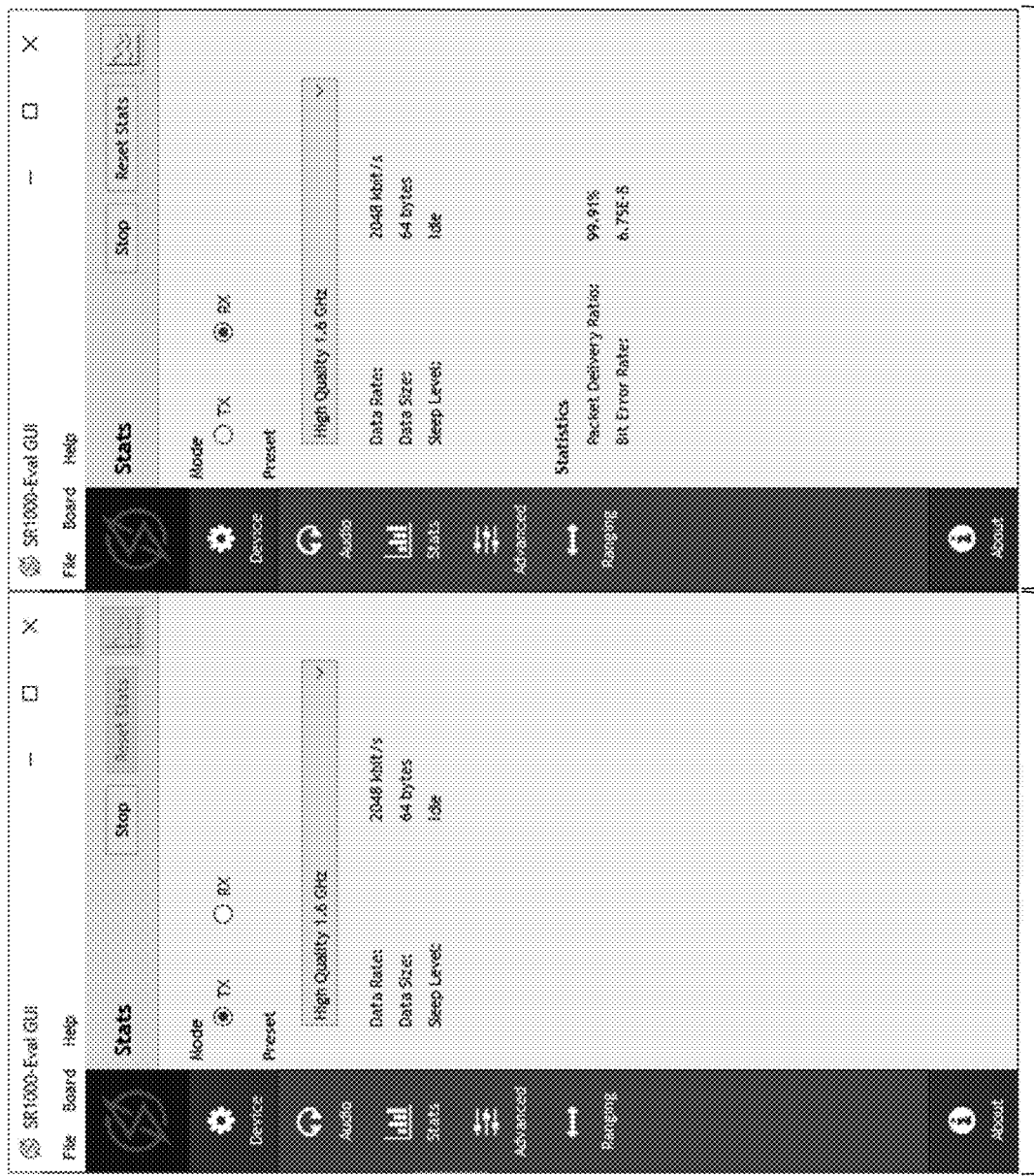
FIG. 28 depicts statistics mode GUIs for transmitter and receiver configuration for a software application controlling and/or configuring a UWB device according to an embodiment of the invention.

Statistics: As radio links with the PHY embodiments implemented within the HDK and WSK employ acknowledgements, transmitter (TX) and receiver (RX) statistics are available. FIG. 28 depicts first and second statistics mode GUIs 2800A and 2800B for transmitter and receiver UWB transceivers respectively within a software application controlling and/or configuring a UWB device according to an embodiment of the invention. Exemplary statistics options provided to the user within the GUI may include:
  Sent & ACKed: The number of unique audio packets transmitted.
  Sent & Not ACKed: The number of audio packets retransmitted due to not receiving an ACK.
  Idle: The number of retransmission opportunities that were not taken due to the link being healthy.
  TX Audio Buffer: The number of milliseconds of audio in the transmitter's audio buffer. In a normal situation, this buffer is almost empty.
  Link Utilization: The proportion of time used for transmitting and retransmitting audio packets over the total link capacity. The formula is as follows:

$$(\text{Sent \&}ACKed + \text{Sent \&}NotACKed) =$$
$$(\text{Sent \&}ACKed + \text{Sent \&}NotACKed + \text{Idle}) \times 100.$$

Retransmissions: The proportion of time used for retransmitting audio packets over the total link capacity. The formula is as follows:

$$(\text{Sent \&}NotACKed = (\text{Sent \&}ACKed + \text{Sent \&}NotACKed + \text{Idle})) \times 100.$$

Unplayed (Lost): The number of audio packets that will never be played due to the transmitter's audio buffer overflowing.
  Audio PDR: The audio packet delivery ratio. The formula is as follows:

$$(\text{Sent \&}ACKed + \text{Unplayed (Lost)}) = \text{Sent \&}ACKed\ 100.$$

Received: The number of unique audio packets received.
  Duplicates: The number of duplicated audio packets received. This happens when the receiver successfully receives an audio packet but the transmitter fails to receive the corresponding ACK.
  RX Audio Buffer: The number of milliseconds of audio in the receiver's audio buffer. In a normal situation, this buffer is almost full.

Statistics Mode: The statistics mode allows users to evaluate unidirectional randomized data transfers at different rates. A lower datarate preset will allow for a greater communication distance. For example, 8 statistics presets may be presented to the user:

High Datarate (BW: 1.2 GHz)
Medium Datarate (BW: 1.2 GHZ)
Low Datarate (BW: 1.2 GHZ)
Very Low Datarate (BW: 1.2 GHZ)
High Datarate (BW: 1.6 GHZ)
Medium Datarate (BW: 1.6 GHz)
Low Datarate (BW: 1.6 GHz)
Very Low Datarate (BW: 1.6 GHZ)

The differences between the presets are as follows:

Datarate: This is the payload datarate (not the over-the-air datarate) which are:

High 2048 kbps.
Medium 1024 kbps.
Low 512 kbps.
Very Low 100 kbps.

Data Size: This is the payload data size (not the over-the-air data size).

High 64 bytes.
Medium 32 bytes.
Low 16 bytes.
Very Low 69 bytes.

Sleep Level: All presets use the Idle sleep level except the Very Low preset which uses the Deep Sleep level mode wherein the majority of the UWB Transceiver is powered down when not transmitting or receiving.

Bandwidth: 1.2 GHZ (SR1010 only) or 1.6 GHz. This setting controls the bandwidth usage. The user may change this based on different environments, such as indoor/outdoor, open fields, or 5 GHz Wi-Fi interference although within other embodiments of the invention the UWB Transceiver may provide spectrum sensing and accordingly automatically compensate for different link conditions, as the UWB Transceivers according to embodiments of the invention are capable of modifying their spectrum usage in real-time over the operating band.

Figure 29:
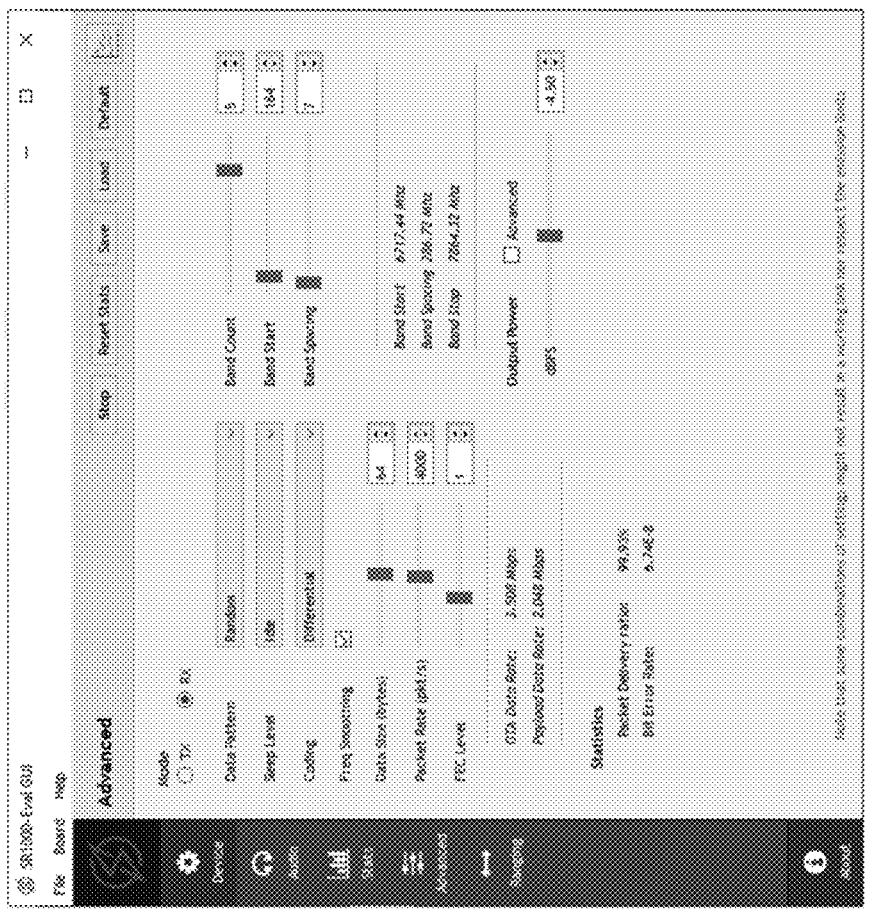
FIG. 29 depicts an advanced mode GUI for a software application controlling and/or configuring a UWB device according to an embodiment of the invention.

As within the exemplary SDK to which the GUI in FIG. 29 relates establishes the link as unidirectional in this mode, the statistics are computed at the receiver. The statistics will only be displayed in the receiver window. These comprising:

Packet Delivery Ratio: Percentage of packets received successfully since the data stream has started or the Reset Stats button was pressed.

Bit Error Rate: Estimation of bit error rate during the reception of packets.

Advanced Mode: This mode allows users to manually set various transceiver and link parameters and test with unidirectional transfers according to these applied settings. In this mode some combinations of settings might not result in a working link nor respect the emission limits of local standards for UWB transmissions. Referring to FIG. 29 there is depicted an advanced mode GUI for a software application controlling and/or configuring a UWB device according to an embodiment of the invention. For example, within an advanced mode the user may be able to configure the following parameters with respect to the UWB Transceivers:

Data Pattern Content of the Payload. This may be random, filled with pseudo-random data, all 1's filled with 0xFF, or 1's & 0's filled with 0xAA.

Sleep Level. Determines the power consumption of the transceiver when asleep and plays on the maximum duty cycle achievable. This may for example be:

Idle: Light Sleep Level. Takes approximately 500 ns to get back to active state. Typical current consumption is 250 µA in this mode at 3.0 V battery voltage for exemplary UWB Transceivers according to embodiments of the invention.

Shallow: Moderate Sleep Level. Takes approximately 16 µs to get back to active state. Typical current consumption is 50 µA in this mode at 3.0 V battery voltage for exemplary UWB Transceivers according to embodiments of the invention.

Deep: Deep Sleep Level. Takes approximately 3 ms to get back to active state. Typical current consumption is 750 nA in this mode at 3.0 V battery voltage for exemplary UWB Transceivers according to embodiments of the invention.

Coding The way bits are represented over the air.

Frequency Smoothing. This does slight frequency dithering to smooth out the spectrum energy spread when activated.

Data Size. Can be set from 1 to 124 bytes. The link layer running on the EVK, HDK, WSK according to embodiments of the invention has the MCU encapsulating the data with a 4-byte header, hence the maximum limit of 124 bytes. Within other embodiments of the invention the data size and header may be different sizes/ranges.

Packet Rate. The maximum achievable packet rate depends on the chosen sleep level, packet size, FEC level and modulation. Its upper limit is automatically set when changing any of the aforementioned settings. This limit is set according to an empirical calculation although within other embodiments of the invention this limit may be set by historical data analysis or in dependence upon the output of a machine learning algorithm.

FEC Level. The forward-error correction level the transceiver will use to recover damaged frames. For example settings may be: 0 is no FEC, 1 is a FEC rate of 3/4, 2 is a FEC rate of 3/5 and 3 is a FEC rate of 1/2.

Band Spacing The space between two adjacent bands' center frequency. For example this may be set to increments of a base frequency step, e.g. 40.96 MHz.

Band Count The number of bands the system will sequentially hop on. The minimum is 1 and the maximum may be defined, for example 2, 3, 6, 8 etc.

Band Start The first band's center frequency. For example this may be set to increments of a frequency step, e.g. 40.96 MHz.

Band Stop The last band's center frequency. This is automatically calculated based on the band spacing, band start and band count settings.

Figure 30:
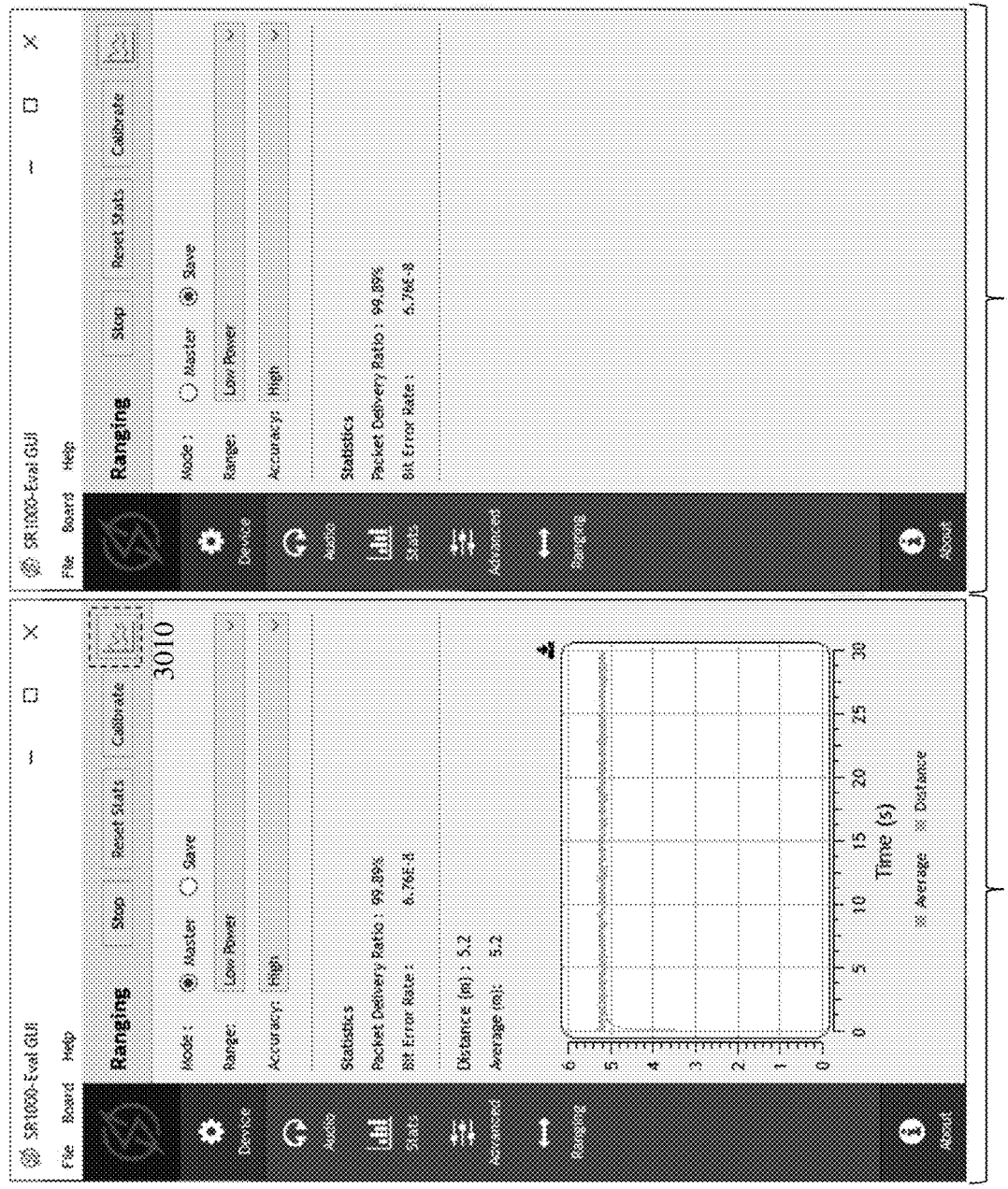
FIG. 30 depicts ranging mode GUIs for transmitter and receiver configuration for a software application controlling and/or configuring a UWB device according to an embodiment of the invention.

Ranging Mode: This may allow users to evaluate the distance between two UWB Transceiver and employs time of flight to calculate this distance and can measure from 0.5 m up to 100 m in line of sight. The ranging's band frequencies may, for example, be 3.93 GHZ for the SR1010 and 7.29 GHz for the SR1020. However, other discrete frequencies as well as multiple frequencies within the operating range of a UWB Transceiver according to embodiments of the invention may be employed. Within some instances a ranging mode may be one way ranging although within others it may be both ways with subsequent communications and averaging. FIG. 30 depicts ranging mode GUIs in first and second Images 3000A and 3000B for transmitter and receiver within a software application controlling and/or configuring a UWB device according to an embodiment of the invention.

Ranging: In this mode, the user can perform distance measurements between a slave and master device. The state of the link can also be monitored. The calculated distance will appear once the master device receives valid data from the slave device.

Calibration: This mode allows the user to change the default calibration value of the system in order to increase the accuracy of measurements given the user situation. The accuracy for both Low Output Power and High Output Power modes is given in Table 4.

TABLE 4

Exemplary Accuracy and Range Limits for Operating Modes

| | Minimum Range | Maximum Range | Default Accuracy | Calibrated Accuracy |
|---|---|---|---|---|
| Low | 0.5 m | 25 m | 0.5 m | 0.3 m |
| High | 1 m | 100 m | 1 m | 0.3 m |

In order to achieve different ranging ranges the output power of the transmitter may be increased such as indicated in Table 4. This allows the user to change between close and long range. It is important to note that each power state may require its own calibration procedure.

Figure 31:
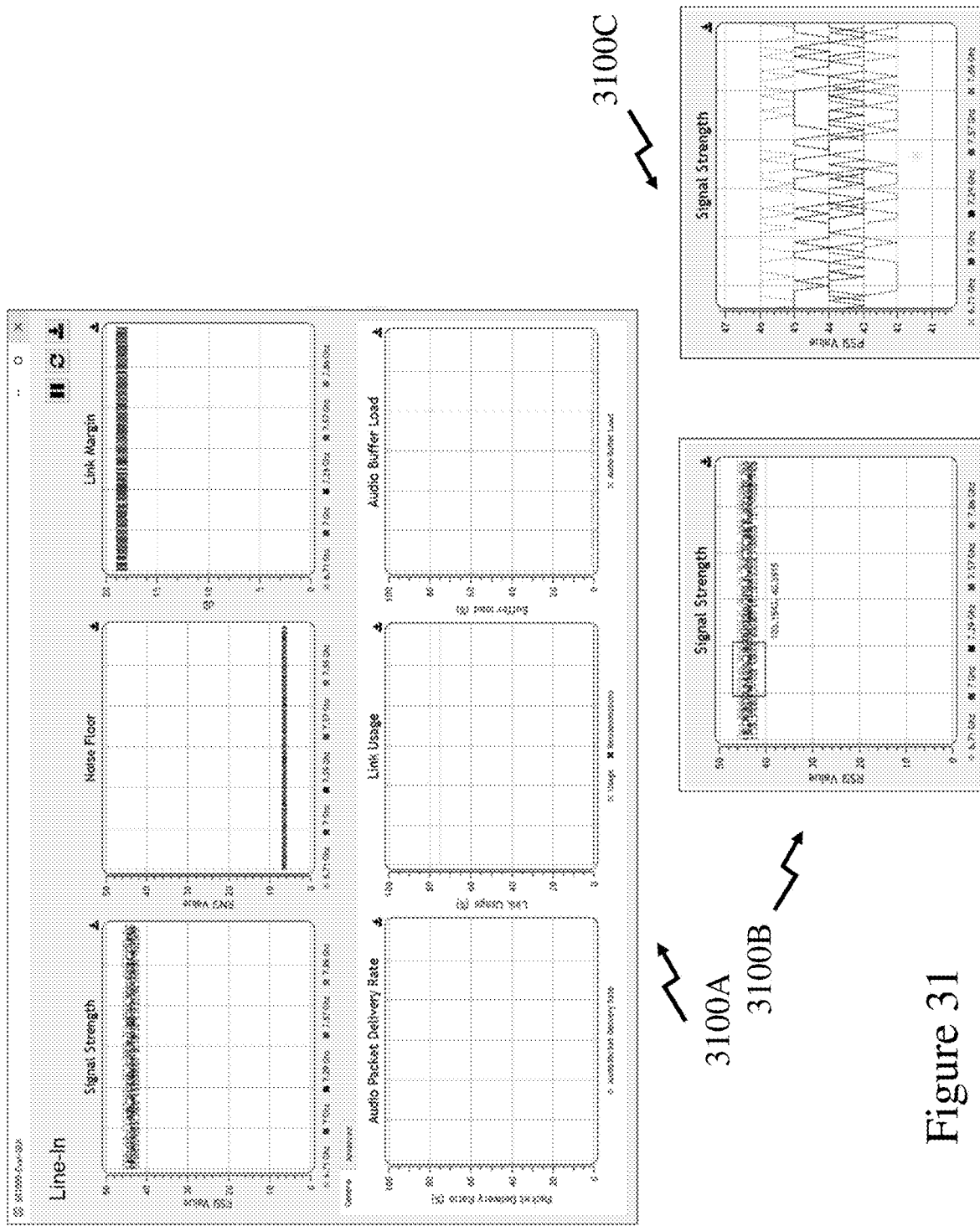
FIG. 31 depicts a plotter mode GUI and zoomed time domain GUI for a software application controlling and/or configuring a UWB device according to an embodiment of the invention.

Within the different GUIs a Plotter Function may be provided as an option, see for example Icon 3010 in FIG. 30. In this mode the GUI allows visualization of real time link quality monitoring plots. FIG. 31 depicts in first Image 3100A a plotter mode GUI for a software application controlling and/or configuring a UWB device according to an embodiment of the invention. This provides visualization, for example of Signal Strength, Noise Floor, Link Margin, Audio Packet Delivery Rate, Link Usage and Audio Buffer Load when triggered within the Audio Mode. Further as depicted in second and third Images 3100B and 3100C wherein a user can select a time frame within the displayed range and view at increased resolution. As evident from these second and third Images 3100B and 3100C the plots show data for all bands. Optionally, the presented data may be filtered to one or more bands of the transmission rather than all bands employed.

As outlined above embodiments of the invention support UWB Transceiver ASICs through providing one or more hardware evaluation kits, e.g. WSK and HDK, and one or more software development kits, e.g. SDK. Focusing to the SDK then this includes code and modules relating to:

Managing, configuring and calibrating UWB Transceivers.
Establishing network topologies such as point-to-point, star and mesh.
Providing a wireless protocol stack, audio core and the transceiver-level application programming interface (API).
Controlling and configuring link configuration aspects such as channel hopping, loop gain, and scheduler methodologies
Audio core mechanisms for providing clock drift compensation and sampling rate conversion.
Wireless protocol stack building blocks such as a scheduler and synchronization modules and methods.
Wireless protocols to support a wide range of application such as ones based on multicasting and broadcasting.
Microcontroller peripheral device drivers.

The EVK and HDK according to embodiments of the invention address packaging, design and layout of elements including component placement and signal routing, and user interfaces.

The SDK according to embodiments of the invention address aspects of the Link Layer including, but not limited to:

Wireless Protocol Stack (WPS).
TDMA, FDMA & Scheduler Modules implementation and methodology.
ARQ Modules and Methods.
All Link Layer State Machine including Channel Hopping Modules and Retransmission.

As noted above the RF channels used for a transmission can vary from one time slot to the other (or not), and from one device to the other (or not). This can happen dynamically in a predetermined or random manner. More bandwidth than an application requires may be allocated to provide a retransmission margin. If the datarate the application needs is under the peak datarate achievable and no retransmissions are needed because the link is in perfect health, some timeslots will be unused and no transmissions will happen in them. On the other side, if the link is bad, transmissions will potentially occur in all timeslots, leading to a 100% link usage; the retransmission margin is used entirely. Accordingly, embodiments of the invention provide for:

Cross Layer Queuing and management.
Performance Statistics and methods to derive them.
Graphical User Interface.
Clear Channel Assessment (CCA) Module and Methods.
Concurrency Framework and Methodology.
Beaconing Module and Methodology.
Time Slot Methods for Band Hopping.

Figure 32A:
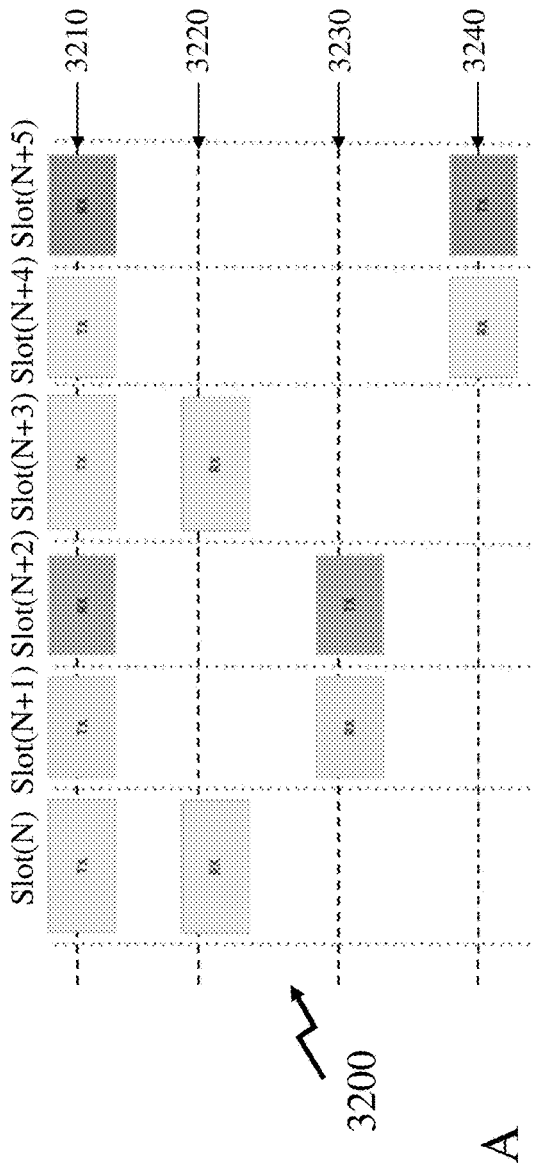
FIG. 32A depicts exemplary master-slave interactions according to an embodiment of the invention between a master UWB device and multiple slave devices.

According to embodiments of the invention UWB Transceivers are orchestrated at given times to transmit, to put the transceiver to sleep, and to listen for an incoming frame. It is the slave device's job to make sure it is always synchronized to the master by continuously adjusting its duty cycling period. The master's duty cycling period stays constant. Devices access the media in a time-division multiple access (TDMA) fashion. A typical timeslot grid for all devices within a link is shown in Image 3200 in FIG. 32 wherein the actions of a Master 3210 and a series of first to third Slaves 3220 to 3240 respectively are shown for a sequential set of timeslot.

According to embodiments of the invention UWB Transceivers can support point-to-point, mesh and star network topologies are achieved with the system. A point-to-point link example is an audio application with a unidirectional or bidirectional transmission of data over-the-air over a single link between two devices. A mesh network topology example is an IoT scenario where any node can relay information between other nodes. A star network topology example is an audio broadcast or multicast in which multiple devices are communicating with a master device (receiving audio from the master). Another example is a gaming hub where the hub is the central node communicating with a headset, mouse and keyboard for example.

Figure 32B:
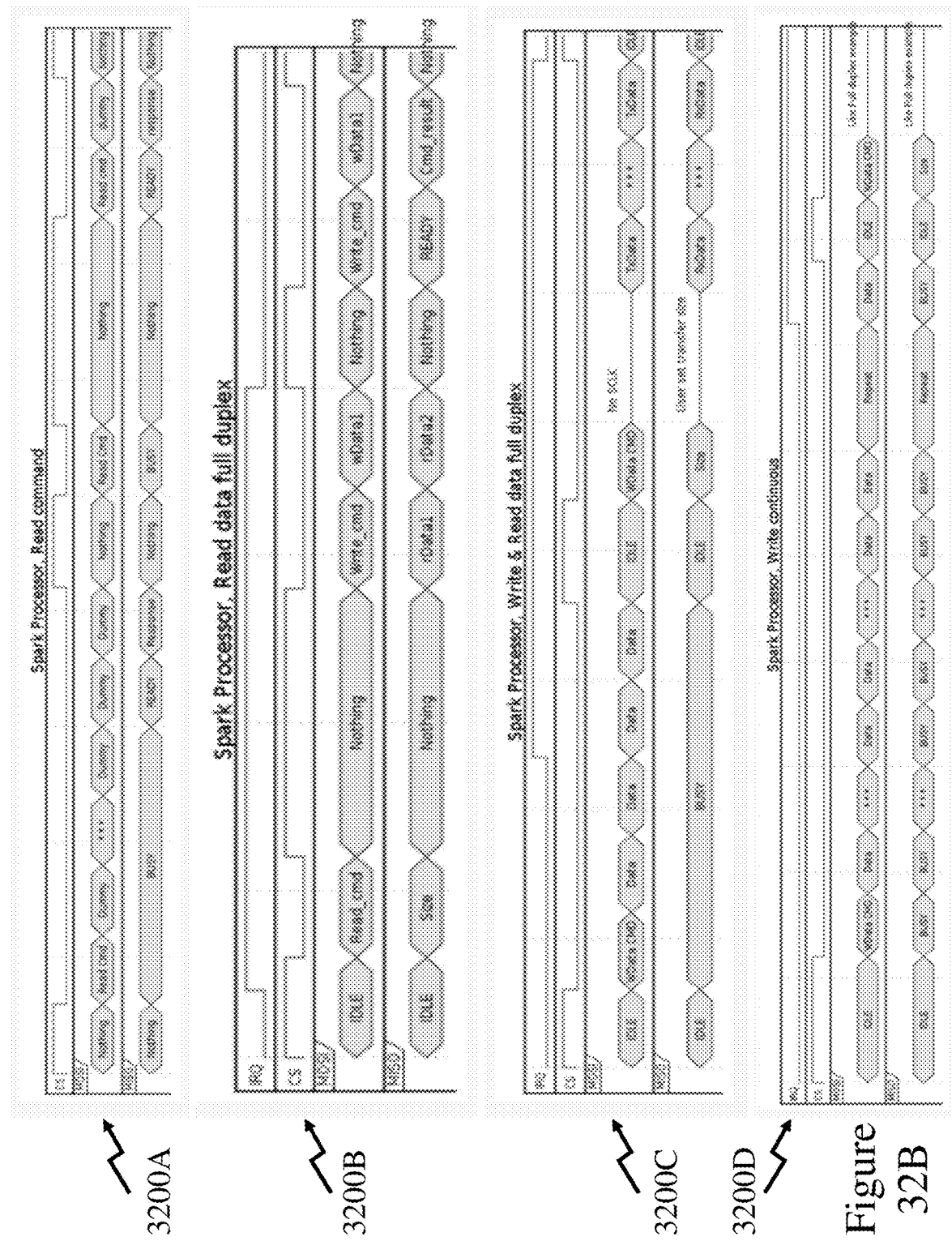
FIG. 32B depicts exemplary timing implementations according to embodiments of the invention for a SPI Protocol Core of a UWB Transceiver such as depicted in FIG. 9.

As noted previously embodiments of the invention may provide an SPI interface to the external environment. Accordingly, the inventors have established a SPI protocol core to transfer data from the external interface to the core of the UWB Transceiver. Exemplary timing diagrams for read command, read data at full duplex, write and read data at full duplex and continuous write are depicted in FIG. 32B in first to fourth Images 3200A to 3200D respectively.

Embodiments of the invention provide for a low latency UWB multi-point to point network protocol with heterogenous datarate support. A network stack according to an embodiment of the invention allows coordinated concurrent behavior by leveraging Frequency Domain Multiple Access (FDMA) and Time Domain Multiple Access (TDMA). FDMA schedules provide concurrent links on different frequency channels transmitting at the same time, while TDMA schedules concurrent links on the same frequency channel but transmitting at a different time. The FDMA principle can be extended within embodiments of the invention such that transmitters can operate on frequency band hopping sequences, and concurrent operation is established by transmitters having non-overlapping hopping sequences.

According to an embodiment of the invention to establish network timing and the start of a super frame, one device is designated a network coordinator, and periodically transmits a beacon. The time in between beacons is subdivided into time slots. When crossing a time slot boundary, a transmitter in the network has to switch frequency band to the next one in the hopping sequence, such as described above. Each time slot can therefore be considered to have a number of simultaneous FDMA streams equal to the number of non-overlapping hopping sequences. Each FDMA stream in a time slot is further subdivided into TDMA sub-slots, allowing concurrent links to share a timeslot while using the same hopping sequence. Depending on datarate requirements, each link can occupy a lesser or greater portion of the time slot.

Accordingly, the network can be scheduled by assigning sub-slots and FDMA streams to each of the links in a network. As long as the links do not overlap in either hopping sequence or time, concurrent operation is provided. A mix of multiple low and high datarate links can therefore be supported simultaneously.

Now considering provisioning of audio and video via UWB Transceivers according to embodiments of the invention the software and/or firmware (e.g. SDK) manages aspects of the transmission including, but not limited to:
 Audio Frame-Packet Structure
 Video Frame-Packet Structure
 Audio Application & APIs
 Audio Core & Audio State Machine—See document
 Clock Drift Compensation—See document
 Sampling Rate Conversion
 Latency Control
 Audio Interfaces to Codecs
 Audio GUI—See document
 Multiple Radio Modules & Algorithms
 Audio Performance Statistics
 Audio Multicast & Bridging Algorithms
 Audio Smoothing Algorithms Within embodiments of the invention an audio core and its API can be used standalone without depending upon the WPS, although it would be evident that when the audio is streamed over an RF link using the UWB Transceivers that the audio will make use of the WPS. With respect to the audio core then its top-level entity are audio streams where each stream describes the audio flow from the production of audio samples to their consumption with the processing they must go through in between. Such an audio stream being depicted in Image 3300 in FIG. 3300 from audio sample producer via audio processing to the audio sample consumer.

Figure 33:
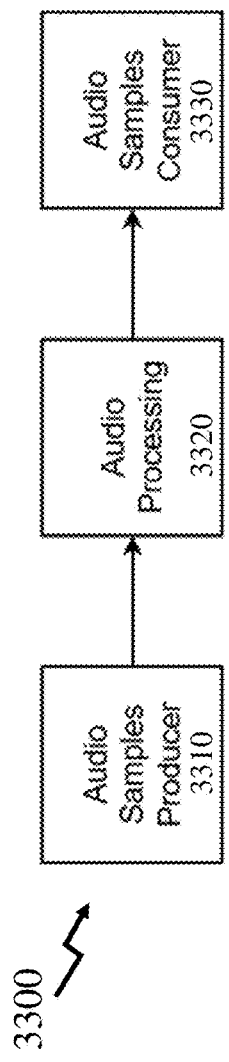
FIG. 33 depicts a process flow for an audio stream according to an embodiment of the invention.
Figure 35:
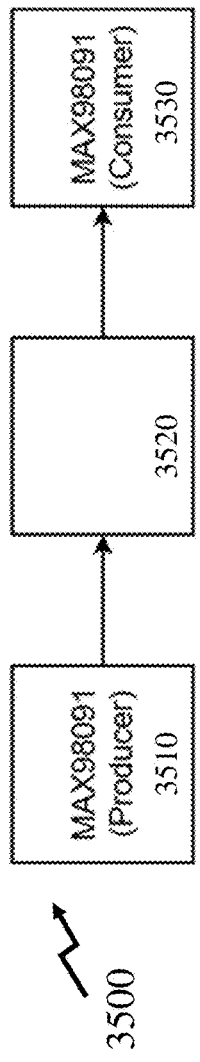
FIG. 35 depicts a process flow for loopback within electronic devices with UWB transceivers supporting an audio stream according to an embodiment of the invention.

Considering audio, although the concepts apply equally to video, then the concept of audio stream is local to an audio device (e.g. a device comprising a UWB Transceiver with associated hardware such as an EVK or HDK for example). It does not matter if the complete audio system has many audio devices and that at the system level, one audio device records audio and the other one plays it back. In FIG. 33 the producer, the audio processing and consumer are all local entities. In the audio core, audio producers and consumers are audio end-points (because they are at both end of an audio stream). To be considered a valid audio end-point, one must adhere to a specific audio interface. An audio interface is the minimal set of functions the end-point must implement. An audio end-point can be anything, as long as it produces and/or consumes audio samples. Examples of end-points may include, but not be limited to:
 A hardware audio codec.
 A network stack (e.g. a WPS according to an embodiment of the invention
 A USB Stack with the USB-Audio class.
 A dummy audio codec which generates a pre-recorded signal, e.g. a sine wave.
 A I2S interface used to create an audio pipe.
 A UART interface (for inter-board communication, where in one embodiment we can substitute a WPS according to an embodiment of the invention for a UART).

The audio processing box represents any operations that will modify the produced samples in some way before they are being consumed. The audio core according to an embodiment of the invention provides built-in audio processing stages that a developer could use for his application by simply configuring and activating them. These processing blocks may include, but are not limited to:
 Sampling rate conversion.
 Clock drift compensation.
 Compression/decompression.

Optionally, a user may also integrate other audio processing into the audio stream, if for example, the UWB Transceiver/EVK/HDK/SDK combinations or discrete elements providing the audio core do not provide what is needed or the user wishes to use their own implementation. Accordingly, within the following description of exemplary scenarios and components of the audio an audio stream contains an audio producer, some audio processing and an audio consumer.

Figure 34:
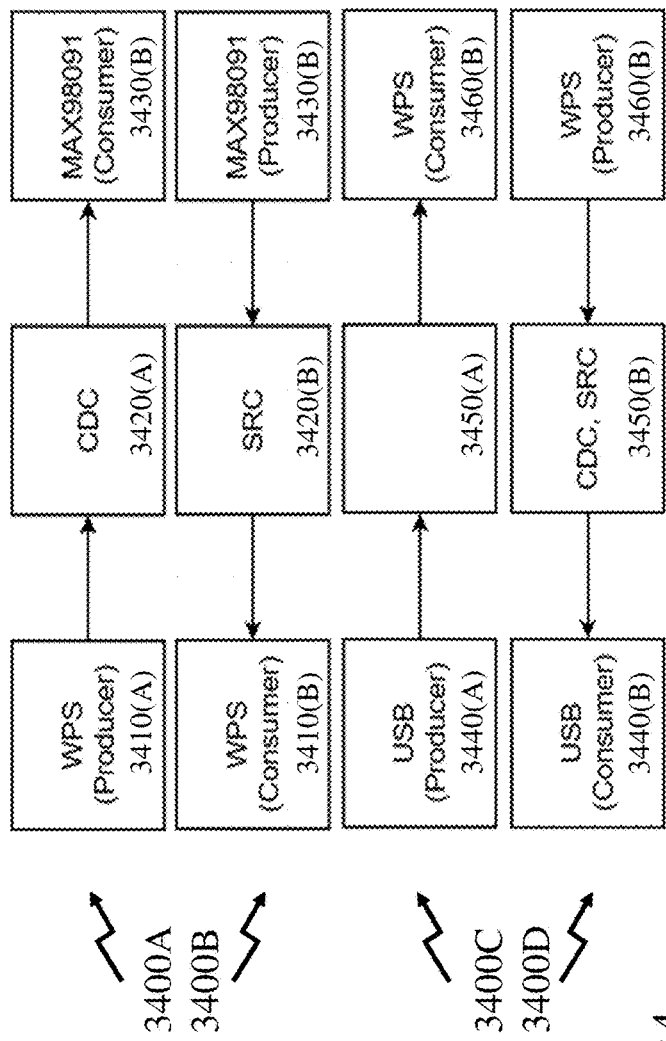
FIG. 34 depicts process flows for pair of electronic devices with UWB transceivers supporting an audio stream according to an embodiment of the invention.

Example: Headset System: Suppose we have a headset system, which is comprised of 2 audio devices (a headset and a dongle). It uses UWB Transceivers according to embodiments of the invention to provide the link between the headset and the dongle. The headset receives audio from the dongle and sends back audio to the dongle (e.g. microphone). Accordingly, there are two audio streams on the headset as depicted in first and second Images 3400A and 3400B in FIG. 34 which depict the headset main audio stream and headset-microphone audio streams respectively.

These audio streams are local to the headset. For the main audio stream, first Image 3400A, the headset receives the samples from the WPS. So from the headset perspective, the producer is the WPS and not the USB Stack of the dongle (assuming the dongle is a USB dongle). Same principle applies for the microphone stream in second Image 3400B. Now referring the dongle streams then these are depicted in third and fourth Images 3400C and 3400D respectively in FIG. 34.

Example 2: Audio Loopback: This is an example where a user wishes to playback what is being recorded on the same audio device. Here, we could record what is on the Line-In of the audio codec and play it back on the Line-Out on the same codec. This is done with a single audio stream as depicted by Image 3500 in FIG. 34 which depicts the audio stream for loopback within electronic devices with UWB transceivers supporting an audio stream according to an embodiment of the invention.

Figure 36:
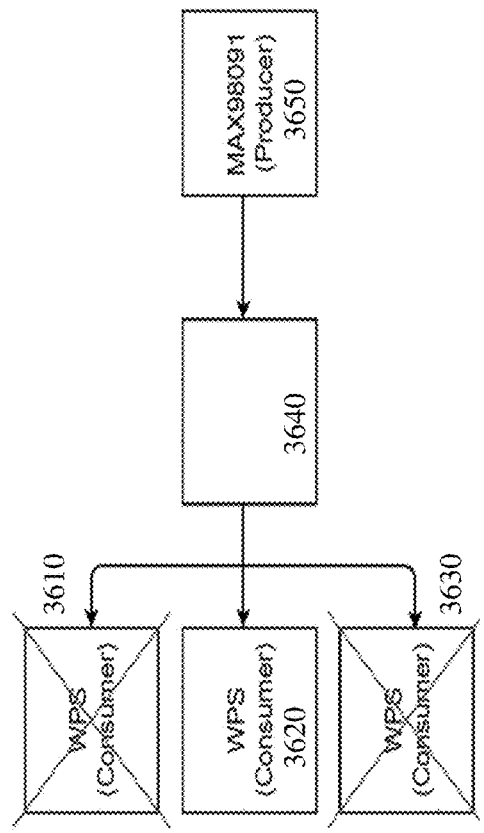
FIG. 36 depicts a process flow for multicasting with electronic devices with UWB transceivers supporting an audio stream according to an embodiment of the invention.

Example 3: Multicast: An audio system can also have multiple wireless playback audio devices like in the case of audio multicasting. Considering the audio stream on the recording device, we would still see a single consumer (the WPS), because every receiving device would listen to the same audio transmission at the same time. From the perspective of the recording device, all the playback devices are reachable using the same WPS connection. FIG. 36 depicts this audio stream for multicasting with electronic devices with UWB transceivers supporting an audio stream according to an embodiment of the invention.

Figure 37A:
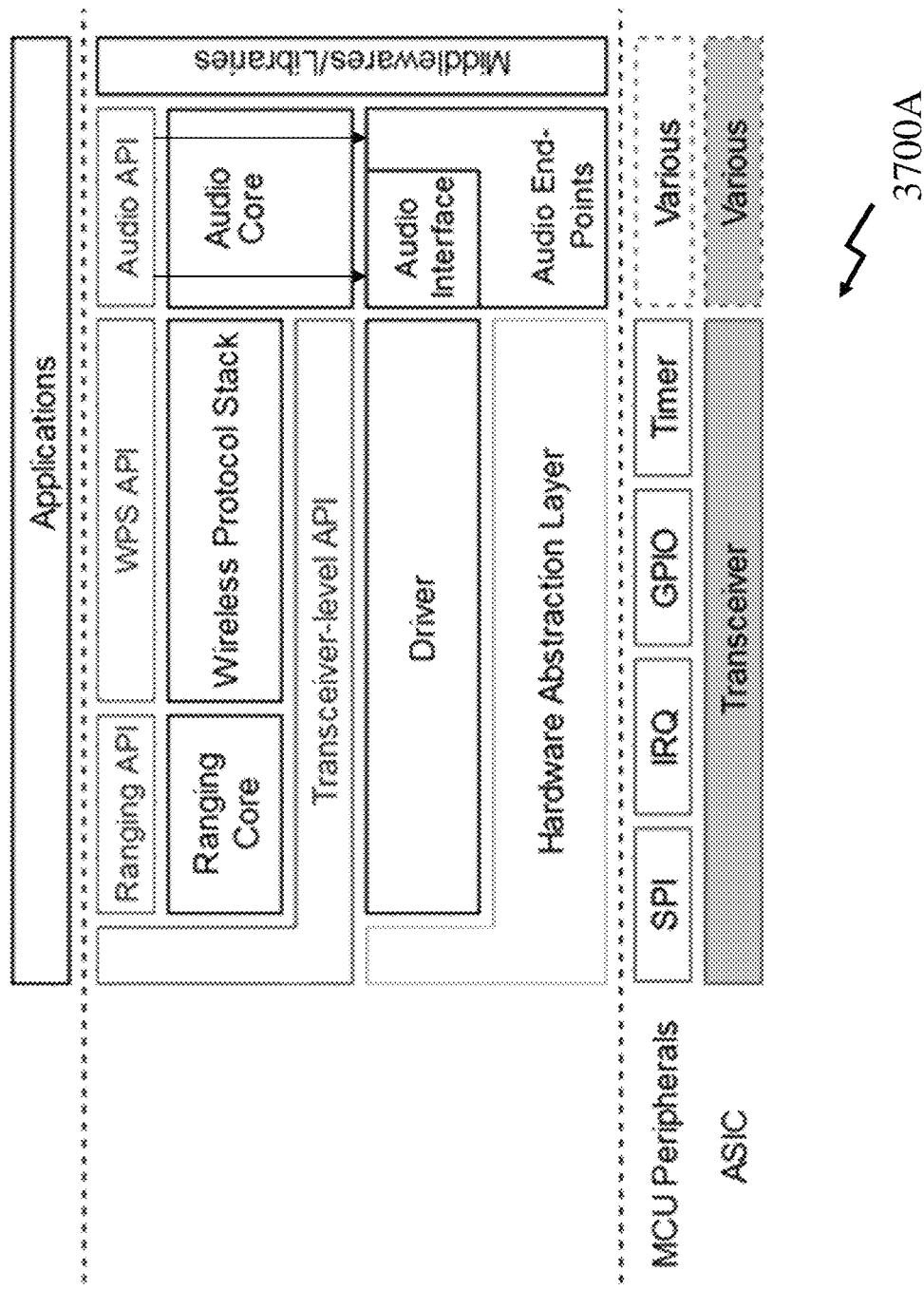
FIGS. 37A and 37B depict system block diagrams of an electronic device with UWB transceiver supporting applications including audio streaming according to an embodiment of the invention.

Now referring to FIG. 37A in first Image 3700A there is depicted system block diagrams of an electronic device with UWB transceiver supporting applications including audio streaming according to an embodiment of the invention. At the bottom are the MCU peripherals (e.g. interfaces etc.) which provide/receive electronic data from the cores/endpoints etc. and the UWB Transceiver which transmits/receives wireless signals (data) to the elements within the middle layer whilst the Applications sit above this layer.

The Applications layer, or user-space, is a space controlled by a developer who wants to use the SDK. The application will call the different APIs the SDK offers, such as the Audio API and the WPS API to perform the particular task/functions required. Considering, for example, the Audio Core then this requires within some embodiments of the invention the application to take care of a few things before the Audio Core starts its work. These task performed by the Application may include, for example:

The hardware peripherals the audio end point uses (if any) have been initialized by the application. For example, if the end point uses I2C and I2S, the application must initialize them with the correct settings (e.g. bus speed for I2C, master or slave for I2S, etc.).

The ASIC the audio end point uses (if any) has been initialized accordingly. For example, if the ASIC is an audio codec, it has been configured to be I2S slave or master through the ASIC driver, the right audio input and sampling rate has been configured, etc.

The compile-time Audio Core configuration constants have been properly set. This includes some configurations about memory allocation among else.

If the application wants to send and receive data while streaming audio, the application needs to call the WPS API directly. Within this described embodiment the audio core only deals with audio streams. An exception, for example, may be if the user wants data to be piggybacked onto audio packets.

Now considering the Audio Core then this is where the audio flows are processed. It receives the configurations for the audio API. The Audio Core is comprised of several audio processing modules although the use of audio processing blocks that the Audio Core supports is optional and can be enabled or disabled through the Audio API.

The Audio application programming interface (API) is a set of public functions that the application can call to make use of the audio core. The API brings to concept of stream, endpoint and processing stage abstraction to the application. For example, the audio settings may be configured, these settings comprising for example:
Record and/or Playback.
Sampling rate.
CODEC select/config/test.
Stereo/Mono.
Bit depth.
Clock drift compensation (CDC) enable.
Decimation.
Latency.

Audio functions may for example include:
Setup.
Start/Stop.
Audio samples in/out.
Volume control.
CODEC control commands.

Figure 37B:
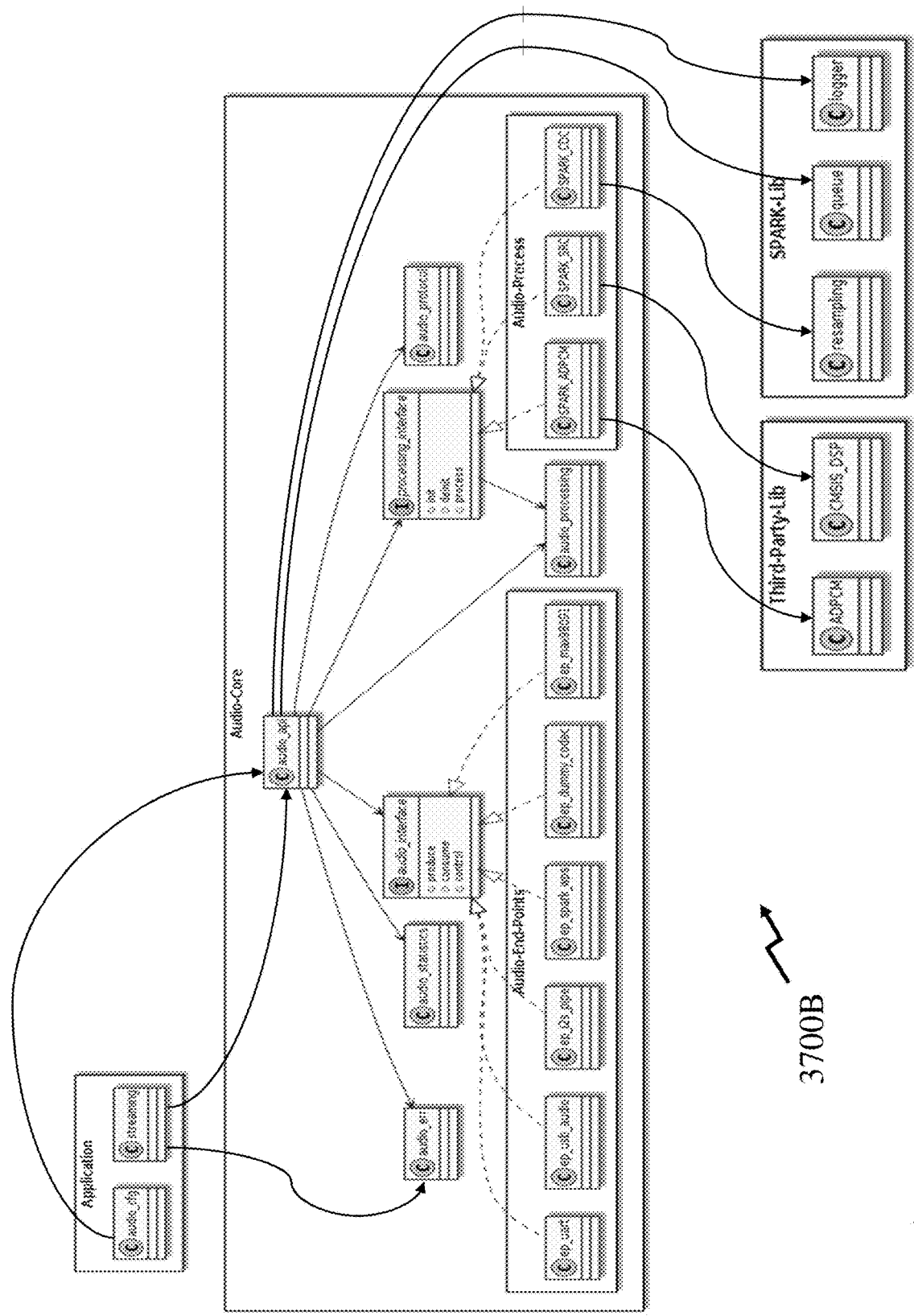
Figure 38:
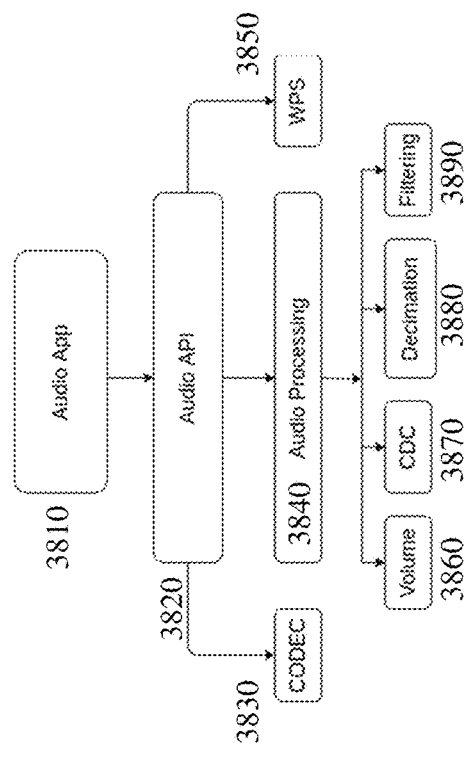
FIG. 38 depicts an exemplary flow diagram for an audio application interfaced to UWB transceivers within electronic devices according to an embodiment of the invention.

Second Image 3700B in FIG. 37B depicts exemplary interconnections between an Application, the Audio Core and its associated internal elements, a third party library and a library specific to the UWB Transceiver and/or SDK. FIG. 38 depicts an exemplary flow diagram for an audio application interfaced to UWB transceivers within electronic devices according to an embodiment of the invention.

Now considering memory management, for the example of audio, then the application is responsible for allocating audio memory space (heap) large enough to accommodate the memory needs of the audio core such as for audio buffering and processing. Once the audio core gets access of this audio heap, it can utilize it to "dynamically" allocate memory. Actually, all memory allocation is performed by the audio core at its initialization and error checking will enable the user to be informed if the size of the audio heap is too low (or too high). The audio core does not free up this memory whilst executing and no audio allocation is performed within this exemplary embodiment of the invention at a later time other than at the initialization, although within other embodiments of the invention the memory allocation may be adjusted post-initialization.

Figure 39:
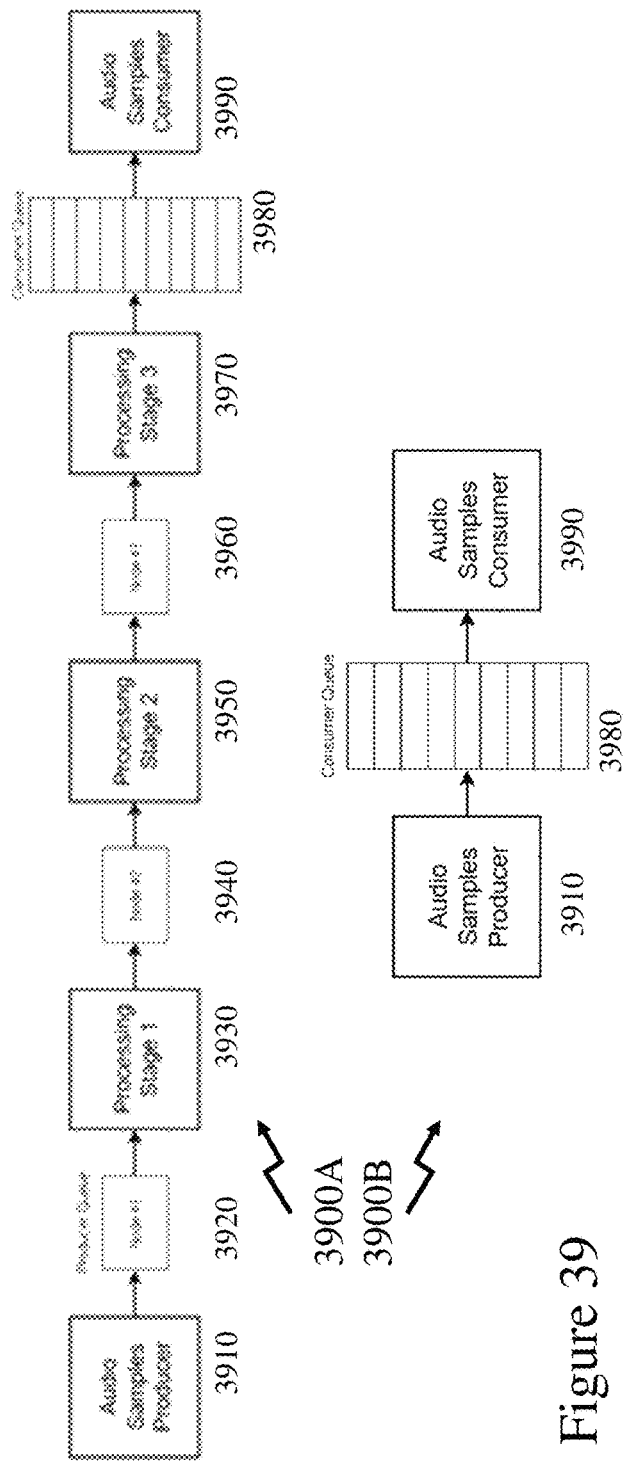
FIG. 39 depicts an exemplary process flow for an audio stream with 3 processing stages according to an embodiment of the invention.

An exemplary data structure used to manage the memory is a queue implemented with a simply linked list. This provides flexibility and enhances performance in situations where it may be required to transfer a node from one queue to another directly. First Image 3900A in FIG. 39 depicts an exemplary audio stream comprising three processing stages. When processing must be performed, the producer will get an empty node (Node #1) for the producer queue and put its samples there. The first processing stage (Stage 1) will take this node as source data, process it and output the results in another empty node (Node #2) attached to the producer queue. Then, it will free Node #1 from the producer queue since the data in it is no longer needed. The next processing stage (Stage 2), will take Node #2 as source data and will request a free node for its output. In this case, Node #1, now empty, will be picked. Accordingly, sufficient memory for only two nodes is needed for N processing stages. The last processing stage will output its processing result directly to the consumer queue, which is a bigger queue that creates the audio latency and feeds the consumer. If a stream does not have processing at all, the producer can directly use the consumer queue as output to avoid an unnecessary intermediate copy in a producer node as shown in second Image 3900B in FIG. 39.

Accordingly, a queue library for the audio core would provide, for example, functions allowing the audio core to:
create free queues of nodes from pre-allocated memory;
create queues for data storage;
enqueue/dequeue nodes to/from queues; and
other functions such as getting queues sizes and node data pointers.

A core may include a protocol. For example, with reference to the audio core this an audio protocol is employed when inter-audio device communication is necessary. An exception may be in audio loopback on a single audio device (e.g. line-in goes to line-out of a same audio codec). This protocol defines a header and a trailer for encapsulating the audio samples. Protocol features may include, but not be limited to:

- Detection of the audio clock drifting by comparing the audio buffer load on both audio devices.
- Calculating a cyclic redundancy check (CRC), e.g. CRC32, on the header and samples.
- Activating a fallback mode which compresses the audio stream or lower its sampling rate on-the-fly to help when link quality is bad by boosting either output power or retransmission margin.
- Adding/retrieving piggybacked data on audio packets. This enables the support of a small data channel without the need to create dedicated data frames and time slots.

A core may include statistics. For example, the audio core may support different audio related statistics, counters and ratios, such as audio packet delivery ratio and current audio buffer load.

A core may include endpoints. For example, an audio core may employ audio endpoints (EPs) which are used to represent "something" the audio application uses to send or receive audio samples. It can, for example, be an audio codec, a wireless protocol stack (WPS) or a UART interface. A main feature of an EP is that it exposes a standard audio interface that other layers can use. The other layers do not need to know the real nature of the EP because whatever it is, the audio interface is used in the same manner.

An EP may be defined as comprising:
- An instance specific to the EP and its kind (e.g. audio codec vs protocol stack) that can contains special parameters or hardware access functions (i.e. an object which is an instance of this particular EP).
- A name such as a character string to identify it in a human readable fashion.
- An audio interface which is the standard set of functions the end-point has implemented and expose to other modules.

In this manner an EP represents "something" that can produce and consume samples to reuse the audio interface terminology. An audio codec will be represented by an EP. If there are two different audio codecs on a board, for example, there will be one EP for each of them. Essentially, each external element is an EP to the audio core. It would be evident that an EP may also contribute to multiples audio streams, e.g. it can record samples for stream A and be used to playback samples for stream B.

A core may include an interface. For example, the Audio Core may employ an audio interface is a set of functions that each EP must comply with in order to be compatible with the audio core. These functions may include, but not be limited to, the following:

- Produce: this function is called when the audio core needs the EP to start producing audio samples (e.g. recording of samples for an audio codec).
- Consume: this function is called when the audio core needs the EP to start consuming audio samples (e.g. playback of samples for an audio codec).
- Control: this function is used perform configurations that the audio core should take care. For example, the volume control could be something the audio core could handle instead of the application. A pre-defined set of commands may be required by each or every EP.

A core may include one or more processing stages. For example, the Audio Core may include audio processing stages (PS) which are attached to a stream and represent operations that are performed on the audio samples after they have been produced by the Producer and before they are consumed by the Consumer. A PS implements a standard processing interface that the Audio Core knows about.

A PS may be defined by one or more characteristics which may include, but not be limited to:
- An instance specific to the PS and its kind (Clock Drift Compensation versus Sampling Rate Conversion) which can contain configuration parameters and states (e.g. it is object which is an instance of this particular PS).
- A name as a character string to identify it in a human readable fashion.
- A processing interface which is the standard set of functions the processing stage has implemented.
- A type that describes a category the PS belongs to (e.g. SRC, CDC, etc.).

An audio PS must offer operations that will be applied on audio samples to modify them. It can be to compress them, to modify their amplitude, to resample them, etc.

A core may include a processing Interface. For example, the Audio Core may include a set of functions that each processing stage (PS) must comply with in order to be compatible with the audio core. These functions, may for example, be the following:

void (*init)(void*instance)
void (*deinit)(void*instance)
void (*set_action)(void*instance, processing_action_t_action);
uint8_t (*process)(void*instance, uint8_t*data_in, uint8_t size, uint8_t*data_out)

When the Audio Core processes a stream, it will cycle through every registered PS and call their set_action( ) followed by their process( ) function. The set_action( ) will be used by the Audio Core to communicate to the PS the next action it needs to do. These actions are pre-defined in processing_action_t. The actions the PS needs to handle varies according to its type. For example, a PS of type CDC will need to handle every PROC_ACTION_CDC_action where a PS of type SRC will need to handle every PROC_ACTION_SRC_action.

Once the Audio Core has called the set_action( ) function, it will then call the process( ) function, pass the samples needing processing through data_in alongside the size of the data chunk. Once the processing is done, the process( ) function will return the processed samples through data_out and return the number of bytes processed through its return value. If, for some reason, process( ) has not done anything on the samples, it will return 0. The Audio Core will then know that there is nothing valid from data_out (not even a copy of data_in as this would be a waste of processing cycles).

A core may include Clock Drift Compensation (CDC). For example, within the Audio Core clock drift compensation is necessary when the audio clock from which the sampling rate is derived is different between an audio codec that records the audio samples and the one that plays them back. This being for example where the audio data is streamed or transferred via a wireless link employing UWB Transceivers according to embodiments of the invention. One board will record the samples and the other one will play them back. The audio clock is asynchronous between both boards codecs. This means that even if both audio master clocks are theoretically 12.288 MHz and a sampling rate of 48 KHz is configured, the effective sampling rate on one side can be 47.980 kHz and on the other side 48.030 kHz. This clock drift needs to be compensated. If not, audio glitches will occur.

EVKs according to embodiments of the invention comprise a CDC module which make use of a resampling library developed by the inventors. The strategy employed by a CDC module according to an embodiment of the invention to compensate clock drift comprises a process wherein as soon as a drift is detected, the module will smoothly start resampling the samples (for example 1440 samples although other numbers may be employed either by default or dynamic configuration). At the end of the resampling period, a new sample will have been created (or dropped). Dropping a sample compensates for an audio clock on the playback device that is too slow compared to the recording one, and adding a sample compensates for an audio clock on the playback device that is too fast compared to the recording one.

A CDC module according to an embodiment of the invention may provide on or more capabilities including, but not limited to:

Configurable resampling window size

Fixed or variable bit sampling, e.g. 16 bit only or dynamically configurable at two or more samplings such as 16 bit and 32 bit for example.

Fixed-point computation.

Creation and dropping of a single sample (although in other embodiments of the invention multiple samples created or dropped.

Mono and interleaved stereo stream support.

A core may include Sampling Rate Conversion (SRC). For example, the Audio Core may employ a SRC to modify audio samples such that they look as if they were initially sampled at a different rate. This is useful, for example, if a hardware audio codec is configured with a sampling rate frequency of 48 kHz, but a 16 kHz stream is needed for a microphone. Most codecs can only have a single sampling rate for its record and playback channels. The inventors have established an SRC within their EVKs which provides for capabilities including, but not limited to 16-bit sampling (although other SRCs may provide different bit sampling with SRC or bit rate and sampling rate conversions, e.g. 48 kHz 16 bit to 16 kHz 24 bit for example), interpolation and decimation.

Accordingly, within embodiments of the invention as described above in respect of FIGS. 2 to 39 and below with respect to FIGS. 40 to 60 the following concepts, methods, and variances to these concepts and methods have been established.

ANY application data coming in through ANY peripheral that are then transmitted over-the-air.

Accordingly, UWB Transceivers according to embodiments of the invention may be employed as a communication medium, regardless of the underlying interfaces or nature of the data to be transmitted.

Audio multicast from a master device to 2 or more slave nodes.

The audio multicast system (e.g. star network) allows to playback audio on end nodes which receives the data through a SPARK link (i.e. through a UWB Transceiver according to an embodiment of the invention. The audio stream can be processed differently on sink devices (end nodes) to lead to different playback per end node. The stream playback is synchronized between the end nodes (high sync accuracy, sub 1 ms). The audio stream latency is variable and can range from few milliseconds to tens of milliseconds.

Audio broadcast from a master device to 2 or more slave nodes

The audio broadcast system (e.g. star network) allows to playback audio on end nodes which receives the data through a SPARK link (i.e. through a UWB Transceiver according to an embodiment of the invention. The audio stream can be processed differently on sink devices (end nodes) to lead to different playback per end node. The stream playback can be synchronized between the end nodes (high sync accuracy, sub 1 ms). The audio stream latency is variable and can range from few milliseconds to tens of milliseconds. As opposed to the multicast system, the broadcast system is a best effort transmission, meaning that if one of the end nodes misses a packet, it is not retransmitted. The Coordinator moves on to the next packet.

Audio point to point link, unidirectional or bidirectional, any audio stream settings (sampling rate, bit depth, etc.)

A point-to-point (P2P) audio link is the base of all audio applications. A P2P according to embodiments of the invention allows adjustment of audio stream settings such as sampling rate, latency (buffering) or channel count.

Internally, the system can perform various digital processing steps on an audio stream: sampling rate conversion, clock drift compensation, volume adjustments, mixing, interface loopback, software generation of audio signal, fading and compression.

Basic CLI (1 letter=1 command)

A basic terminal available in SDKs (and/or EVKs and/or HDKs) according to embodiments of the invention maps commands with letters. An extended set of commands can be used by prepending a reserved character, allowing for more commands than the standard ASCII characters set permits. An argument parser can treat the provided arguments as different types such as a Boolean, byte, half-word or word. The terminal may use a serial interface such as UART or USB for example.

Full-fledged CLI (with levels, words as command)

An expanded terminal available in SDKs (and/or EVKs and/or HDKs) according to embodiments of the invention maps commands with words and has a "directory-type" structure. An argument parser can treat provided arguments as different types such as a Boolean, byte, half-word or word. The terminal may use a serial interface such as UART or USB for example.

IoT tags

Tags are nodes that work within a mesh network topology and that can display short messages or images on a display. A typical scenario would be a retail store with remotely updated price tags for example.

Sensor nodes

Sensor nodes are devices that can work in a P2P, star or mesh network topology and that gather various information. A sensor node could provide temperature, pressure, humidity, light level, sound level and other measurements to a central "hub device." That hub device can then process that data, display it or simply transfer it on any other network (e.g., bridging between a UWB Transceiver according to an embodiment of the invention and Ethernet for example).

Battery-less sensors
- Battery-less sensors are systems consisting of a microcontroller, sensors (such as described with respect to the Wireless Sensor Kit (WSK) 1100 as described in respect of FIG. 11) and a UWB Transceiver according to embodiments of the invention powered by a solar harvesting system. This system allows to harvest solar energy using a solar panel and using this energy to recharge an array of ceramic capacitors or a supercapacitor. The microcontroller receives data from sensors, sends them to UWB Transceiver according to embodiments of the invention, and controls the solar harvesting system such as capacitor voltage and solar panel voltage. A charging algorithm takes into account those voltages, and adapts the usage of the UWB Transceiver according to embodiments of the invention and the sensors according to the available voltage, allowing the system to be autonomous and optimized over time, without any battery. Such capabilities being supported by the ultra-low power consumption of UWB Transceivers according to embodiments of the invention.

Screen displayed data coming from the link
- Generic data (can be picture/art, video, text; any digital content) displayed on any type of screen (television, small LCD, computer screen; any display) that is transmitted over a wireless link using UWB Transceivers according to embodiments of the invention over network such as P2P, star or mesh networks for example.

Bare metal stack (application, wireless protocol stack)
- The application employed within embodiments of the invention, such as within the EVK for example, is built directly over a device driver/hardware abstraction layer. This allows for enhanced performances such as faster response times, reduced system latency, low memory footprint, and code simplicity. Processing that has critical timing requirement is driven through hardware or software interrupts.

Real-time operating system (RTOS) driven stack (application, wireless protocol stack)
- A RTOS is employed to orchestrate execution of the various modules forming the system, e.g. such as within an SDK according to embodiments of the invention.

Heterogeneous payloads (e.g. audio+other data in the same payload)
- Payload content can be defined by multiple applications using the WPS at the same time and combined before being sent over-the-air. This leads to heterogeneous payloads.

Homogeneous payloads (audio data only, HID data only, etc.)
- When the system comprises a single application, the application payload can be homogeneous.

Payload in auto-ACK packet
- A radio according to embodiments of the invention may provide an automated acknowledgment mechanism. This ensures the quickest response possible when a packet is successfully received. Further, according to embodiments of the invention, a payload may be piggybacked onto the ACK frame and the system may do so when the scenario is appropriate.

ACK in standard frame (with or without payload)
- An Automatic Repeat-reQuest (ARQ) mechanism may leverage the auto-ACK feature Automatic Repeat-reQuest although it may also employ a standard frame to send the acknowledgement.

Combined frames
- When devices are synchronized and send the same payload at the same time, the transmission can combine the Over-the-Air (OTA) and successfully be received. e.g., with a star topology with 3 devices, 2 receivers can acknowledge at the same time.

Multiple links in a single network schedule (pseudo-concurrency)
- A single synchronous network can be formed by multiple independent or dependent links. By orchestrating all the links in a single schedule, embodiments of the invention can ensure that all links have their place reserved. The concurrency mechanisms are less important in this scenario. An example of dependent links inside a single network is a star application, where the central device maintains a P2P link with several other independent devices. An example of independent links sharing a single schedule is a multiple independent P2P links application, where several pairs of devices share the schedule, but have no relation with each other. Those pairs are synchronized through a beaconing mechanism.

Multiple separate links that works independently (real concurrency)
- Multiple links spanning over different independent networks require concurrency mechanism to ensure that these links can share the air. An example of this is the multiple instantiations of the same application (e.g., audio mode with a pair of EVKs). Each instantiation has its own network schedule and must find the means to share the space with other instantiations where concurrency comes into play.

Beaconless network
- In this type of network according to embodiments of the invention any device can communicate at any given time, as long as the air is free. Devices do a clear channel assessment to see if transmission can happen or not. If not, transmission is postponed or canceled. This suits low bandwidth applications such as IoT, where transmissions rarely occur.

Use of payload size greater than 128 bytes (radio feature that allows up to 256 bytes)
- Typical payloads within according to embodiments of the invention can range from a couple of bytes up to 128 bytes. However, some projects require the use of payloads>128 bytes to achieve specific goals. These can be supported by according to embodiments of the invention.

Event based transmissions (transmit once ready, otherwise skip slot)
- Applications give data to the radio to be sent OTA. If the wireless protocol stack schedules transmission but has not received any data from the application side, nothing will be transmitted over the air. This means that when an event occurs, the data will be sent as soon as possible by the WPS, but if no data is available nothing happens.

Constant transmission (isochronous relative to link schedule, never skip slot)
- Some applications may want to always transmit when possible. This means that the application will always provide data to the WPS for every scheduled transmission. So instead of being triggered by an external event, data generation happens constantly.

Full-fledged statistics (link stats (throughput, packet outcome, etc.), app stats (throughput, etc.))
  Statistics are important for the evaluation of the link quality of any application. Accordingly, according to embodiments of the invention can provide statistics from basic statistics through to advanced statistics such as throughput in bits per second, error rates etc.
Dynamic link parameters adjustments.
  Within according to embodiments of the invention a methodology exists, e.g. through beacons or within data transmitted in headers etc., for the orchestration of changes within the network(s) such as change of modulation, FEC level, etc. This may be between each pair of devices communicating together within a P2P or each P2P within a mesh network for example.
  Further, through the concept of "fallback mode" this can be exploited to obtain optimum performance in different concurrency scenarios.
Dynamic application adjustments to compensate for degraded link performances.
  The concept of "fallback mode" according to embodiments of the invention implementable at the application level allows for selecting reduction of the application data throughput. For example, dynamically adding audio compression.
Gain loop
  According to embodiments of the invention a control loop is implemented which allows the gain of the radio to be adjusted in real-time in dependence upon one or more RF metrics.
Multiple radio support
  A single hardware implementation, e.g. EVK, HDK, WSK, can support multiple UWB Transceivers according to embodiments of the invention at the same time in order to achieve different objectives. For example, a headset may employ a dual-radio system wherein the pair of radios are used to maximize the coverage. The inventors have established algorithms to optimally choose the transmitting and receiving radios in such instances.
Ranging
  Ranging algorithms and specific features of UWB Transceivers according to embodiments of the invention are employed to obtain good ranging performances. Ranging could be combined with other applications in such a way that distance between transmitter and receiver is measured while transmitting other data. For example, a transceiver could send an audio stream to a remote device while measuring the distance from the other device. Range could serve as a metric to determine some actions regarding the audio stream are required (fallback mode). P2P ranging can also be extended to more complex real-time localization systems and provide 2D or 3D positioning. Such ranging information may be distributed within a network automatically allowing each node to perform specific 2D or 3D positioning as required.

As noted above embodiments of the invention employing UWB Transceivers according to embodiments of the invention can provide for low latency. Accordingly, for the instance of audio streaming the inventors performed a series of measurements to simulate an exemplary gaming hub implementation of a gaming headphone system (Gaming Hub). This employed a pair of UWB Transceivers according to embodiments of the invention mounted to EVKs according to embodiments of the invention. The wireless protocol stack (WPS) running on the Gaming Hub was configured for a 1-to-3 star topology. The Hub is the master node and the Headset, Mouse and Keyboard are the slave nodes. It is the slave device's job to make sure it is always synchronized to the master by continuously adjusting its duty cycling period. The master's duty cycling period stays constant. The audio downlink (Hub to Headset) payload data rate $w_s$~1.536 Mbps (48 kSps 16 bit stereo) and the audio uplink (Headset to Hub) had a payload data rate of ~256 kbps (16 kSps 16 bit mono). The Mouse downlink (Hub to Mouse) and Mouse uplink (Mouse to Hub) payload data rate is 256 kbps. The Keyboard downlink (Hub to Keyboard) and Keyboard uplink (Keyboard to Hub) payload data rates were similarly 256 kbps.

Figure 40:
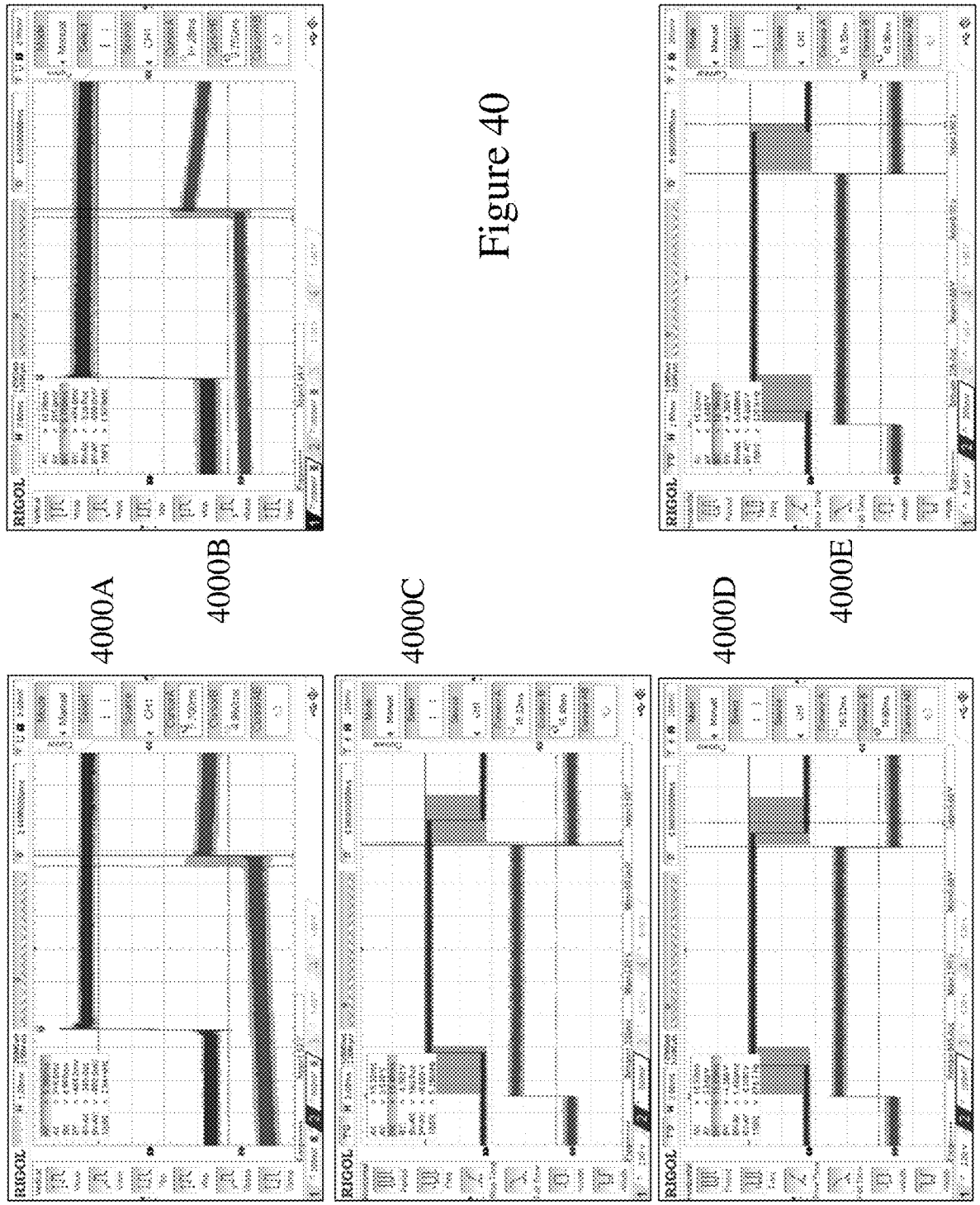
FIG. 40 depicts audio latency measurements established with electronic devices employing UWB transceivers according to embodiments of the invention.

The devices had an audio transmission buffer that can contain up to 24 audio frames and another buffer dedicated to transmission of human interface device (HID) frames that can contain up to 5 frames. These buffers will fill if the link conditions are poor. If the audio transmission buffer is full, the newer audio frames will overwrite the oldest audio frames. If the HID transmission buffer is full, data generation stops until the queued frames are successfully sent over-the-air. Referring to FIG. 40 there are depicted audio latency measurements established within this exemplary scenario within first to fifth Graphs 4000A to 4000E respectively. These depict respectively:
  First Graph 4000A depicts the audio channel latency.
  Second Graph 4000B depicts channel latency for the microphone within the headset.
  Third Graph 4000C depicts the shortest latency for the HID channel;
  Fourth Graph 4000D depicts the average latency of the HID channel; and
  Fifth Graph 4000E depicts the worst case latency observed for the HID channel.

The signals employed in first to fifth Graphs 4000A to 4000E were obtained using a 50 Hz square wave for the audio channel latency measurements and a 10 Hz square wave for the back channel (HID frames). The measured audio channel latency ranged from ~4.96 to ~5.3 ms (average 5.13 ms) and the back channel latency ranged from ~9.76 ms to ~10.28 ms (average 10.2 ms).

Figure 41:
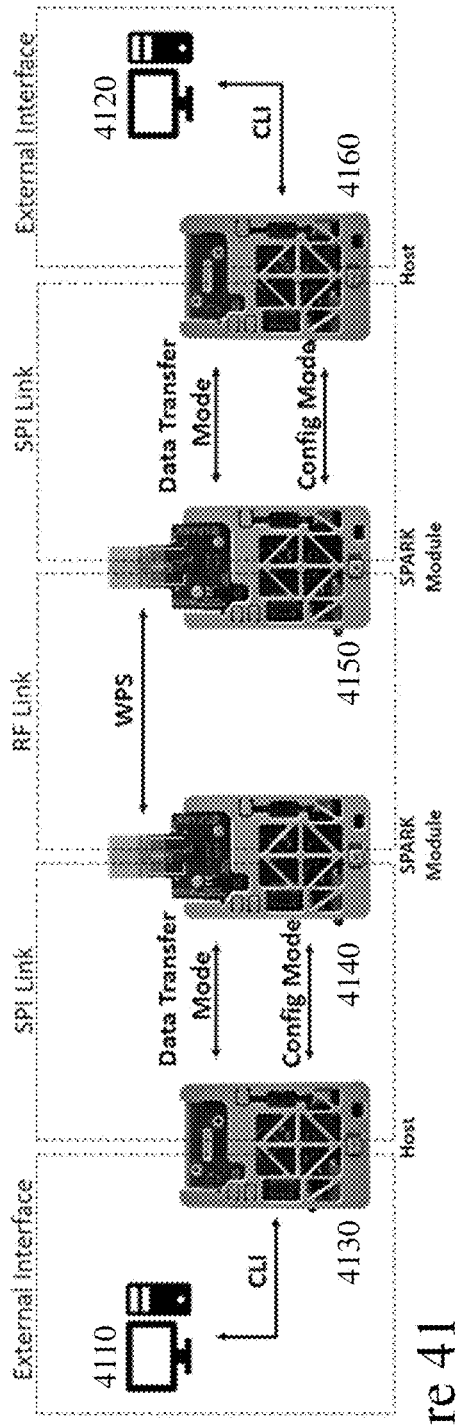
FIG. 41 depicts an exemplary configuration for a wireless interface between electronic devices employing UWB wireless transceivers host interfaces via a serial peripheral interface (SPI) pipe.

Referring to FIG. 41 there is depicted an exemplary configuration for a wireless interface between electronic devices employing UWB wireless transceivers host interfaces via a serial peripheral interface (SPI) pipe. The system as depicted comprising:
  First External Interface 4110, such as a PC for example;
  Second External Interface 4120, such as another PC for example;
  First Host 4130, provided by an EVK carrier board without UWB Transceiver;
  First SPARK module 4140 comprising an EVK with UWB Transceiver and antenna;
  Second SPARK module 4150 comprising an EVK with UWB Transceiver and antenna; and
  Second Host 4160, provided by an EVK carrier board without UWB Transceiver.

Figure 42:
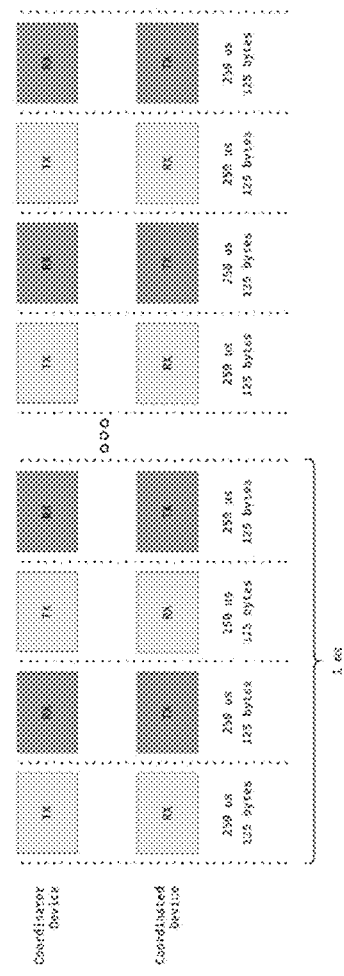
FIG. 42 depicts exemplary timing information for the UWB interface employed within the system of FIG. 41.
Figure 43:
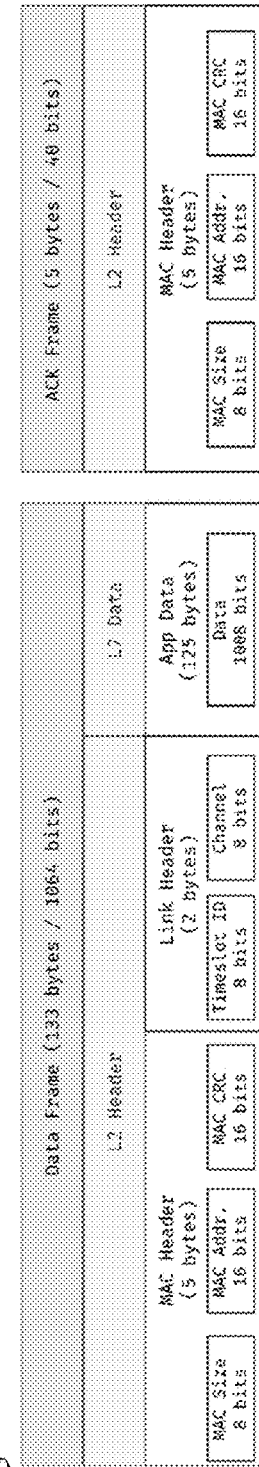
FIG. 43 depicts an exemplary data structure for the UWB transmission within the system of FIG. 41.

The first Host 4130 and first SPARK module 4140 providing a first SPI Link and second Host 4160 and Second SPARK module 4150 providing a second SPI Link. FIG. 42 depicts exemplary timing information for the UWB interface employed within the system of FIG. 41. As depicted a timeslots superframe comprises 16 equally sized timeslots each lasting 4 ms which is repeated. In this diagram, each timeslot is separated by vertical dotted lines and at the bottom, the timeslot duration as well as the size of the transmitted application payload are presented. It should be noted that the length of the timeslot is not the actual RF airtime and that the application payload size shown does not account for extra protocol header bytes added by the WPS encapsulation. FIG. 43 depicts an exemplary data structure for the UWB transmission within the system of FIG. 41.

Figure 44:
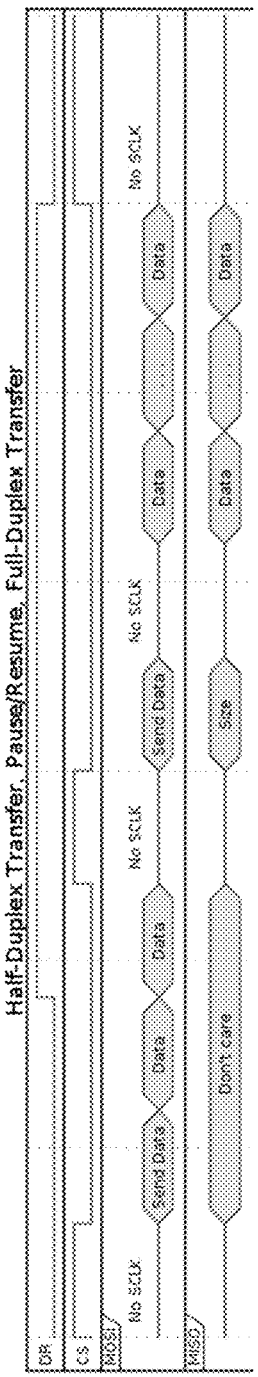
FIG. 44 depicts a timing diagram for a SPI pipe according to an embodiment of the invention showing half-duplex transfer, pausing and full duplex transfer.

Accordingly, consider a first use case comprising unidirectional data transfer from SPI slave to SPI master (an SPI pipe), transaction pausing and resuming and bidirectional data transfer. FIG. 44 depicts a timing diagram for the SPI pipe according to an embodiment of the invention showing half-duplex transfer, pausing and full duplex transfer. Accordingly, when the user wants to send data over the RF channel (Data mode) the following sequence is performed.

The SPI Master (user's device) sends the Send Data command followed by the data it needs to send on the MOSI line.

If the Data Ready (DR) pin is LOW, the state of the Master In Slave Out (MISO) line can be disregarded.

If new data is ready (DR goes HIGH) while an SPI data exchange is happening, a new SPI transmission needs to be initiated in order to get the newly available data from the SPI pipe (for example a Chip Select (CS) pin is toggled).

The second transmission shows the full duplex behavior.

The master sends the Send Data command followed by the data it needs to send in this Master Out Slave In (MOSI).

The slave answers with the number of bytes ready to send (size byte) followed by those bytes (data). (MISO)

In a situation where the master needs to handle something more urgent, the Serial Clock (SCLK) line can be stopped and resumed afterward.

Once resumed the transaction continues its normal flow.

When all data is read and the master raises CS, the DR pin goes LOW if no more data is available to be read at that moment.

Figure 45:
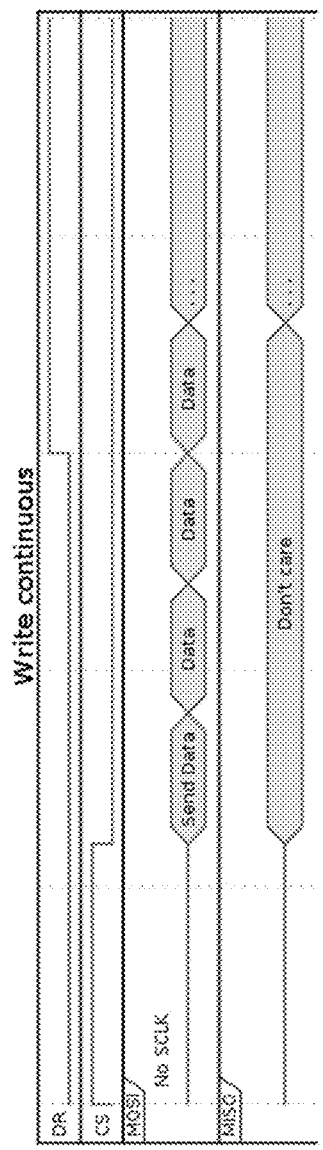
FIG. 45 depicts a timing diagram for the SPI pipe to allow an SPI master device to write continuously without stopping any transaction.

Now consider a second user case where the SPI pipe allows the SPI master device to write continuously without stopping the transaction, what may be referred to as a data mode. FIG. 45 depicts a timing diagram for the SPI pipe to allow an SPI master device to write continuously without stopping any transaction. Accordingly:

The master sends the Send Data command followed by the data it needs to send. (MOSI).

Because DR is LOW, the slave answers with BUSY.

When DR goes HIGH in a transaction, the master needs to start a new transaction in order to start receiving the data.

The first byte received by the master is the size followed by the data. (MISO)

In the case that the FC pin goes high during a continuous transfer, the SPI Master should stop duty cycling the SCLK line to let the SPI slave successfully send data over-the-air to free its internal memory. If the SPI master toggles the CS pin while the FC pin is low, the SPI slave will split the transfer at that point. In that instance, any intermediate data that may have been sent while FC was low could be used to create an RF packet of smaller size than expected. Once the FC pin returns low, the SPI master can resume duty cycling the SCLK line. If the RF link is not operational, the SPI slave will not be able to free its internal memory and the FC pin will stay high.

Figure 46:
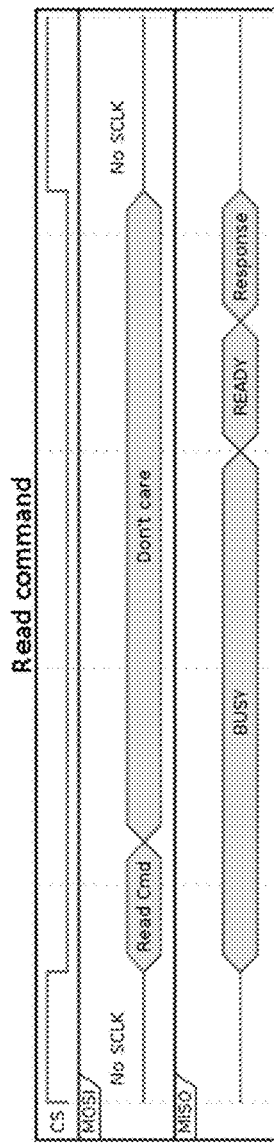
FIG. 46 depicts a timing diagram for the SPI pipe where an SPI master device is reading slave device configuration parameters.

Now considering a third use case where the SPI master can read the slave device configuration parameter, what can be referred to as a configuration mode). FIG. 46 depicts a timing diagram for the SPI pipe where an SPI master device is reading slave device configuration parameters. Accordingly:

The master sends a read command and duty cycles the SCLK line to keep the line active. During this time, the CS line must be held low.

The slave answers with BUSY while it processes the command.

Once the data is ready to be sent, the slave sends the READY signal followed by the data. The length of the data depends on the command and can be found in the Command List section.

Figure 47:
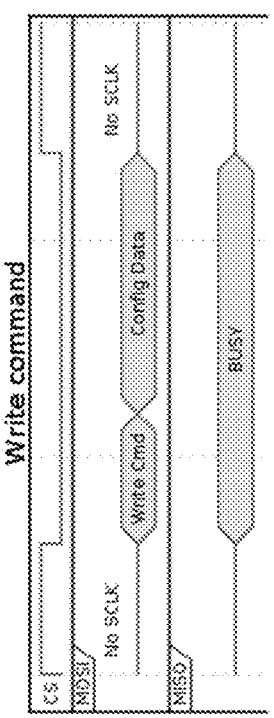
FIG. 47 depicts a timing diagram for the SPI pipe where an SPI master device is writing slave device configuration parameters.

Now referring to a fourth case where the SPI master can configure the slave device, another configuration mode. FIG. 47 depicts a timing diagram for the SPI pipe where an SPI master device is writing slave device configuration parameters. Accordingly:

The master sends a write command associated with the configuration it wants to change. During this time, the CS line must be held LOW.

The Slave will always answer with BUSY during this transaction.

It is important to note that a write command only takes effect once the CS pin goes HIGH.

Figure 48:
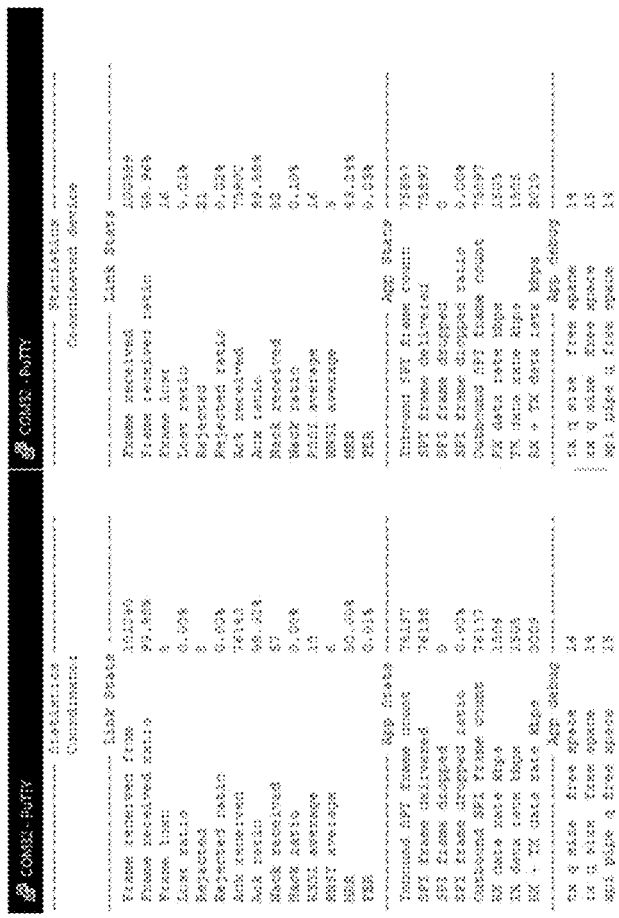
FIG. 48 depicts measured values for a UWB link employing UWB transceivers according to an embodiment of the invention extracted via the SPI pipe.

FIG. 48 depicts measured values for a UWB link employing UWB transceivers according to an embodiment of the invention extracted via the SPI pipe extracted by a terminal. Experimental measurements were also performed to establish the latency from SPI to SPI via the UWB Transceivers according to embodiments of the invention. The latency was measured from SPI to SPI using a logic analyzer with an incrementing test sequence used to correlate the packets on both sides and a variable attenuator employed to adjust link quality. FIG. 49 depicts the measured results in first and second Images 4900A and 4900B as obtained upon a logic analyzer for the SPI to SPI interface with UWB transceivers according to an embodiment of the invention. Accordingly, with a good link the latency was below 1 ms, with FIG. 49 depicting the result as 0.659 ms of latency.

Figure 50:
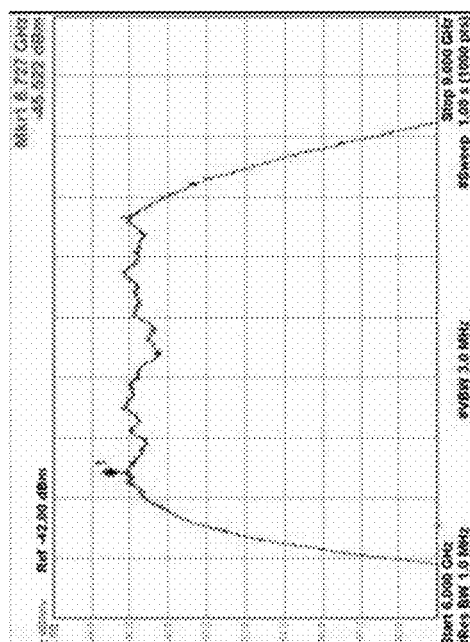
FIG. 50 depicts the emitted power spectrum of the UWB transceiver providing a 3 Mbps unidirectional link.

Within the anticipated environments of UWB deployment one certification requirement is for wireless emissions to comply with −41.3 dBm/MHz effective isotropic radiated power (EIRP). FIG. 50 depicts the emitted power spectrum of the UWB transceiver providing a 3 Mbps unidirectional link wherein the measured output power taking into account the antenna gain (2.5 dB) and the loss in the measurement setup (0.5 dB), the measured power limit must below −44.3 dBm/MHz. As evident the output power for the default UWB Transceiver configuration has a maximum at −45.52 dBm/MHz.

Figure 51:
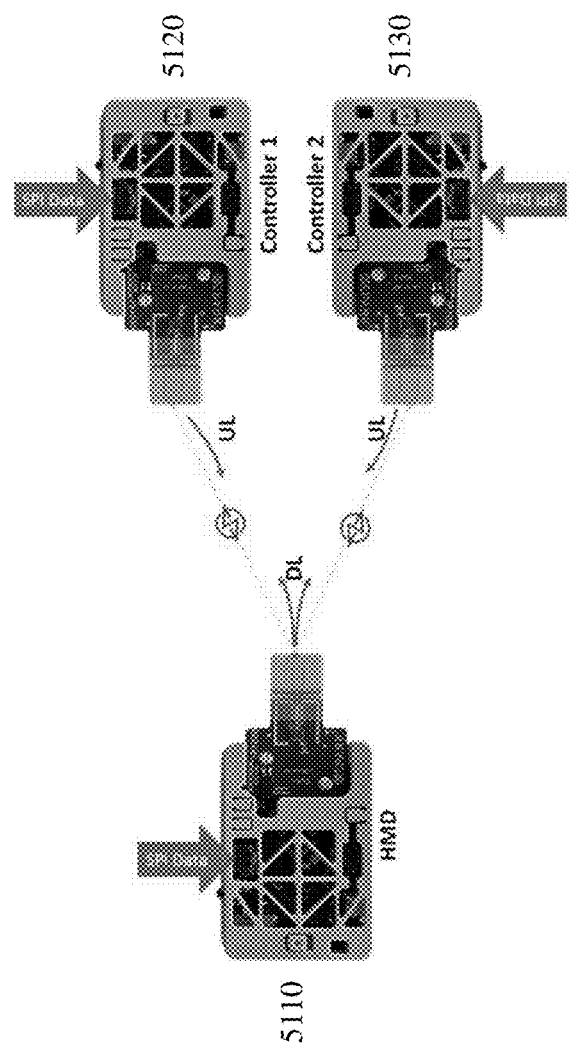
FIG. 51 depicts an exemplary configuration of a head mounted device (HMD) interfaced to a pair of controllers via UWB transceivers according to an embodiment of the invention.

Now referring to FIG. 51 there is depicted an exemplary configuration of a head mounted device (HMD) 5110 interfaced to a pair of controllers, first and second Controllers 5120 and 5130 respectively, via UWB transceivers according to an embodiment of the invention. Within this experimental configuration an approximately 150 kbps downlink (DL) is broadcasted from the HMD to both controllers and two 3 ms max latency approximately 300 kbps uplinks (UL) from each controller to the HMD were established between the boards.

Figure 52:
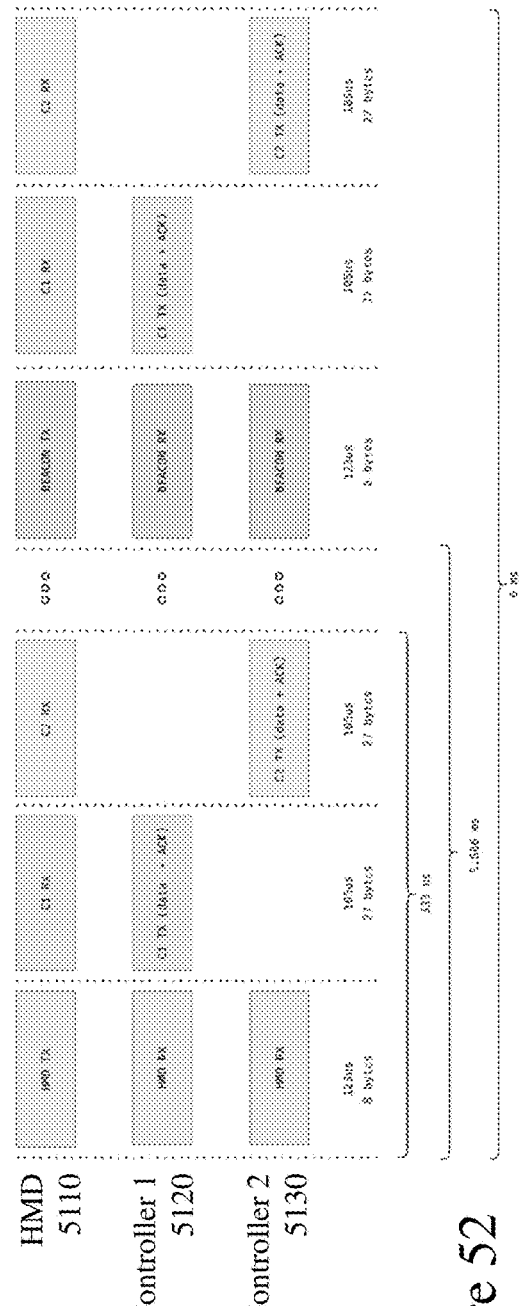
FIG. 52 depicts an exemplary structure of a superframe for UWB transmissions between UWB transceivers according to an embodiment of the invention.

FIG. 52 depicts an exemplary structure of a superframe for UWB transmissions between UWB transceivers according to an embodiment of the invention for the system depicted in FIG. 51. The timeslots superframe lasts 6 ms and is repeated indefinitely. The last transmission of the HMD in the superframe is replaced by a beacon. In this diagram, each timeslot is separated by vertical dotted lines and at the bottom, you can see the timeslot duration as well as the size of the transmitted application payload. It is to be noted that the length of the timeslot is not the actual RF airtime and that the application payload size shown does not account for extra protocol header bytes added by the WPS encapsulation.

More bandwidth than what the application needs is allocated to have a certain retransmission margin. If the data rate the application needs is under the peak data rate achievable and no retransmissions are needed because the link is in perfect health, some timeslots will be unused and no transmissions will happen in them. The normal application payload data rate needed for the HMD 5110 is 150 kbps, but the employed timeslot schedule allows for a 181 kbps data rate. This means that 17.36% of the bandwidth can be allocated for retransmissions. On the controller side, the normal application payload data rate needed is 300 kbps per controller, but the implemented schedule allows for 648 kbps per controller, e.g. for each of first and second Controllers 5120 and 5130 respectively. This means that 53.75% of the bandwidth can be allocated for retransmissions. Frames are segmented into 3 equal size chunks to fully utilize the transmitter spectrum and the full frame is reconstructed by the HMD upon reception of the 3 chunks.

Within the system demonstrated the HMD 5110 has a transmission buffer that can contain up to 8 frames. This buffer will fill if the link conditions are poor. Once it is full, the data generation will pause until space is made in the buffer by successfully sending frames OTA. Each controller, e.g. first and second Controllers 5120 and 5130 respectively, has no buffering but needs to manage the 3 ms lifetime of the incoming frames. If after 3 ms it cannot get the whole frame through because the wireless link is not healthy, it will drop the remaining frame chunks and start trying to transmit the first chunk of the next frame.

Figure 53:
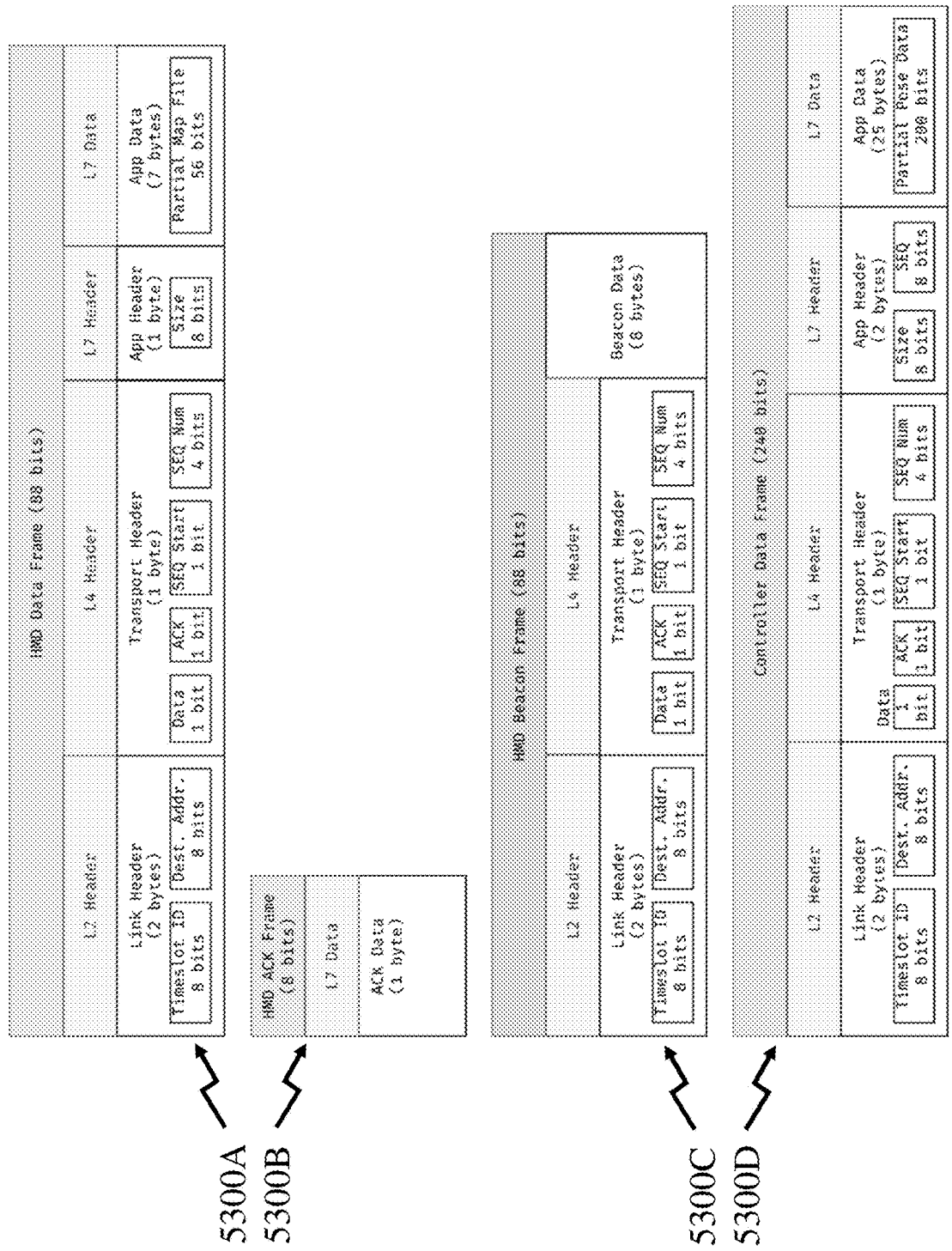
FIG. 53 depicts exemplary structures for data frames, acknowledgement, beacon and controller data frames within the superframe for UWB transmissions between UWB transceivers according to an embodiment of the invention.

Within this embodiment of the invention once the WPS obtains the application data, it will encapsulate it in the following manner depicted in FIG. 53 which depicts the exemplary structures for data frames, acknowledgement, beacon and controller data frames within the superframe for UWB transmissions between UWB transceivers according to an embodiment of the invention in first to fourth Images 5300A to 5300D respectively. Initial synchronization is done using the 6 ms beacon. If HMD data is sent during initial synchronization, it will speed up the synchronization process since more frames on which the slaves can synchronize are being sent by the master. The calculation for expected maximum initial synchronization time is given by Equations (1) and (2) respectively if no HMD data is being sent.

$$t_{SYNC\_MAX} = T^2_{TX_{AVG}}/20 \times 10^{-6} \quad (1)$$

$$T_{TX_{AVG}} = 6 \times 10^{-3} \quad (2)$$

Table 5 summarises the transmission events. The configuration was then characterised with a system composed of a USB controlled variable attenuator and a power divider connected to the HMD and both controllers using SMA cables. The total attenuation of the setup (HMD-Controller 1 and HMD-Controller 2) was measured with a network analyzer to calibrate the total losses at all frequencies.

TABLE 5

Transmission Events of System of FIG. 51

| Transmission Event | Payload Size (Bytes) | Datarate (kbps) | Packet Datarate (kbps) | Timeslot Duration (ms) |
|---|---|---|---|---|
| HMD Transmit | 8 | 150 | 181 | 123 |
| Beacon Transmit | 1 | ~1.3 | ~1.3 | 123 |
| Controller 1 Transmit | 27 | 300 | 648 | 105 |
| Controller 2 Transmit | 27 | 300 | 648 | 105 |

The reference antenna on the EVKs employing UWB Transceivers according to embodiments of the invention had an antenna gain of 2.5 dB, which is used to calibrate the effective radiated output power on the HMD and Controllers to conform to the regulated emissions. A balun was used on the HMD and Controller side with 0.7 dB of insertion loss. On the transmitter side, the configured RF bandwidth was 1500 MHz. The UL was limited by the peak power UWB spectrum regulation, which limits the symbol power of the controller to 3 dBm of radiated power at the transmitter antenna. The sensitivity of the receiver at the SR1020 RF pins is of −75 dBm to achieve the desired PER, which, with the loss of the balun and the antenna gain translates to the receiver sensitivity given by Equation (3). Accordingly, with a +3 dBm transmitter output the theoretical maximum link budget for the UL is given by Equation (4).

$$\text{Receiver Sensitivity} = 75 \text{ dBm} - 0.7 \text{ dB} + 2.5 \text{ dB} = -76.8 \text{ dBm} \quad (3)$$

$$UL \text{ Link Budget} = +3 \text{ dBm} + 76.8 \text{ dBm} = 79.8 \text{ dB} \quad (4)$$

The DL was limited by the average power regulation of −41.3 dBm/MHz over 1 ms. This average power is the sum of the HMD data link, HMD ACK and the beacon. These links all use different power settings to optimize the system performances. The results are presented in FIGS. 54 to 56 which depict the measured power error rates. In each of these Figures Band 1 is ~6758 MHz, Band 2 is ~7291 MHz and Band 3 is ~7823 MHz.

Figure 54:
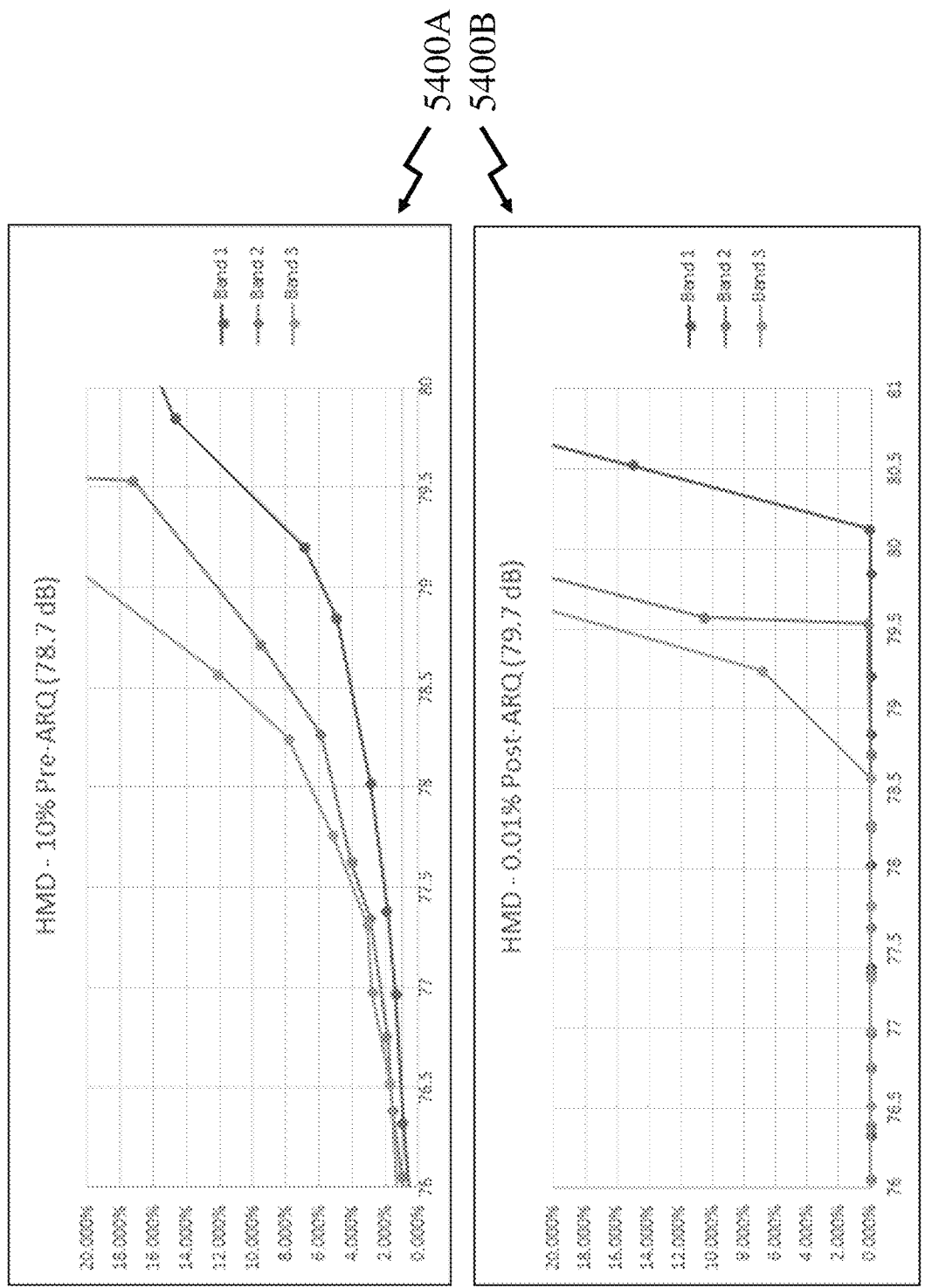
FIGS. 54 to 56 depict power error rates for an HMD and associated dual controller as measured employing UWB transceivers according to an embodiment of the invention.

FIG. 54 presents results in first and second images 5400A and 5400B for the HMD 5110 with 10% pre-ARQ (Automatic Repeat-reQuest) and 0.01% post-ARQ respectively.

Figure 55:
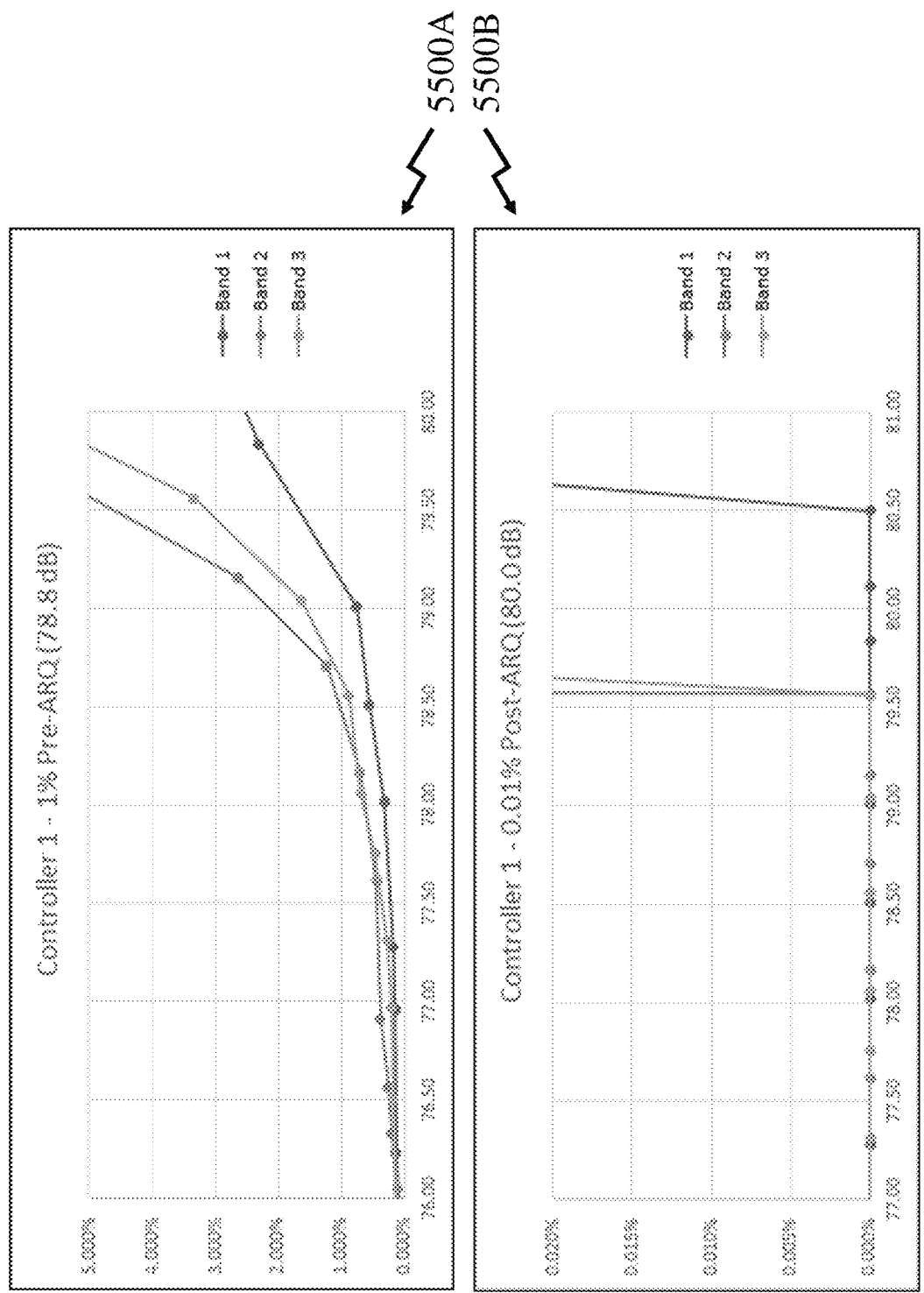

FIG. 55 presents results in first and second images 5500A and 5500B for the first Controller 5120 with 1% pre-ARQ and 0.01% post-ARQ respectively.

Figure 56:
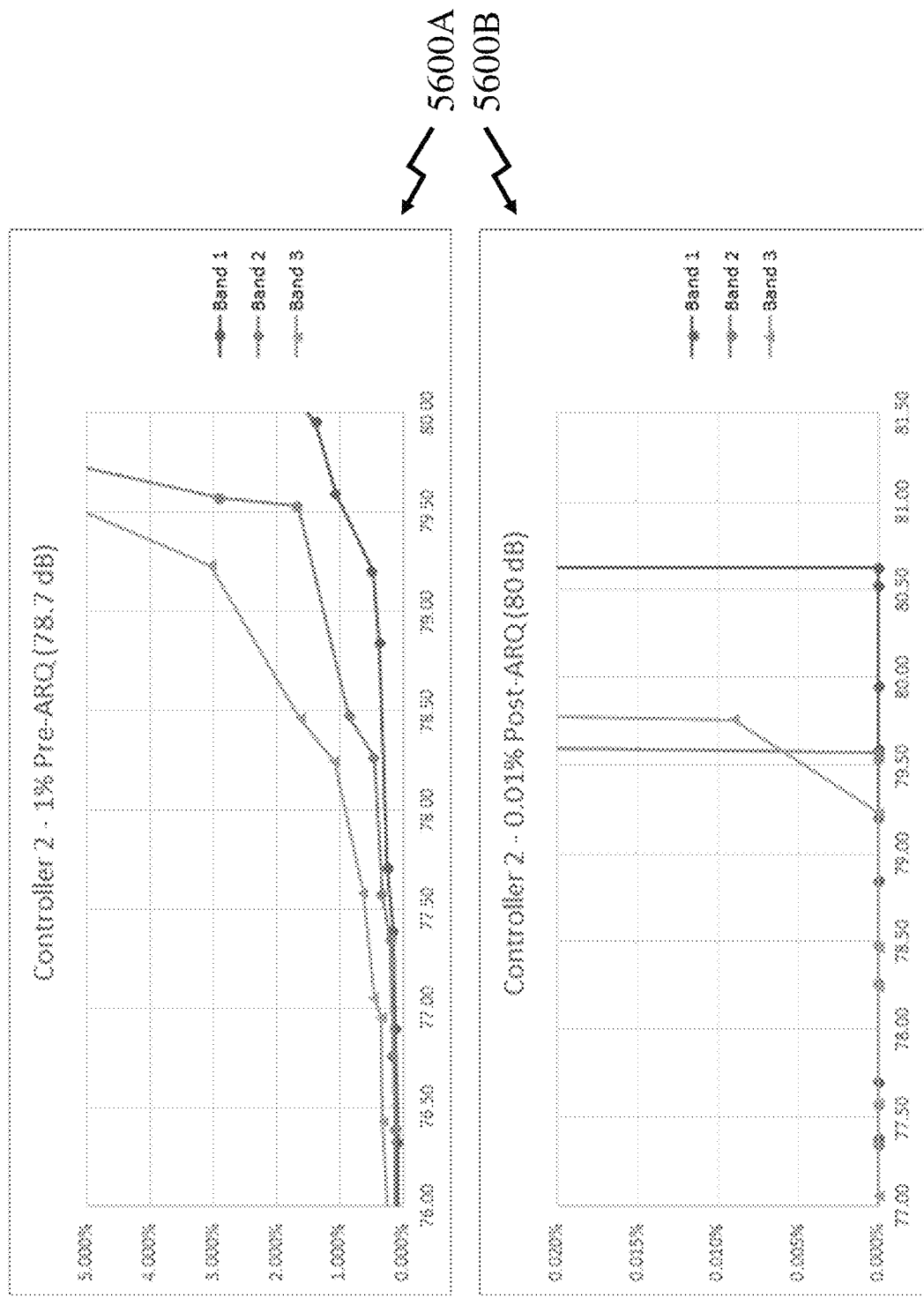

FIG. 56 presents results in first and second images 5600A and 5600B for the second Controller 5130 with 1% pre-ARQ and 0.01% post-ARQ respectively.

Figure 57:
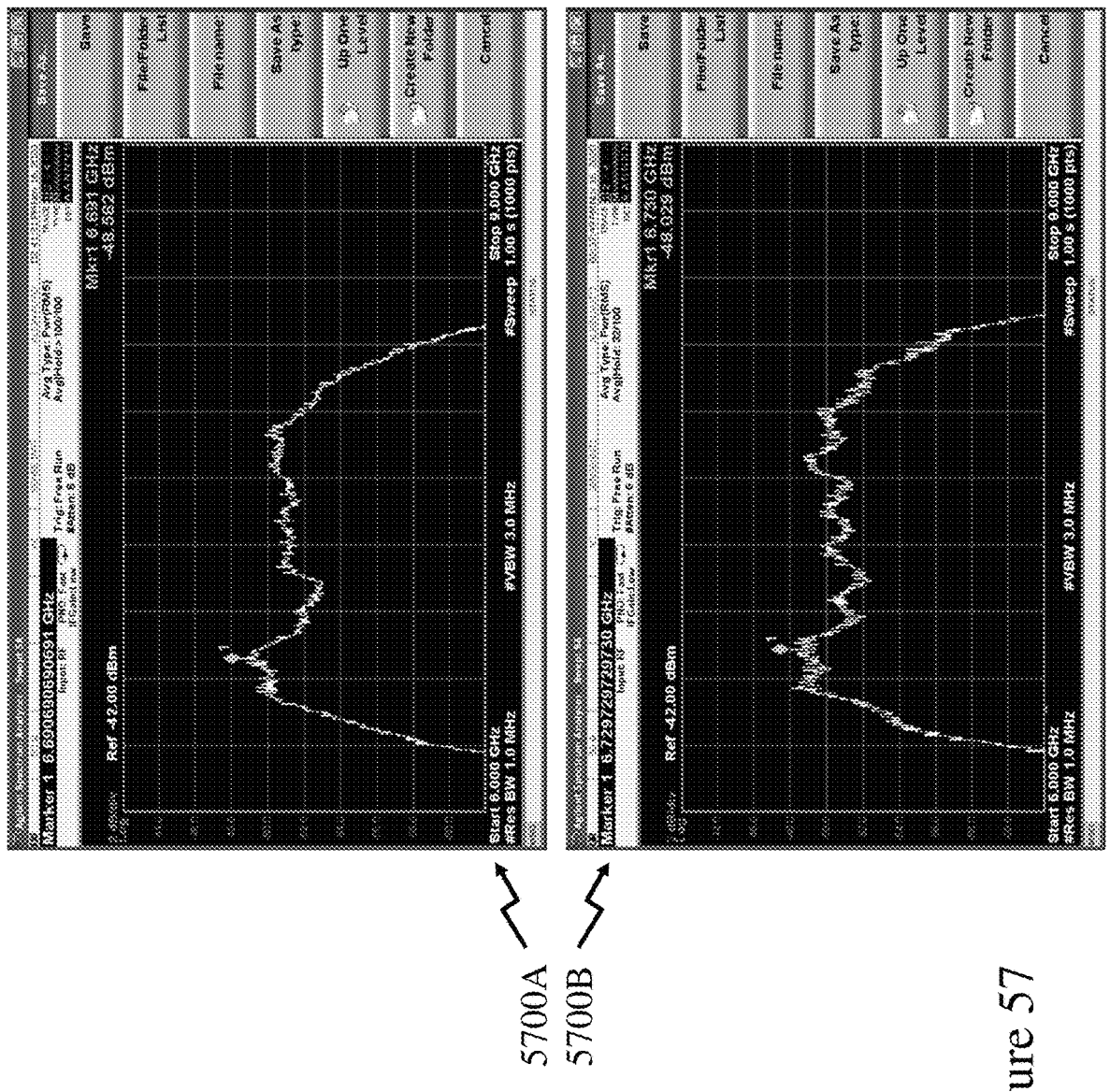
FIG. 57 depicts the average power of the HMD and controller UWB transceivers within the configuration depicted in FIG. 51.
Figure 58:
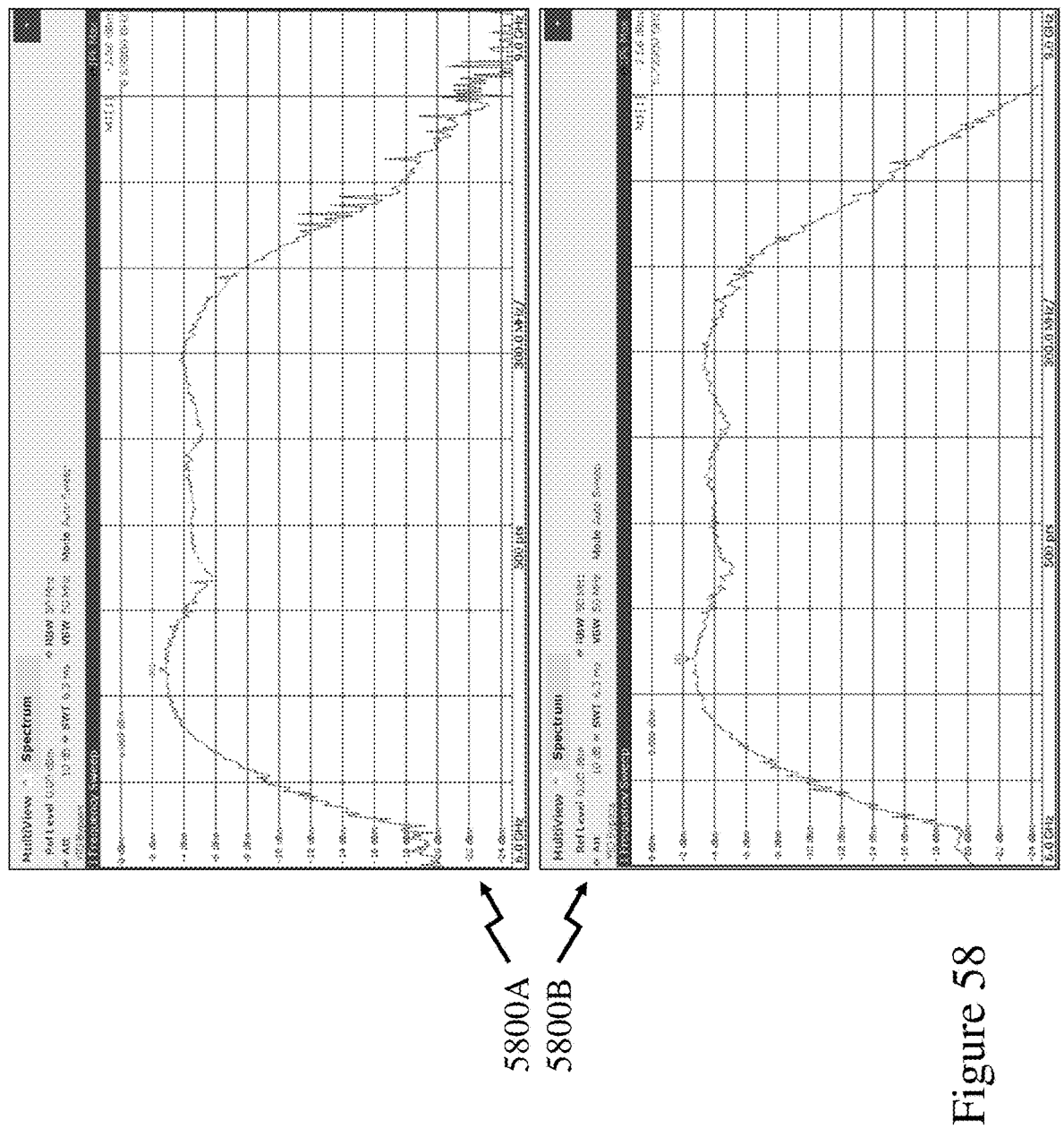
FIG. 58 depicts the peak power of the HMD and controller UWB transceivers within the configuration depicted in FIG. 51.

The results are presented below in Table 6. FIG. 57 in first and second Images 5700A and 5700B depicts the average power of the HMD and controller UWB transceivers respectively within the configuration depicted in FIG. 51. FIG. 58 in first and second Images 5800A and 5800B depicts the peak power of the HMD and controller UWB transceivers within the configuration depicted in FIG. 51. The results are presented below in Table 7.

TABLE 6

Experimental Link Budget Measurements

| Link | Criteria | Measured Link Budget (dB) (Error ± 0.5 dB) |
|---|---|---|
| Downlink - HMD | 10% Pre-ARQ | 78.7 |
| Downlink - HMD | 0.01% Post-ARQ | 79.7 |
| Uplink - Controller1 | 1% Pre-ARQ (post-ACK) | 78.8 |
| Uplink - Controller 1 | 0.01% Post-ARQ | 80.0 |
| Uplink - Controller 2 | 1% Pre-ARQ (post-ACK) | 78.7 |
| Uplink - Controller 2 | 0.01% Post-ARQ | 80.0 |

TABLE 7

Experimental Output Power Measurements

|  | HMD | Controller |
|---|---|---|
| Measured Average Power (dBm/MHz) | −48.582 | −48.029 |
| Power Divider Loss (dB) | 4.1 | 4.1 |
| Antenna Gain (dB) | 2.5 | 2.5 |
| Final Average Power (dBm/MHz) | −41.982 | −41.429 |
| Measured Peak Power (dBm) | −2.88 | −2.56 |
| Antenna Gain (dB) | 2.5 | 2.5 |
| Final Peak Power | −0.38 | −0.06 |

Figure 59:
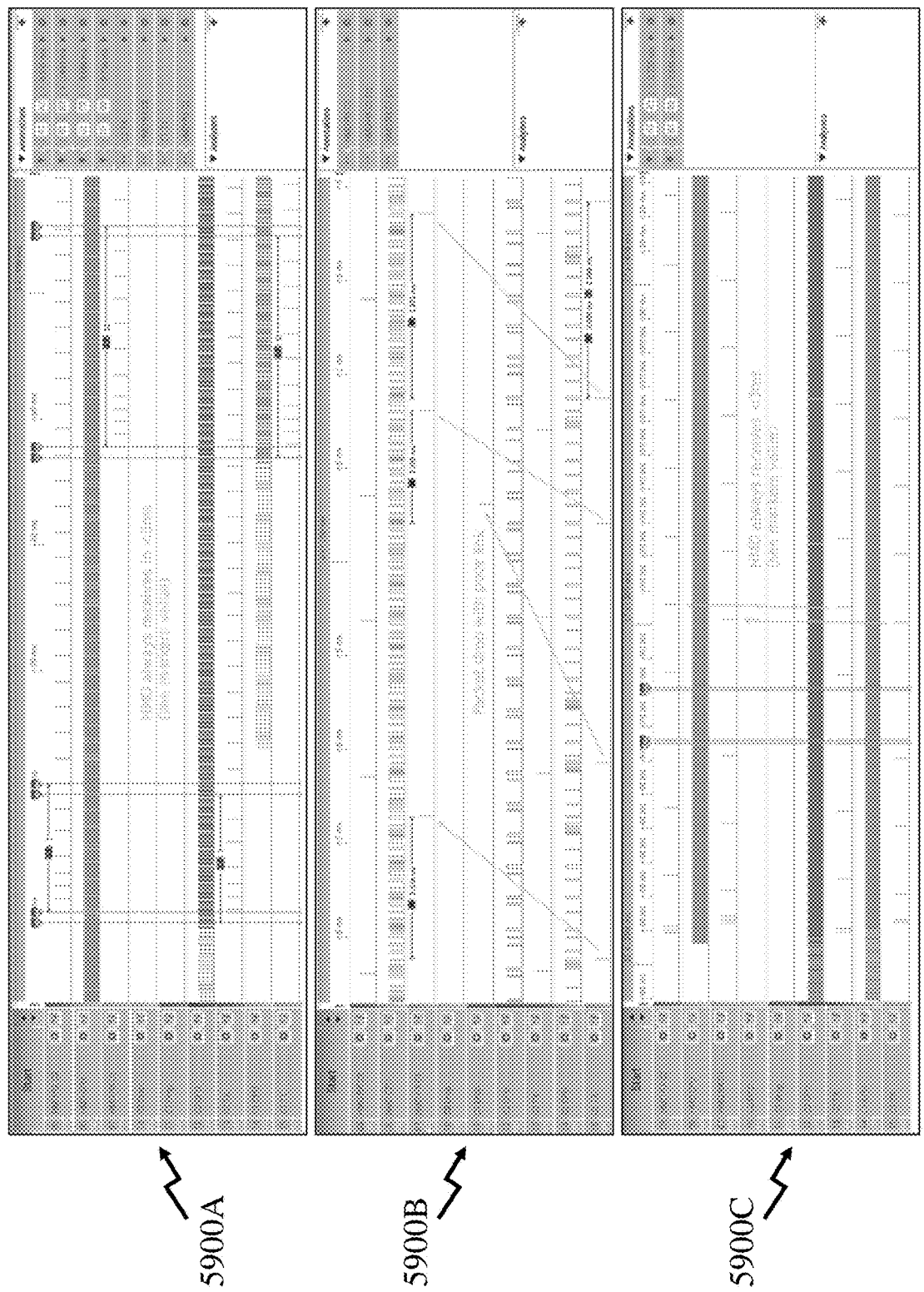
FIG. 59 depicts latency measurements obtained when a latency mode of the UWB transceivers within the configuration depicted in FIG. 51 is deactivated and activated respectively.

FIG. 59 depicts logic analyzer screen captures within which one can see the packets transmitted by Controller #1 when looking at the row labeled C1 TX. Then, by looking for a pulse within 3 ms after in row label HMD RX C1, you can see if it has been received correctly within the correct time frame. If a frame is dropped by the controller because its 3 ms lifetime is expired, you will see a pulse in the C1 Drop row. If a drop happens, the HMD RX C* of the Controller in question will be missing a pulse. Also note that the C* Drop pulse can occur outside the 3 ms window. T This is due to the fact the HMD will only discard packets once it starts to receive a new one. This behavior does not affect the maximum packet latency in any way. A special latency measurement mode can be activated with the "q" command to decrease the data generation rate of the random data mode. This will increase time between IO pulses and facilitate latency measurements. The latency of the DL channel is not bound by the wireless protocol stack, but rather by the external data feed, so no relevant measurement can be done.

Accordingly, FIG. 59 depicts latency measurements obtained when a latency mode of the UWB transceivers within the configuration depicted in FIG. 51. First and second Images 5900A and 5900B being when the latency measurement mode is deactivated and third image 5900C is when the latency measurement mode is activated.

Within an embodiment of the invention with respect to UWB Transceivers accordingly to embodiments of the invention a timer, referred to as the PWM timer, is configured with the same period as the beacons (6 ms) and a 50% duty cycle on every microcontroller. Each time a beacon is received by the controllers, they reset a counter, referred to as the PWM counter. The HMD 5110 resets the PWM timer with a constant offset when it receives the reply from a controller, e.g. one of first and second Controllers 5120 and 5130 respectively. In this manner, any error between the microcontroller's and the radio's timer sources can be corrected. The microcontroller timer source is 12.288 MHz±20 ppm and the radio's timer source is 32.768 kHz±100 ppm. On each controller, a pin outputs a clock signal that is synchronized with the HMD's signal. The jitter on the controllers' signal compared to the HMD's signal should be lower than 2 μs.

Figure 60:
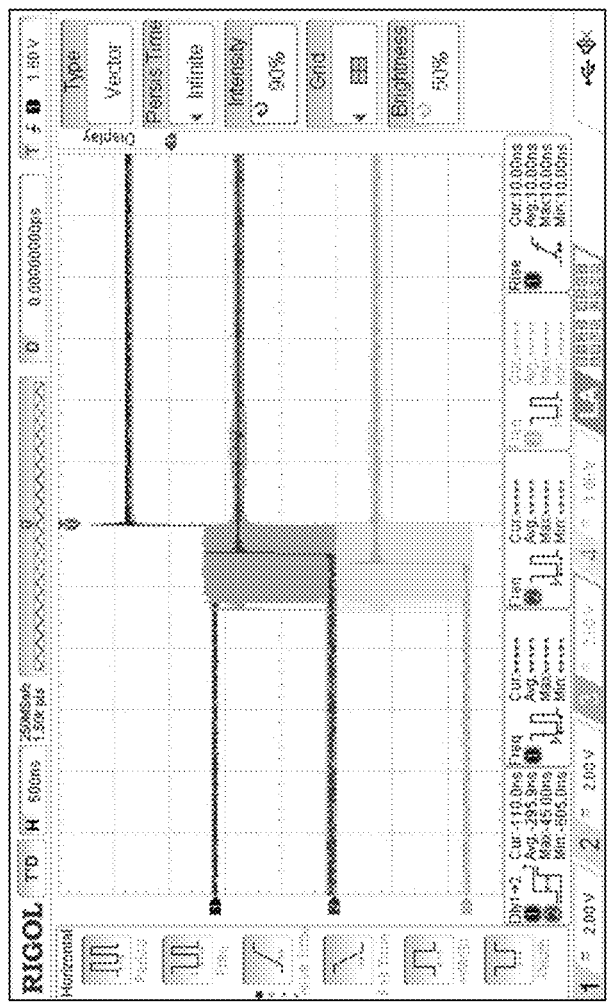
FIG. 60 depicts an exemplary synchronization measurement between UWB transceivers within the configuration depicted in FIG. 51.

FIG. 60 depicts an exemplary synchronization measurement between UWB transceivers within the configuration depicted in FIG. 51. The upper trace is the rising edge of the HMD 5110 signal whilst the middle and lower traces are the first and second Controllers 5120 and 5130 respectively. From this it is evident that the jitter is approximately 1 μs on each of the first and second Controllers 5120 and 5130 respectively.

Figure 61:
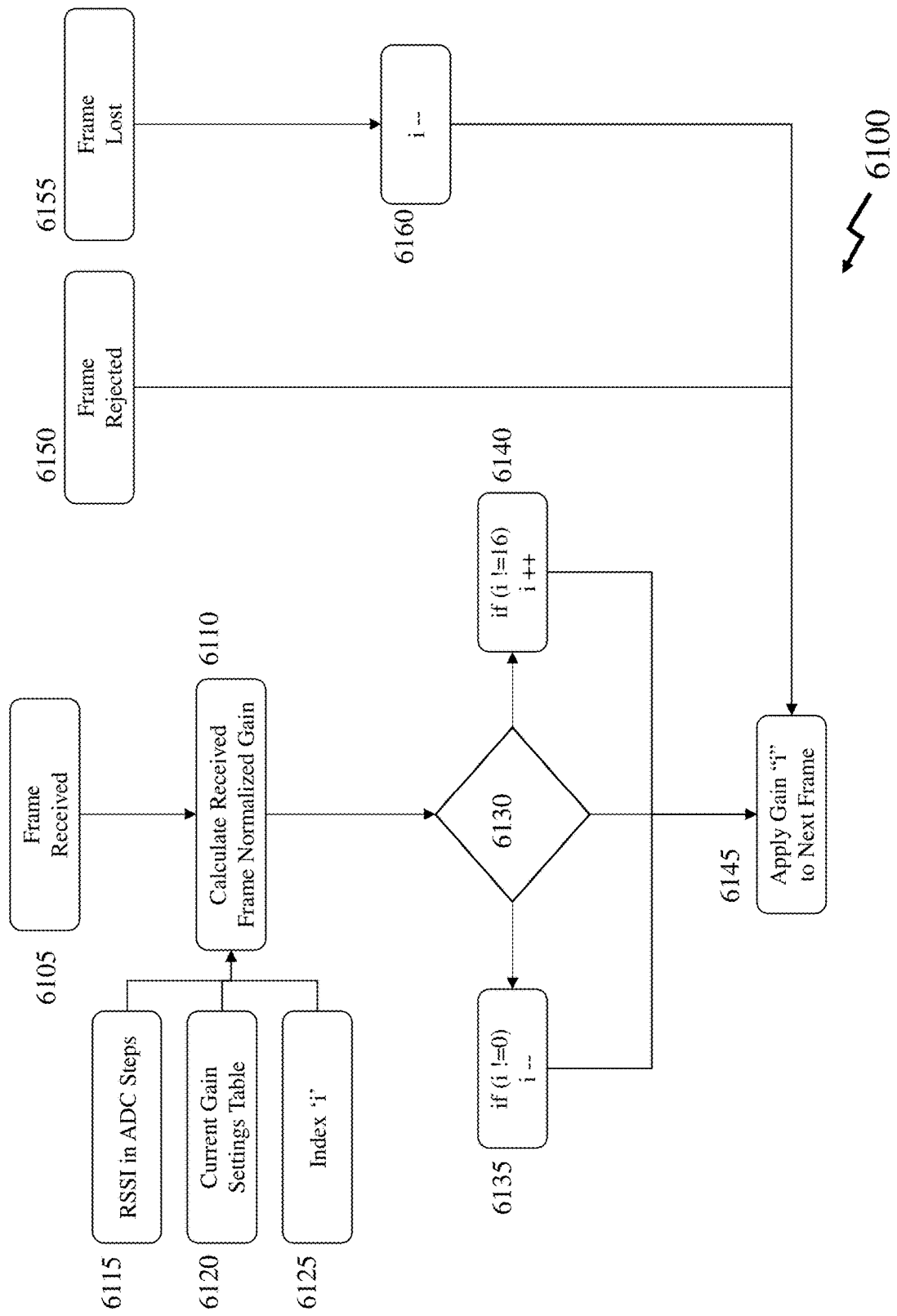
FIG. 61 depicts an exemplary gain loop employed within UWB transceivers according to an embodiment of the invention.

As noted above the gain within a UWB Transceiver according to an embodiment of the invention may employ a gain loop to dynamically adjust this. Referring to FIG. 61 there is depicted an exemplary Gain Loop 6100 according to an embodiment of the invention comprising first to twelfth stages 6105 to 6160 respectively. These comprising:

First stage 6105 wherein a frame has been received wherein the Gain Loop 6100 proceeds to second stage 6110;

Second stage 6110 wherein the Gain Loop 6100 calculates the normalized gain of the received frame in dependence upon the data acquired from third to fifth stages 6115 to 6125 respectively wherein the process proceeds to sixth stage 6130;

Third stage 6115 wherein the RSSI of the received frame in ADC steps is generated;

Fourth stage 6120 wherein the current gain settings table is extracted;

Fifth stage 6125 wherein a current index 'i' is extracted;

Sixth stage 6130 wherein a determination is made with respect to the calculated received frame normalized gain (G) wherein if G<MIN [i]−12 dB the Gain Loop 6100 proceeds to seventh stage 6135, if G>MAX [i]+4 dB the Gain Loop 6100 proceeds to eighth stage 6140 otherwise it proceeds to ninth stage 6145;

Seventh stage 6135 wherein the Gain Loop 6100 determines if (i !=0) otherwise it decreases i and proceeds to ninth stage 6145;

Eighth stage 6140 wherein the Gain Loop 6100 determines if (i !=16) otherwise it increase i and proceeds to ninth stage 6145;

Ninth stage 6145 wherein the Gain Loop 6100 applies the gain 'i' to the next frame;

Tenth stage 6150 wherein if a frame has been rejected the Gain Loop 6100 proceeds directly to ninth stage 6145;

Eleventh stage 6155 wherein if a frame has been lost the Gain Loop 6100 the process proceeds to twelfth stage 6155; and Twelfth stage 6155 wherein 'i' is decreased.

Table 8 below depicts an exemplary gain table as used within a gain loop such as Gain Loop 6100.

TABLE 8

Exemplary Gain Table

| i | RF Gain | OA Gain | IF Gain | INT Gain | MIN[dB] | MAX[dB] | RNSI[dB] |
|---|---|---|---|---|---|---|---|
| 0 | 0 | 0 | 4 | 1 | 0.0 | 23.5 | 7.4 |
| 1 | 0 | 1 | 4 | 1 | 1.2 | 24.7 | 6.7 |
| 2 | 0 | 2 | 4 | 1 | 2.3 | 25.7 | 6.1 |
| 3 | 0 | 3 | 4 | 1 | 4.2 | 27.7 | 5.4 |
| 4 | 0 | 4 | 4 | 1 | 6.0 | 29.5 | 4.8 |
| 5 | 0 | 5 | 4 | 1 | 8.5 | 32.0 | 4.4 |
| 6 | 1 | 5 | 4 | 1 | 9.8 | 33.3 | 4.4 |

TABLE 8-continued

Exemplary Gain Table

| i | RF Gain | OA Gain | IF Gain | INT Gain | MIN[dB] | MAX[dB] | RNSI[dB] |
|---|---------|---------|---------|----------|---------|---------|----------|
| 7 | 0 | 6 | 4 | 1 | 13.0 | 36.5 | 4.2 |
| 8 | 1 | 6 | 4 | 1 | 14.2 | 37.7 | 4.2 |
| 9 | 3 | 6 | 4 | 1 | 17.3 | 40.8 | 4.2 |
| 10 | 3 | 6 | 4 | 1 | 18.7 | 42.2 | 3.5 |
| 11 | 0 | 7 | 4 | 1 | 22.1 | 45.6 | 4.2 |
| 12 | 1 | 7 | 4 | 1 | 24.1 | 47.6 | 4.2 |
| 13 | 2 | 7 | 4 | 1 | 25.8 | 49.3 | 4.1 |
| 14 | 3 | 7 | 4 | 1 | 27.1 | 20.6 | 4.1 |
| 15 | 3 | 7 | 3 | 1 | 29.2 | 52.7 | 3.5 |
| 16 | 3 | 7 | 2 | 1 | 31.8 | 55.3 | 3.1 |

Figure 62:
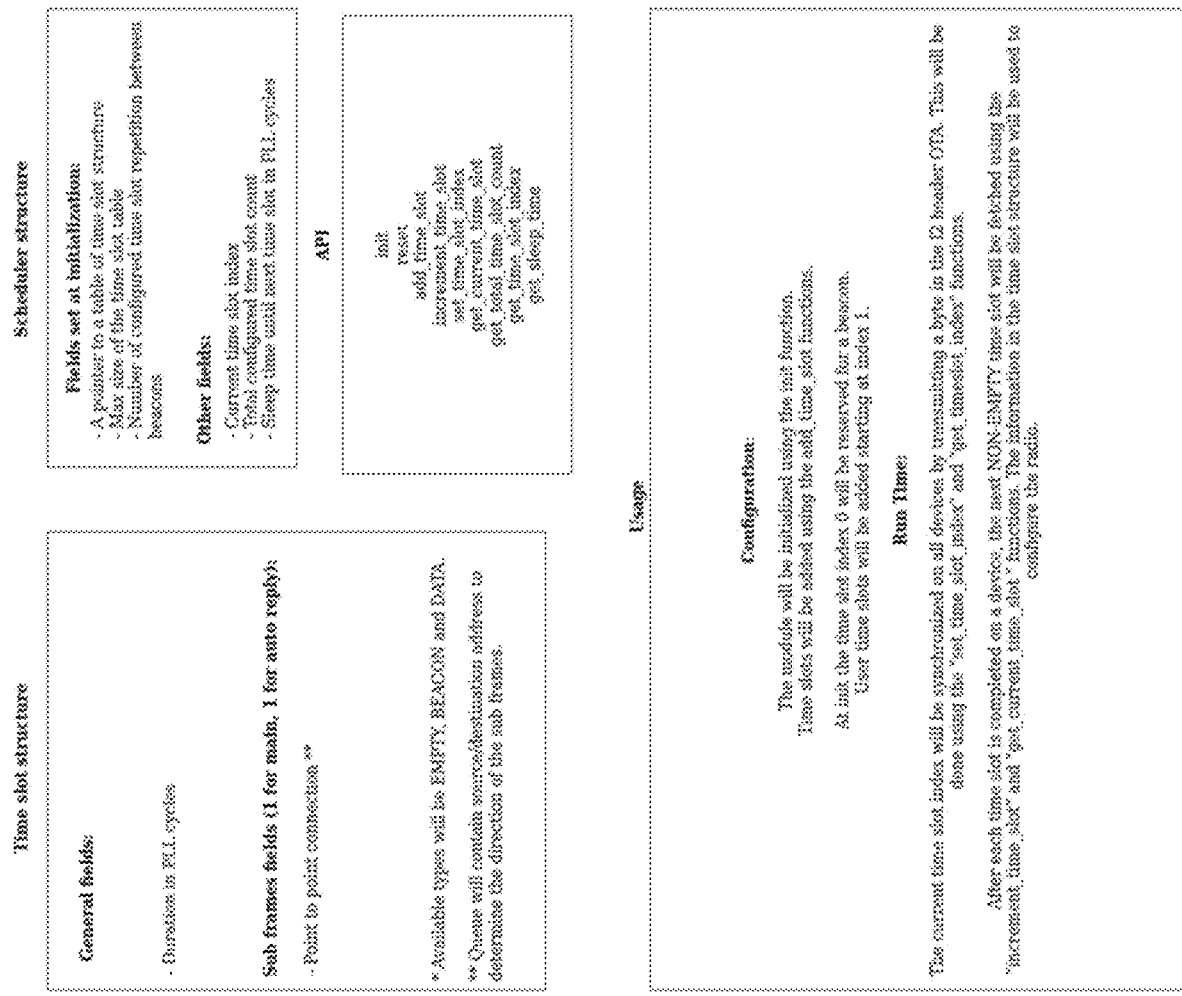
FIG. 62 depicts time slot and scheduler structures according to an embodiment of the invention together with associated API commands and usage.

Referring to FIG. 62 there is depicted a time slot structure and scheduler structure according to an embodiment of the invention together with associated API commands and usage.

FIG. 63 depicts an insertion scheme according to an embodiment of the invention for inserting a beacon within a series of time slots within a wireless link.

Figure 64:
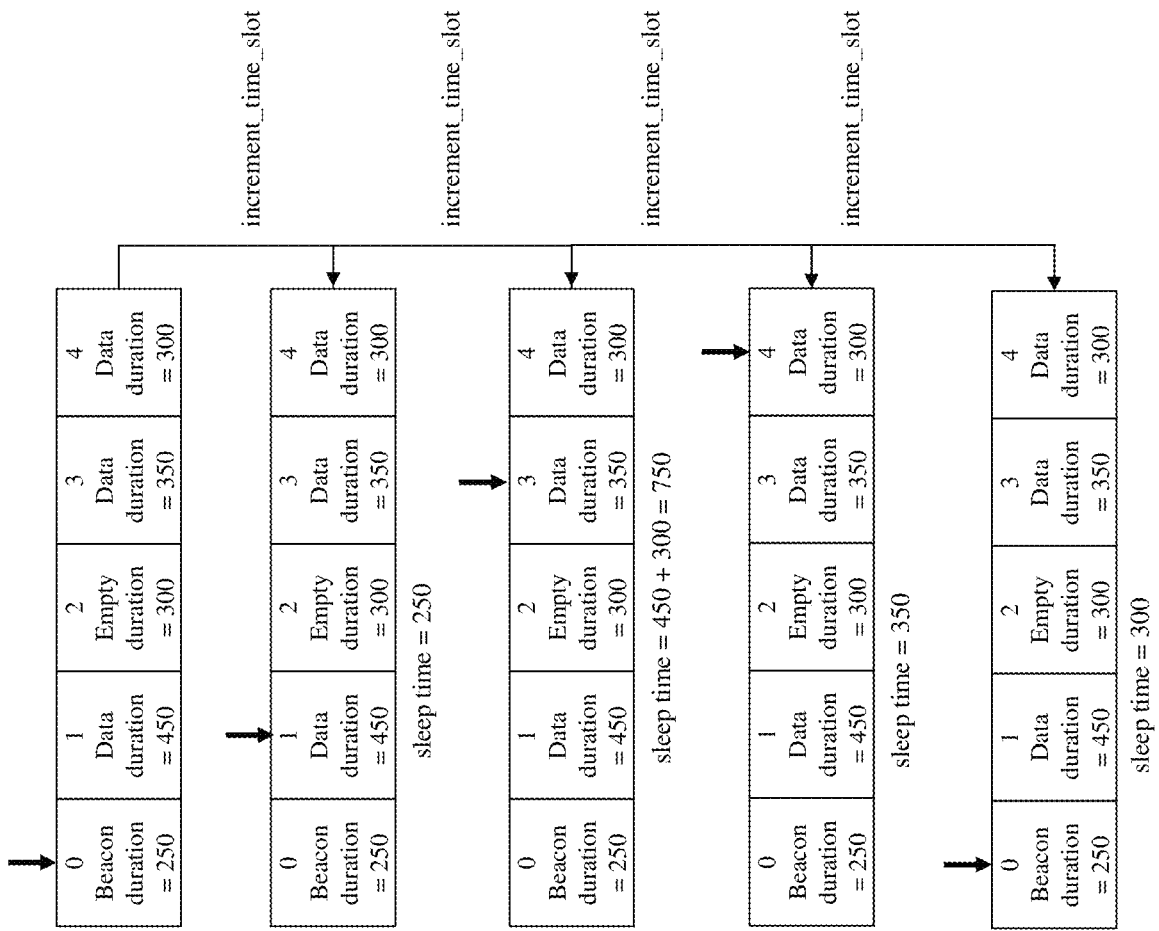
FIG. 64 depicts a time slot incrementing structure according to an embodiment of the invention.

FIG. 64 depicts a time slot incrementing structure according to an embodiment of the invention which is triggered upon the calling of "increment time slot" within the API, this being one of the API commands depicted in FIG. 62. The flow for the process being described at the top FIG. 64.

Figure 65:
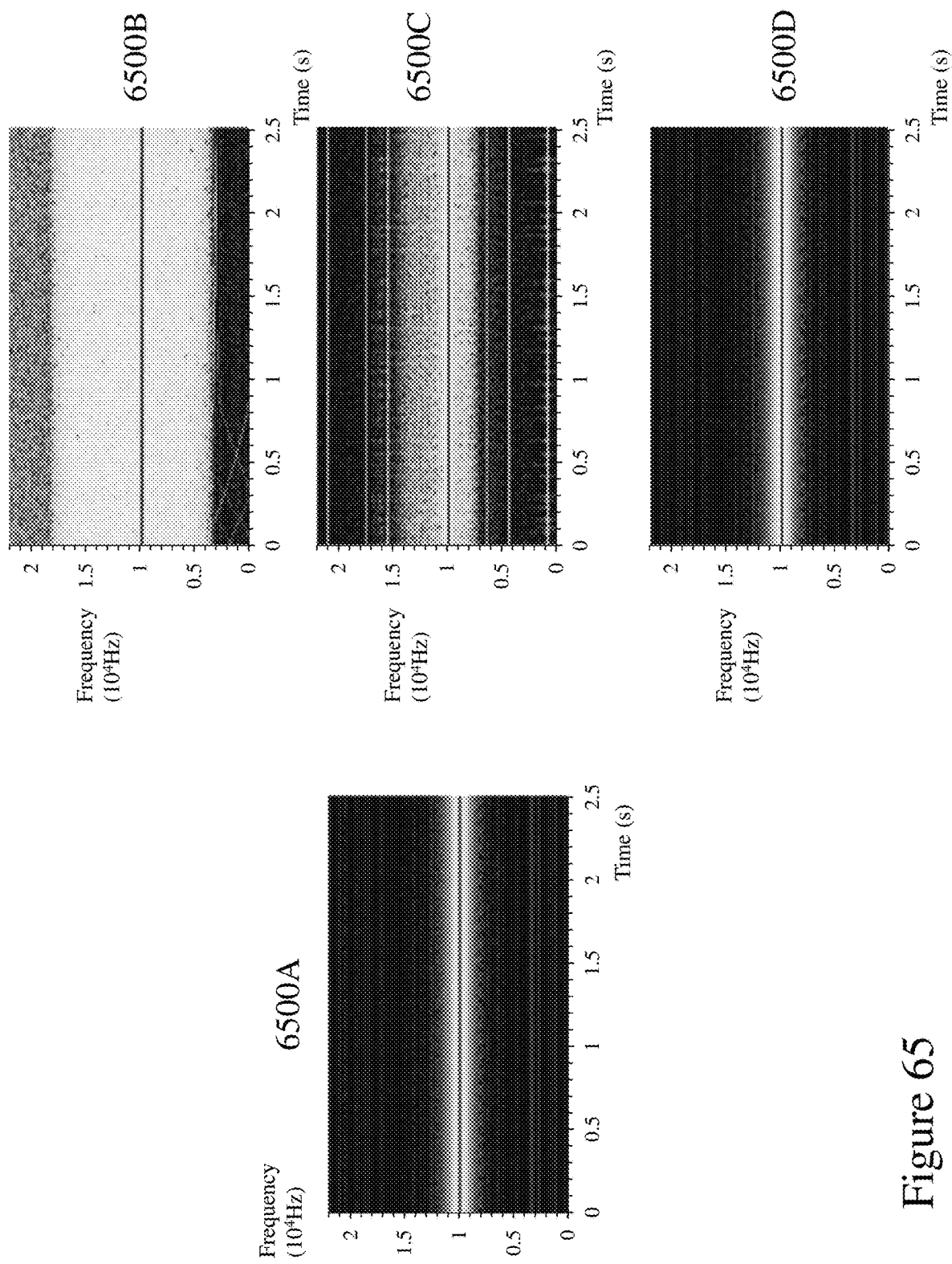
FIG. 65 depicts the frequency versus time performance of prior art audio transmission protocols relative to an embodiment of the invention relative to an original compact disc (CD) quality source providing a discrete 10 kHz tone.

Within the embodiments of the invention presented above the benefits of audio, video and/or audiovideo transmission using embodiments of the invention have been presented. Now referring to FIG. 65 there is depicted the frequency versus time performance of prior art audio transmission protocols relative to an embodiment of the invention relative to an original compact disc (CD) quality source providing a discrete 10 kHz tone. First image 6500A depicts the original content plotted as frequency content versus time. Second image 6500B depicts the resulting received audio using Audio Processing Technology (referred to as aptX) algorithms (a family of proprietary audio codec compression algorithms owned by Qualcomm™) whilst third image 6500C depicts the received audio from a standard Bluetooth Classic link. In each significant audio content is present at frequencies other than the fundamental 10 kHz tone from the audio source. In contrast fourth image 6500D depicts the received audio from a UWB link exploiting embodiments of the invention where it has significantly lower audio content across the frequency range apart from the underlying tone. Accordingly, improved audio quality and reproduction arise from the UWB link exploiting embodiments of the invention.

Figure 66:
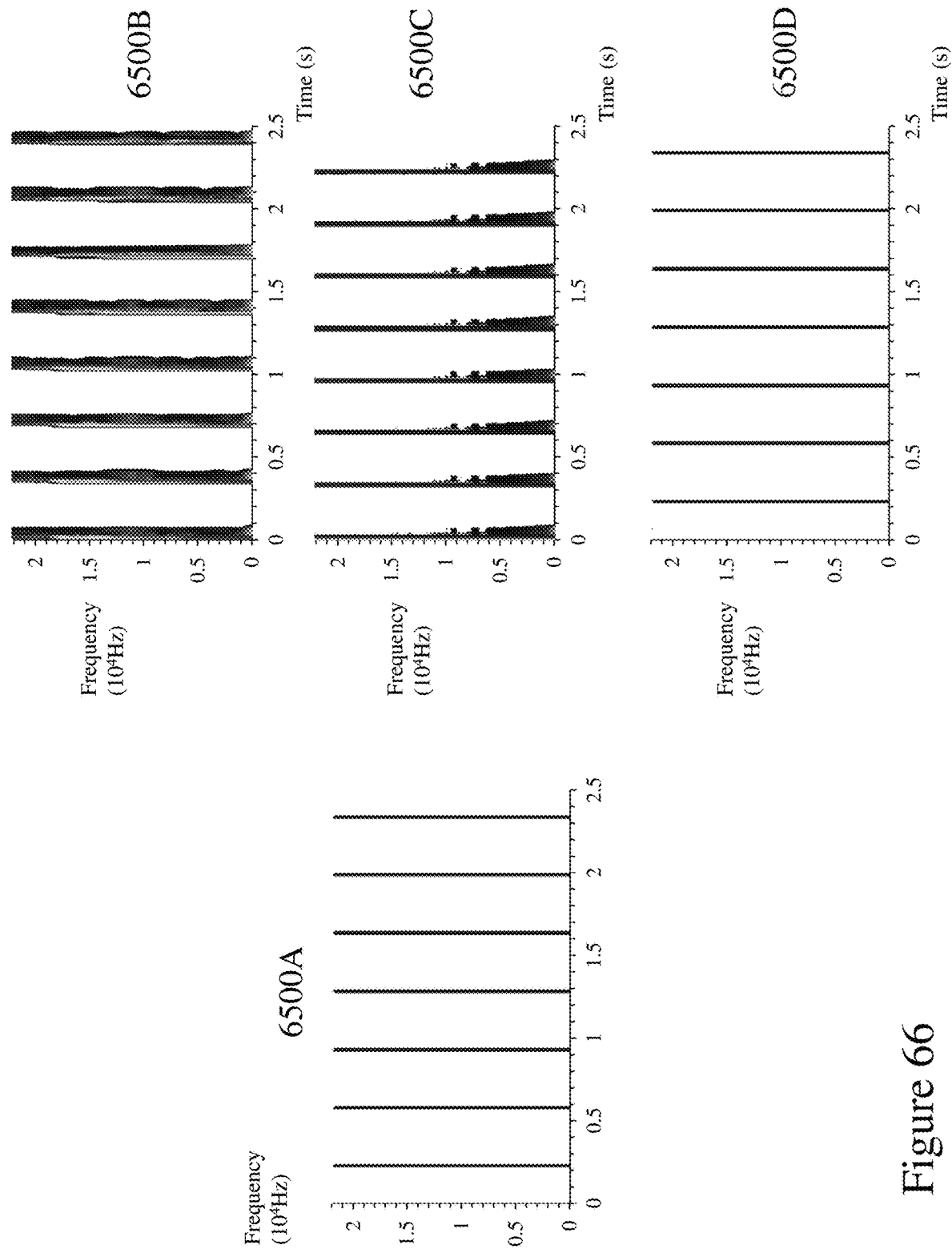
FIG. 66 depicts the frequency versus time performance of prior art audio transmission protocols relative to an embodiment of the invention relative to an original CD quality source providing periodic audio impulses.

Similarly, referring FIG. 66 there is depicted the frequency versus time performance of prior art audio transmission protocols relative to an embodiment of the invention relative to an original CD quality source providing periodic audio impulses. First image 6600A depicts the original content plotted as frequency content versus time showing the periodic impulses. Second image 6600B depicts the resulting received audio using the aptX algorithms whilst third image 6600C depicts the received audio from a standard Bluetooth Classic link. In each significant audio content is present at other times other than the discrete impulse points, this being across all frequencies with aptX and predominantly low frequencies with Bluetooth Classic. In contrast fourth image 6600D depicts the received audio from a UWB link exploiting embodiments of the invention where it has significantly lower audio content across the frequency range at all times other than the periodic impulses. Accordingly, improved audio quality and reproduction arise from the UWB link exploiting embodiments of the invention.

Further, when considering latency then the aptX implementation provides approximately 40-100 ms latency whereas with Bluetooth Classic typical latencies are 100-300 ms (relative to an approximate 32 ms lowest level in ideal circumstances). For Apple™ Airpods™ a latency of approximately 140-200 ms has been measured by the inventors. In contrast the UWB link exploiting embodiments of the invention achieves a latency of approximately 5 ms.

Accordingly, UWB links exploiting embodiments of the invention can provide users with an immersive wireless, video and/or gaming experience at lower latency, lower power, with increased data rates and integrated ranging. Further, UWB links exploiting embodiments of the invention yield lower electromagnetic interference and provide/support coexistence with Wi-Fi etc.

For example, UWB links exploiting embodiments of the invention can provide bidirectional uncompressed audio (e.g. headset/microphone) at 48 kS/s with 16 bit stereo (headset) and 48 kS/s 16 bit mono (microphone) with the capability for 96 kS/s 24-bit stereo and 96 kS/s 24-bit mono without any compression, down sampling or masking. Referring to Table 9 below exemplary gaming hub modes are presented for UWB links exploiting embodiments of the invention.

TABLE 9

Exemplary Gaming Hub Configurations Supported by Embodiments of the Invention

| Data Flow | Mode 1 | Mode 2 | Mode 3 |
|-----------|--------|--------|--------|
| Dongle-Headphones | 96 kHz 24-bit Mono | 48 kHz 24-bit Stereo | Light Compression |
| Microphone-Dongle | 48 kHz 24-bit Mono | 16 kHz 16-bit Mono | 16 kHz 16-bit Mono |
| Headphone/Microphone Audio Latency | 5 ms/10 ms | 5 ms/10 ms | 10 ms/15 ms |
| Line of Sight Range (m) | ~6 | ~10 | ~15 |
| Concurrent Users within 1 meter | 1 | 4 | 10 |

Table 10 below compares UWB links exploiting embodiments of the invention with Bluetooth Low Energy and two UWB IEEE standards.

TABLE 10

UWB Links Exploiting Embodiments of the Invention Relative to Existing Standard

| | Embodiments of Invention | Bluetooth Low Energy 5 | UWB IEEE 802.15.4Z HRP | UWB IEEE 802/15/4X LRP |
|---|---|---|---|---|
| Sleep Power (µW) | 1.0 | >1.5 | 3.3 | 2 |
| Startup Energy (µW/pps) | 0.5 | >6 | 20 | 2 |
| Bit Energy Tx (nW/bps) Rx | 0.22 | 20 | 30 | 27 |
| | 1.0 | 10 | 60 | 54 |
| Bit Rate (Mbps) | ≤20 | ≤2 | ≤6.8 | ≤1 |

Accordingly, from these performance metrics it would be evident that a sensor module exploiting UWB Transceivers and associated elements as described within this specification with respect to embodiments of the invention may operate indoors using only harvesting of indoor light sources to power the sensor module and provide data using a UWB link according to an embodiment of the invention.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method comprising:
providing an ultra-wideband (UWB) transceiver; and
executing a process upon the UWB transceiver; wherein the process comprises:
automatically configuring a gain of the UWB transceiver for a frame in dependence upon a determination with respect to a preceding frame; wherein
the configuration proceeds via a first process if the frame has been rejected;
the configuration proceeds via a second process if the frame has been lost;
the configuration proceeds via a third process if the frame has been received; and
the third process employs a current index of the gain, a signal strength of the receive frame in analog-to-digital converter steps and a gain settings table.

2. The method according to claim 1, wherein
the third process comprises:
calculating a normalized gain of the received frame in dependence upon a received signal strength indicator (RSSI), a current gain settings table and an index;
determining if the normalized gain of the received frame is less than a first threshold established in dependence upon a value of a field within the current gain setting table for a minimum value with the index and a first offset;
if the normalized gain of the received frame is less than the first threshold then executing a process comprising the steps of:
determining if the index is zero;
upon determining the index is zero keeping the index at is current value; and
upon determining the index is not zero reducing the index by a first adjustment;
determining if the normalized gain of the received frame is more than a second threshold established in dependence upon a value of a field within the current gain setting table for a maximum value with the index and a second offset;
if the normalized gain of the received frame is greater than the second threshold then executing a process comprising the steps of:
determining if the index is at a predetermined maximum value;
upon determining the index is at the predetermined maximum value keeping the index at is current value; and
upon determining the index is not at the predetermined maximum value increasing the index by a second adjustment; and
if the normalized gain of the received frame is not less than the first threshold and the normalized gain of the received frame is not more than the second threshold maintaining the index at its current value; and
the first process comprises maintaining the index when the frame was rejected at its current value;
the second process comprises decreasing the index when the frame was lost by a third offset;
and
repeating the automatic configuration of the gain in dependence upon a gain value within the current gain setting table for the current index to prepare for receipt of a further frame.

3. A method comprising:
providing an ultra-wideband (UWB) transceiver; and
executing a process upon the UWB transceiver comprising automatically configuring a beacon frame to be transmitted within a sequence of frames comprising data being transmitted by the UWB transceiver; wherein
the beacon frame consists of a first header, a second header and beacon data;
the first header is a link header comprising a time slot identity and a destination address;
the second header is a transport header comprising data, an acknowledgement, a sequence start, and a sequence number.

4. The method according to claim 3, wherein
the time slot identity and destination address are each eight bits;
the data is a single bit,
the acknowledgement a single bit;
the sequence start is a single bit; and
the sequence number is 4 bits.

5. The method according to claim 3, wherein
the sequence start and sequence number are employed by a plurality of devices when the beacon frame is received by each device of the plurality of devices from the UWB transceiver to update a frequency hopping configuration for each device of the plurality of devices without pausing transmission of data; and
a beacon frame is inserted into each frame of data being transmitted by the UWB transceiver.

6. A method comprising:
providing an ultra-wideband (UWB) transceiver; and
executing a process upon the UWB transceiver; wherein
the process relates to an aspect of a wireless link established or being established between the UWB transceiver and another transceiver;
the aspect is a frequency hopping configuration; and
the process comprises:
  establishing an identity of a current timeslot;
  establishing a channel identity for the current time slot;
  determining whether the channel identity for the current time slot matches a transmit channel within a channel array stored by the UWB transceiver which is indexed by the current channel identity;
  upon a determination the channel identity for the current time slot matches the transmit channel transmitting data with the UWB transceiver;
  determining whether the channel identity for the current time slot matches a receive channel within a channel array stored by the UWB transceiver which is indexed by the current channel identity; and
  upon a determination the channel identity for the current time slot matches the receive channel receiving data with the UWB transceiver;
the UWB transceiver is one of a plurality of UWB transceivers, each UWB transceiver of the plurality of UWB transceivers storing a common channel array which is transmitted to the plurality of UWB transmitters using beacon frames; and
a beacon frame of the beacon frames is distributed within each data frame transmitted.

7. A method comprising:
providing an ultra-wideband (UWB) transceiver; and
executing a process upon the UWB transceiver; wherein
the process relates to an aspect of a wireless link established or being established between the UWB transceiver and another transceiver;
the aspect is a frequency hopping configuration; and
the process comprises:
  establishing an identity of a current timeslot;
  establishing a channel identity for the current time slot;
  determining whether the channel identity for the current time slot matches a transmit channel within a first channel array stored by the UWB transceiver which is indexed by the current channel identity;
  upon a determination the channel identity for the current time slot matches the transmit channel transmitting data with the UWB transceiver;
  determining whether the channel identity for the current time slot matches a receive channel within a second channel array stored by the UWB transceiver which is indexed by the current channel identity; and
  upon a determination the channel identity for the current time slot matches the receive channel receiving data with the UWB transceiver;
the UWB transceiver is one of a plurality of UWB transceivers, each UWB transceiver of the plurality of UWB transceivers storing a common second channel array which is transmitted to the plurality of UWB transmitters using a first subset of a plurality of beacon frames;
the UWB transceiver is one of a plurality of UWB transceivers, each UWB transceiver of the plurality of UWB transceivers storing a common first channel array which is transmitted to the plurality of UWB transmitters using a second subset of the beacon frames; and
a beacon frame of the plurality of beacon frames is distributed within each data frame transmitted.

8. A method comprising:
providing an ultra-wideband (UWB) transceiver;
providing at least one of:
  a hardware development kit (HDK); and
  an evaluation development kit (EDK); and
executing a process upon the UWB transceiver; wherein
control of the UWB transceiver is provided via a software development kit which executes the process; and
the process relates to at least one of:
  an aspect of a wireless link established or being established between the UWB transceiver and another transceiver;
  an aspect of the UWB transceiver; and
  an aspect of at least one of the HDK and EDK.

9. A method comprising:
providing an ultra-wideband (UWB) transceiver;
executing a process upon the UWB transceiver;
providing a solar harvester;
providing a sensor; and
providing an electrical storage coupled to the solar harvester to receive electrical charge to be stored and to the UWB transceiver to power the UWB transceiver; wherein
UWB transceiver receives readings acquired by the sensor; and
the UWB transceiver automatically configures itself in dependence upon the available power within the electrical storage.

* * * * *